(12) United States Patent
Tracey et al.

(10) Patent No.: US 9,079,748 B2
(45) Date of Patent: Jul. 14, 2015

(54) REMOTE CONTROL FOR VALVE AND HOSE REEL SYSTEM

(75) Inventors: James B. A. Tracey, Austin, TX (US); James E. Burke, Jr., Austin, TX (US); Roy Paul Prosise, Cedar Park, TX (US); Christian Okonsky, Austin, TX (US)

(73) Assignee: GREAT STUFF, INC., Austin, TX (US)

( * ) Notice: Subject to any disclaimer, the term of this patent is extended or adjusted under 35 U.S.C. 154(b) by 873 days.

(21) Appl. No.: 12/036,154

(22) Filed: Feb. 22, 2008

(65) Prior Publication Data

US 2008/0223951 A1 Sep. 18, 2008

Related U.S. Application Data

(60) Provisional application No. 60/903,039, filed on Feb. 23, 2007, provisional application No. 60/916,672, filed on May 8, 2007.

(51) Int. Cl.
| | |
|---|---|
| *B65H 75/34* | (2006.01) |
| *B65H 75/44* | (2006.01) |
| *A01G 25/16* | (2006.01) |
| *B05B 1/16* | (2006.01) |

(Continued)

(52) U.S. Cl.
CPC ............ *B65H 75/4486* (2013.01); *A01G 25/16* (2013.01); *B05B 1/169* (2013.01); *B05B 1/3026* (2013.01); *B05B 3/044* (2013.01); *B05B 12/02* (2013.01); *B65H 75/4484* (2013.01); *B05B 1/14* (2013.01); *B65H 2701/33* (2013.01)

(58) Field of Classification Search
CPC .................. B65H 75/4486; B65H 2701/33
USPC ............. 137/355.12, 355.16, 355.18, 355.19, 137/355.2, 355.26, 355.27; 251/129.04; 239/276, 280; 285/277, 308, 315, 316
See application file for complete search history.

(56) References Cited

U.S. PATENT DOCUMENTS

| | | |
|---|---|---|
| 2,276,714 A | 3/1942 | Brown |
| 2,518,990 A | 8/1950 | Keener |

(Continued)

FOREIGN PATENT DOCUMENTS

| | | |
|---|---|---|
| DE | 20109674 | 8/2001 |
| DE | 202004016452 | 4/2005 |

(Continued)

OTHER PUBLICATIONS

Remote Control Hose Reel from M.K.Rittenhouse & Sons Ltd., details available at http://www.rittenhouse.ca/asp/Product.asp?PG=734.

(Continued)

*Primary Examiner* — Kevin Murphy
(74) *Attorney, Agent, or Firm* — Knobbe, Martens, Olson & Bear LLP

(57) ABSTRACT

An apparatus includes a handheld element and a remote control. The handheld element has a proximal end, a distal end, and an internal flow conduit. The internal flow conduit extends between the proximal and distal ends. The internal flow conduit is configured to be in fluid communication with a hose. The remote control is integrated with the handheld element. The remote control is configured to transmit wireless data signals for controlling a device associated with the hose. The device may include a reel, a valve system, a valve unit, and/or a plurality of valves.

28 Claims, 51 Drawing Sheets

(51) Int. Cl.
*B05B 1/30* (2006.01)
*B05B 3/04* (2006.01)
*B05B 12/02* (2006.01)
*B05B 1/14* (2006.01)

(56) References Cited

U.S. PATENT DOCUMENTS

| | | | |
|---|---|---|---|
| 2,607,360 A | 8/1952 | Young | |
| 2,621,870 A | 12/1952 | Barton | |
| 2,898,605 A | 8/1959 | Pearson | |
| 2,963,227 A | 12/1960 | Lambert | |
| 3,011,469 A | 12/1961 | Falkner | |
| 3,351,362 A * | 11/1967 | Hansen | 285/83 |
| 3,471,885 A | 10/1969 | McLoughlin et al. | |
| 3,786,869 A | 1/1974 | McLoughlin | |
| 3,817,560 A * | 6/1974 | Guertin | 285/90 |
| 3,910,497 A | 10/1975 | Manor | |
| 3,911,955 A | 10/1975 | Link | |
| 3,939,862 A | 2/1976 | Booth | |
| 3,943,312 A | 3/1976 | Bernstein et al. | |
| 3,974,879 A | 8/1976 | Nelson, Jr. et al. | |
| 4,012,002 A | 3/1977 | McDonald et al. | |
| 4,101,873 A | 7/1978 | Anderson et al. | |
| 4,142,367 A | 3/1979 | Guisti | |
| 4,186,881 A | 2/1980 | Long | |
| 4,256,133 A | 3/1981 | Coward et al. | |
| 4,276,482 A | 6/1981 | Crockett | |
| 4,276,900 A | 7/1981 | Rosenqvist | |
| 4,333,490 A | 6/1982 | Enter, Sr. | |
| 4,352,025 A | 9/1982 | Troyen | |
| 4,392,063 A | 7/1983 | Lindquist | |
| 4,396,149 A | 8/1983 | Hirsch | |
| 4,488,055 A | 12/1984 | Toyama | |
| 4,513,772 A | 4/1985 | Fisher | |
| 4,533,835 A | 8/1985 | Beckwith | |
| 4,538,761 A | 9/1985 | Ruprechter et al. | |
| 4,572,228 A | 2/1986 | Larson et al. | |
| 4,588,318 A | 5/1986 | O'Brien et al. | |
| 4,730,637 A | 3/1988 | White | |
| 4,731,545 A | 3/1988 | Lerner et al. | |
| 4,746,808 A | 5/1988 | Kaeser | |
| 4,830,283 A * | 5/1989 | Johnson | 239/197 |
| 4,832,074 A | 5/1989 | Li | |
| 4,839,039 A | 6/1989 | Parsons et al. | |
| 4,845,418 A | 7/1989 | Conner | |
| 4,852,802 A | 8/1989 | Iggulden et al. | |
| 4,858,827 A | 8/1989 | Fletcher et al. | |
| 4,960,181 A | 10/1990 | Marin et al. | |
| 5,078,476 A | 1/1992 | Shin | |
| 5,134,347 A | 7/1992 | Koleda | |
| 5,249,631 A | 10/1993 | Ferren et al. | |
| 5,332,322 A | 7/1994 | Gambaro | |
| 5,381,962 A | 1/1995 | Teague | |
| 5,383,605 A * | 1/1995 | Teague | 239/526 |
| 5,385,297 A | 1/1995 | Rein et al. | |
| 5,391,962 A | 2/1995 | Roberts et al. | |
| 5,402,551 A | 4/1995 | Workhoven | |
| 5,427,350 A | 6/1995 | Rinkewich | |
| 5,445,176 A | 8/1995 | Goff | |
| 5,445,178 A | 8/1995 | Feuer | |
| 5,465,904 A | 11/1995 | Vaello | |
| 5,482,250 A | 1/1996 | Kodaira | |
| 5,495,995 A | 3/1996 | Dominique et al. | |
| 5,549,262 A * | 8/1996 | Whitehead | 248/87 |
| 5,568,824 A | 10/1996 | Cordrey | |
| 5,647,388 A | 7/1997 | Butler, Jr. et al. | |
| 5,651,384 A | 7/1997 | Rudrich | |
| 5,696,671 A | 12/1997 | Oliver | |
| 5,715,866 A | 2/1998 | Granger | |
| 5,740,031 A | 4/1998 | Gagnon | |
| 5,749,521 A | 5/1998 | Lattery | |
| 5,760,706 A | 6/1998 | Kiss | |
| 5,793,174 A | 8/1998 | Kovach et al. | |
| 5,813,655 A | 9/1998 | Pinchott et al. | |
| D405,071 S | 2/1999 | Gambaro | |
| 5,870,302 A | 2/1999 | Oliver | |
| 5,881,775 A | 3/1999 | Owen et al. | |
| 5,927,603 A | 7/1999 | McNabb | |
| 5,947,148 A | 9/1999 | DeVito | |
| 5,957,253 A | 9/1999 | Clanton | |
| 5,975,162 A | 11/1999 | Link, Jr. | |
| 6,017,017 A | 1/2000 | Lutz et al. | |
| 6,036,333 A | 3/2000 | Spiller | |
| 6,092,548 A | 7/2000 | DeVito | |
| 6,144,840 A | 11/2000 | Alton et al. | |
| 6,149,096 A | 11/2000 | Hartley | |
| 6,178,992 B1 | 1/2001 | Van Der Paal | |
| 6,236,850 B1 | 5/2001 | Desai | |
| 6,238,139 B1 | 5/2001 | Glang et al. | |
| 6,257,264 B1 | 7/2001 | Sturman et al. | |
| 6,279,848 B1 | 8/2001 | Mead, Jr. | |
| 6,283,139 B1 * | 9/2001 | Symonds et al. | 137/78.3 |
| 6,312,191 B1 | 11/2001 | Rosenfeld | |
| 6,337,635 B1 * | 1/2002 | Ericksen et al. | 340/825.69 |
| 6,371,148 B1 | 4/2002 | Tripp | |
| 6,452,499 B1 | 9/2002 | Runge et al. | |
| 6,453,215 B1 | 9/2002 | Lavoie | |
| 6,491,062 B1 | 12/2002 | Croft | |
| 6,561,481 B1 | 5/2003 | Filonczuk | |
| 6,568,655 B2 | 5/2003 | Paese et al. | |
| 6,631,882 B2 | 10/2003 | Mack | |
| 6,662,821 B2 | 12/2003 | Jacobsen et al. | |
| 6,666,431 B2 | 12/2003 | McCusker | |
| 6,668,329 B1 | 12/2003 | Rudd et al. | |
| 6,672,329 B1 | 1/2004 | Brooks et al. | |
| 6,701,951 B1 | 3/2004 | Drinkwater | |
| 6,752,342 B1 | 6/2004 | Nagler | |
| 6,796,515 B2 | 9/2004 | Heren et al. | |
| 6,823,239 B2 | 11/2004 | Sieminski | |
| 6,906,638 B2 | 6/2005 | Gaiser | |
| 6,935,575 B2 | 8/2005 | Lacchia | |
| 7,014,166 B1 | 3/2006 | Wang | |
| 7,050,887 B2 | 5/2006 | Alvarez | |
| 7,058,478 B2 | 6/2006 | Alexanian | |
| 7,069,115 B1 | 6/2006 | Woytowitz | |
| RE39,249 E | 8/2006 | Link, Jr. | |
| 7,096,094 B2 | 8/2006 | Addink et al. | |
| 7,097,113 B2 | 8/2006 | Ivans | |
| 7,147,204 B2 | 12/2006 | Hollingsworth et al. | |
| 7,191,964 B2 | 3/2007 | Trapp | |
| 7,201,332 B2 | 4/2007 | Wang et al. | |
| 7,216,659 B2 | 5/2007 | Caamano et al. | |
| 7,258,285 B1 | 8/2007 | Combs et al. | |
| 7,308,724 B2 | 12/2007 | Ho | |
| 7,311,004 B2 | 12/2007 | Giles | |
| 7,316,368 B2 | 1/2008 | Moon et al. | |
| 7,419,038 B2 | 9/2008 | Caamano et al. | |
| 7,503,338 B2 | 3/2009 | Harrington et al. | |
| 8,132,592 B2 | 3/2012 | Harrington et al. | |
| 2002/0096213 A1 | 7/2002 | Jacobsen et al. | |
| 2002/0166986 A1 | 11/2002 | Remby et al. | |
| 2003/0109964 A1 | 6/2003 | Addink et al. | |
| 2003/0116670 A1 | 6/2003 | Gentry | |
| 2004/0078092 A1 | 4/2004 | Addink et al. | |
| 2004/0089346 A1 | 5/2004 | Sutardja | |
| 2004/0100394 A1 | 5/2004 | Hitt | |
| 2004/0217189 A1 | 11/2004 | Regli | |
| 2004/0231723 A1 * | 11/2004 | Harrington et al. | 137/355.2 |
| 2005/0029477 A1 | 2/2005 | Wolf | |
| 2005/0087644 A1 | 4/2005 | Kim | |
| 2005/0167625 A1 | 8/2005 | Deen | |
| 2005/0199842 A1 | 9/2005 | Parsons et al. | |
| 2006/0000936 A1 | 1/2006 | Caamano et al. | |
| 2006/0266868 A1 | 11/2006 | Caamano et al. | |
| 2009/0301573 A1 | 12/2009 | Harrington et al. | |

FOREIGN PATENT DOCUMENTS

| | | |
|---|---|---|
| DE | 102005042701 | 3/2007 |
| EP | 0 035 892 | 9/1981 |
| EP | 0214452 | 3/1987 |
| EP | 0509151 | 10/1992 |
| EP | 0873920 | 10/1998 |
| EP | 0 898 879 | 3/1999 |

(56) References Cited

FOREIGN PATENT DOCUMENTS

| | | |
|---|---|---|
| EP | 1 060 800 | 12/2000 |
| FR | 2823417 | 10/2002 |
| JP | 61-257123 | 11/1986 |
| JP | S62-173222 | 7/1987 |
| JP | 63-234924 | 9/1988 |
| JP | H01-078662 | 3/1989 |
| JP | 02-78329 | 3/1990 |
| JP | 05-37266 | 2/1993 |
| JP | U-3002078 | 7/1994 |
| JP | 06-256765 | 9/1994 |
| JP | 07-002362 | 1/1995 |
| JP | 07-132251 | 5/1995 |
| JP | H09-224504 | 9/1997 |
| JP | 92-86570 | 11/1997 |
| JP | 09-315694 | 12/1997 |
| JP | 09-322664 | 12/1997 |
| JP | 2001-095400 | 4/2001 |
| JP | 2001-186835 | 7/2001 |
| JP | 2001-190441 | 7/2001 |
| JP | 2001-288791 | 10/2001 |
| JP | 2002-199821 | 7/2002 |
| JP | 2004-80772 | 3/2004 |
| JP | 2006-115725 | 5/2006 |
| JP | 2006-520207 | 9/2006 |
| KR | 2002-0041060 | 6/2002 |
| SU | 1087120 | 4/1984 |
| WO | WO 97/03917 | 2/1997 |
| WO | WO 99/22589 | 5/1999 |
| WO | WO 00/71916 | 11/2000 |
| WO | WO 03/026995 | 4/2003 |
| WO | WO 2004/080161 | 9/2004 |
| WO | WO 2006/004985 | 1/2006 |
| WO | WO 2006/042127 | 8/2006 |
| WO | WO 2008/103941 | 8/2008 |

OTHER PUBLICATIONS

Maxireel-Exhaust Hose Reels from AQC Dust Collecting Systems Inc., details and technical summary available at http://www.aqcdust.com/main+en+01__100+Maxireel.html?ItemCatID=2&ItemID=12 and http://www.aqcdust.com/DATA/ITEM/12__1.pdf.
Power Hose Reel from Vagabond Water, details available at http://www.vagabondwater.com/index.cfm?fuseaction=returns &pageID=17.
OsKar Exhaust Hose Reels from Industrial Air Quaility, Inc., details available at http://www.iaqsales.com/paqes/Reels.htm.
Radio-Controlled Motor Driven Reels from Conductix Inc., details available at http://www.conductix.us/productpage.cfm?Ids=338.
Super Hose from Oakdale Creative, LLC, details and FAQs available http://super-hose.com/ and http://super-hose.com/wst__page2.html.
Lang et al., "Mechatronic design of a leather spray system," Mechatronics, vol. 9, Issue 7, pp. 867-880 (Oct. 1999).
File History of U.S. Appl. No. 10/799,362, filed Mar. 12, 2004.
File History of U.S. Appl. No. 12/399,857, filed Mar. 6, 2009.
File History of U.S. Appl. No. 11/174,152, filed Jun. 30, 2005.
International Search Report and Written Opinion for International Application No. PCT/US2004/007953, mailed on Aug. 20, 2004, in 16 pages.
International Preliminary Report on Patentability and Written Opinion of the International Searching Authority for International Application No. PCT/US2004/007953, issued on Sep. 16, 2005, in 9 pages.
International Search Report and Written Opinion for International Application No. PCT/US2005/023432, mailed on Oct. 28, 2005, in 11 pages.
International Preliminary Report on Patentability and Written Opinion of the International Searching Authority for International Application No. PCT/US2005/023432, issued on Jan. 9, 2007, in 6 pages.

Office Action dated Nov. 18, 2005, received in European Patent Application No. 04737327.9.
Office Action dated Mar. 16, 2006, received in European Patent Application No. 04737327.9.
Office Action dated Aug. 6, 2007, received in European Patent Application No. 04737327.9.
Office Action dated Jun. 8, 2009, received in Australian Patent Application No. 2004220468.
Office Action dated Nov. 25, 2009, received in Australian Patent Application No. 2004220468.
Office Action dated Feb. 16, 2010, received in Canadian Patent Application No. 2,519,000.
Office Action dated Apr. 11, 2008, received in Chinese Patent Application No. 200480012827.9, and English translation.
Office Action dated Apr. 14, 2010, received in Chinese Patent Application No. 200910147528.0. The Office Action rejects Claims 1-35 as lacking inventive step over US 5,078,476; EP 0 873 920; US 6,279,848; and US 6,283,139.
Office Action dated Mar. 7, 2008, received in Indian Patent Application No. 4358/DELNP/2005.
Office Action dated Jan. 6, 2010, received in Japanese Patent Application No. 2006-507228 (English translation only).
Office Action dated Oct. 23, 2009, received in Mexican Patent Application No. PA/a/2005/009774.
Notice of Allowance dated Feb. 10, 2010, received in Mexican Patent Application No. PA/a/2005/009774.
Office Action dated Jul. 11, 2006, received in New Zealand Patent Application No. 542701.
Office Action dated Feb. 13, 2008, received in Russian Patent Application No. 2005131228.
Office Action dated Apr. 25, 2008, received in Russian Patent Application No. 2005131228.
Invitation to Pay Additional Fees for PCT Application No. PCT/US2008/054777, dated Jul. 3, 2008.
Office Action for Chinese Patent Application No. 200880005939.X, dated Aug. 4, 2010, in 8 pages.
International Search Report and Written Opinion of PCT Patent Application No. PCT/US2008/054777 dated Aug. 29, 2008.
Office Action dated Aug. 13, 2007, received in European Patent Application No. 04737327.9.
International Search Report dated Jun. 28, 2005, received in corresponding PCT Application No. PCT/US2005/006679.
Final Office Action dated Nov. 16, 2010, received in Japanese Patent Application No. 2006-507228.
Office Action dated Feb. 23, 2011 in Canadian Patent Application No. 2,519,000 filed Mar. 12, 2004.
Office Action dated Dec. 27, 2011 in Japanese Patent Application No. 2006-507228.
Office Action dated Jan. 4, 2012 in Japanese Patent Application No. 2006-507228.
Office Action dated Sep. 14, 2010 in Chinese Application No. 200910147528.0.
Office Action dated Jan. 17, 2012 in Japanese Patent Application No. 2009-550628.
International Preliminary Report on Patentability and Written Opinion of the International Searching Authority for International Application No. PCT/US2008/054777, issued on Aug. 26, 2009 in 21 pages.
Office Action dated Apr. 3, 2012 in Japanese Patent Application No. 2011-056197.
Office Action dated Apr. 10, 2012 in Japanese Patent Application No. 2006-507228.
Japanese Patent Office; Office Action dated Jan. 17, 2012, from related Japanese application, Japanese Patent Application No. 2009-550628.
Canadian Office Action dated Dec. 20, 2013, Application No. 2,678,900 (3 pages).

\* cited by examiner

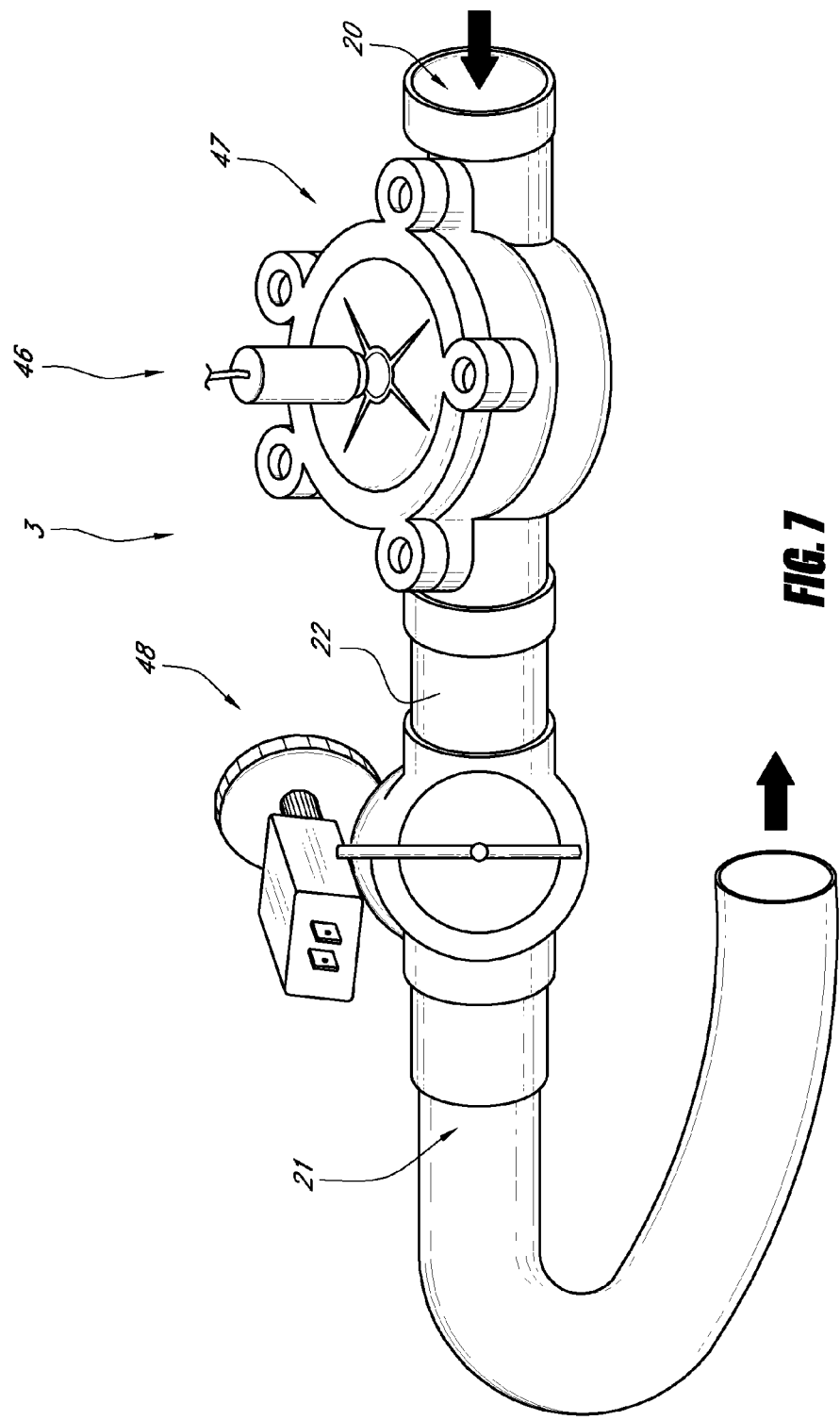

| Time (min) | Valve Condition |
|---|---|
| 0-15 | closed |
| 15-30 | open |
| 30-240 | closed |
| 240-255 | open |
| 255-600 | closed |

| Time (min) | Valve Condition |
|---|---|
| 0-15 | closed |
| 15-30 | 100% open |
| 30-240 | closed |
| 240-255 | 50% open |
| 255-600 | closed |

| Time (min) | Valve 1 | Valve 2 |
|---|---|---|
| 0-15 | closed | — |
| 15-30 | open | 100% open |
| 30-240 | closed | — |
| 240-255 | open | 50% open |
| 255-600 | closed | — |

| Time (min) | Motor Operation |
|---|---|
| 15 | wind 10 feet |
| 30 | wind 20 feet |
| 40 | wind 15 feet |

| Time (min) | Valve System & Motor Operation |
|---|---|
| 0-15 | valve system open 100% |
| 15-20 | valve system closed |
| 15 | wind 10 feet |
| 20-30 | valve system open 25% |
| 30-31 | valve system closed |
| 30 | wind 20 feet |
| 31-40 | valve system open 50% |
| 40 | valve system closed |

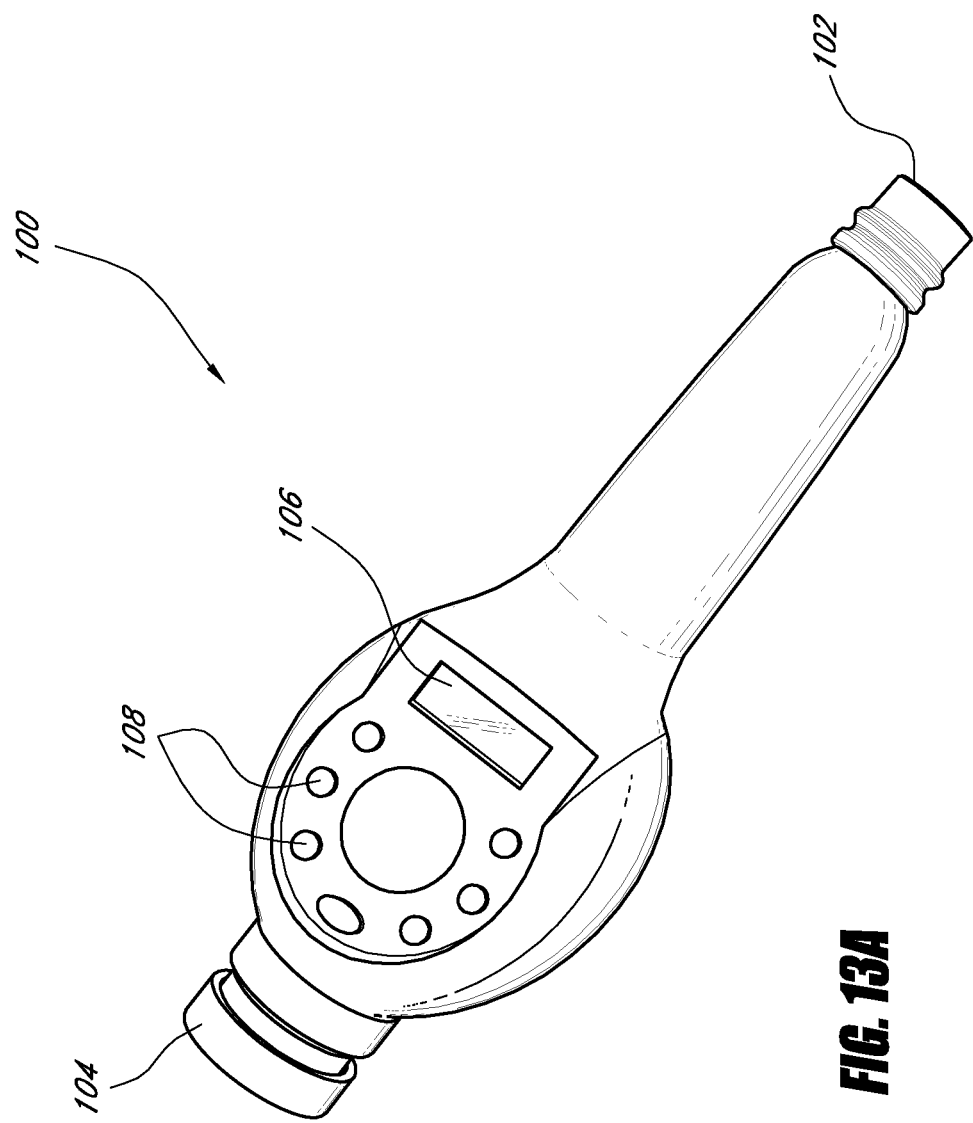

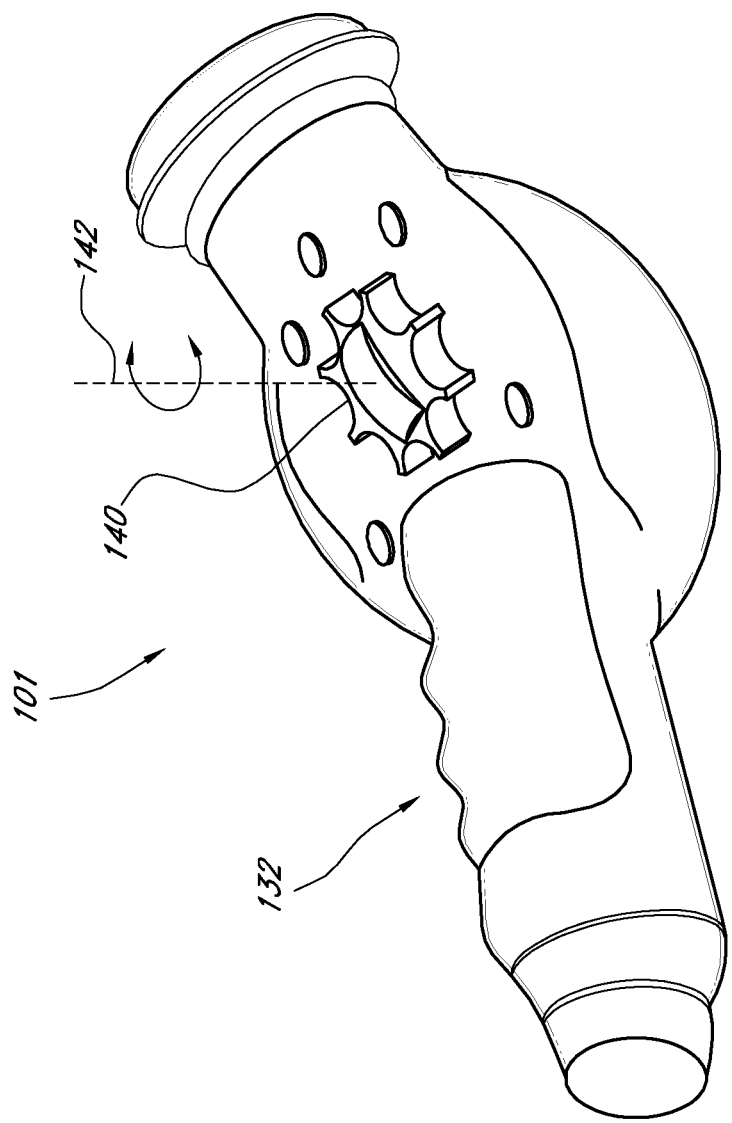

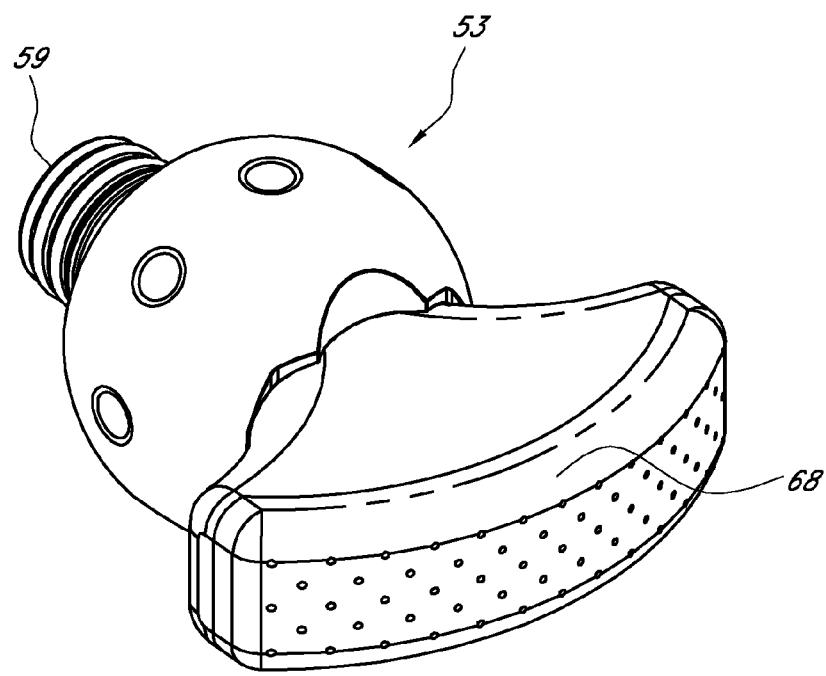
FIG. 15Bii

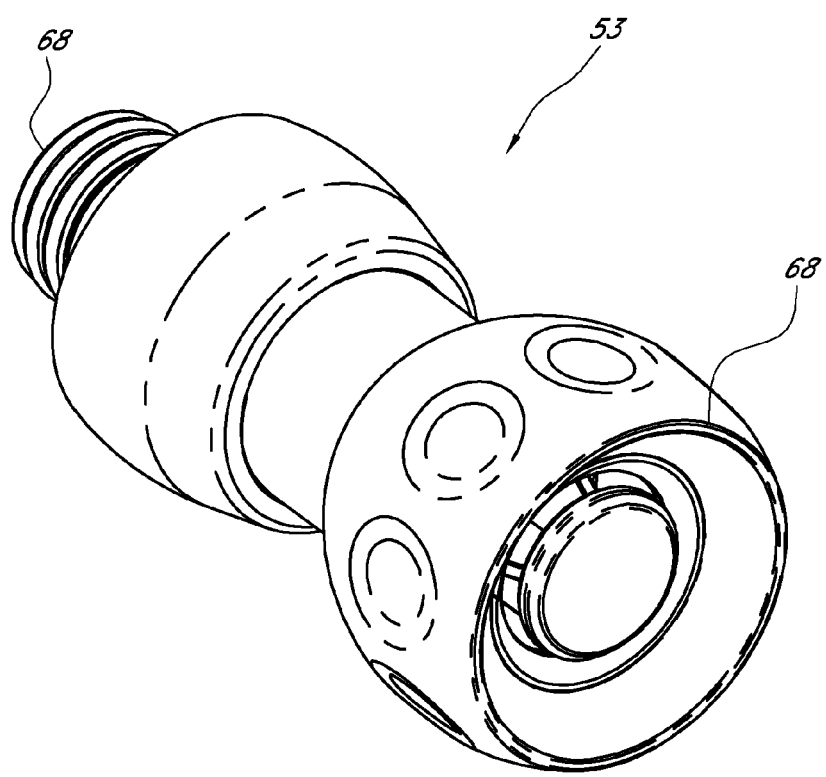
FIG. 15Biii

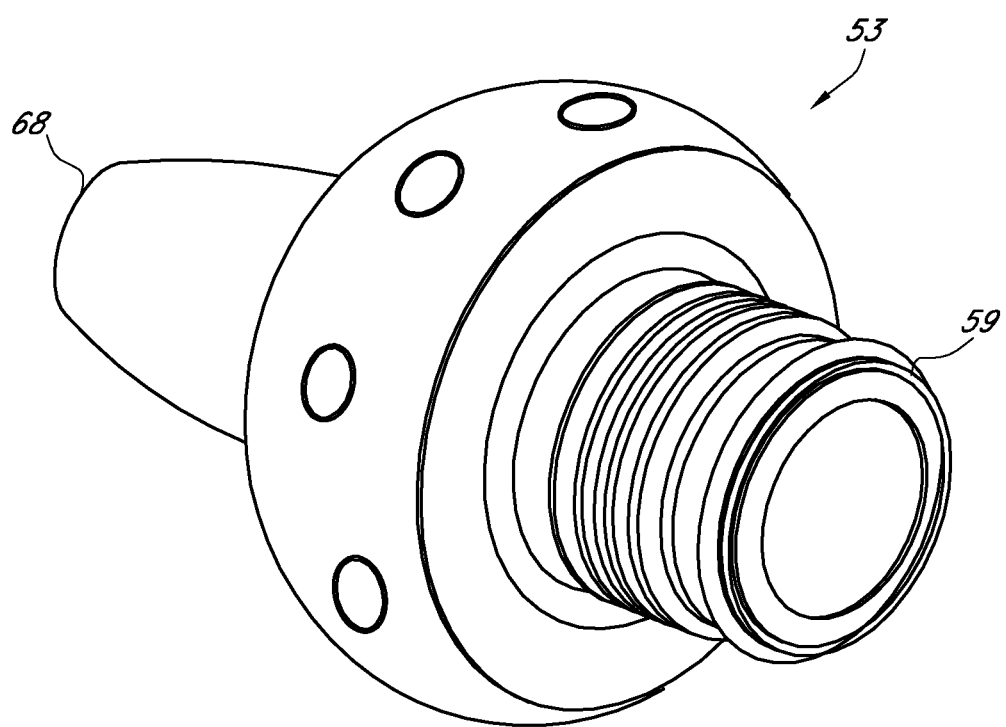
FIG. 15 Biv

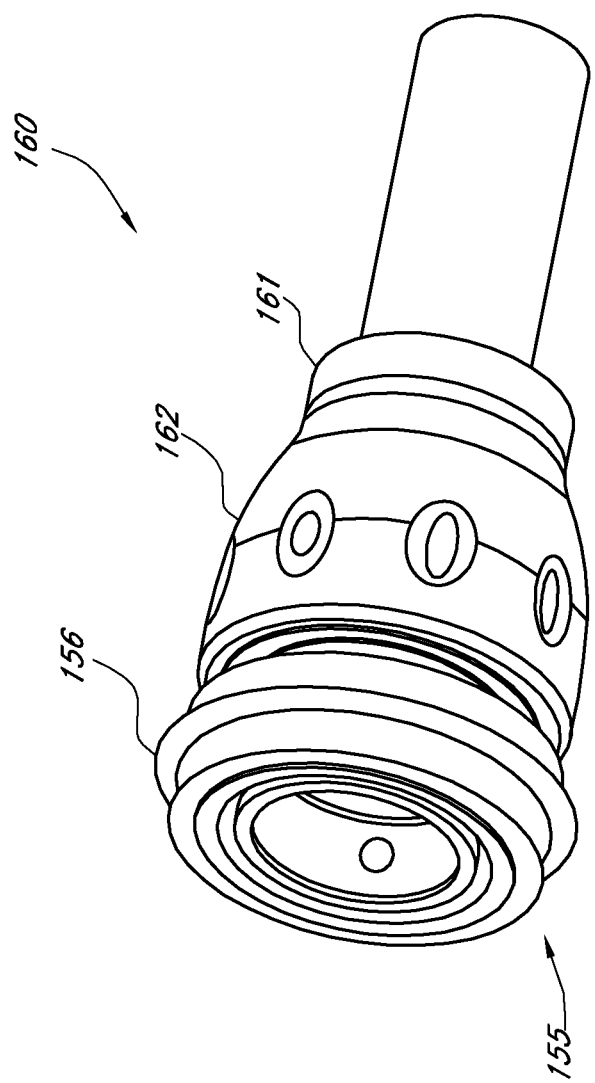
FIG. 15Cii

REMOTE CONTROL FOR VALVE AND HOSE REEL SYSTEM

CROSS-REFERENCE TO RELATED APPLICATIONS

This application claims priority benefit under 35 U.S.C. §119(e) to U.S. Provisional Patent Application No. 60/903,039, filed Feb. 23, 2007, entitled "Programmable Hose Reel," and U.S. Provisional Patent Application No. 60/916,672, filed May 8, 2007, entitled "Valve and Hose Reel System," each of which is incorporated herein by reference in its entirety.

BACKGROUND

1. Field

The present disclosure relates generally to systems and methods for operating a hose and, in particular, to a reel having a motor for controlling the spooling of the hose and a valve for controlling the flow of fluid through the hose.

2. Description of the Related Art

Hoses for conducting fluid, such as water hoses, can be cumbersome and difficult to manage. Mechanical reels have been designed to help spool hoses onto a drum-like apparatus. Some conventional reels are manually operated, requiring the user to physically rotate the reel, or drum, to spool the hose. This can be tiresome and time-consuming for users, especially when the hose is of a substantial length. Other reels are motor-controlled, and can automatically wind up the hose.

Hoses are typically used in conjunction with on/off valves positioned at a distal or proximal end of the hose. For example, garden hoses are fitted to a faucet on the outside of a house or other building, with a traditional manual spigot or valve for turning the water flow on or off at the faucet. Because the hose is designed to extend many yards away from the faucet, it is often convenient to have a means for turning the flow on or off at the distal or spray nozzle end of the hose. Thus, many manual devices such as spray guns are provided with a valve or fitting at the nozzle end of the hose so that the flow can be turned on or off without returning to the faucet.

Despite the availability of attachments for turning the flow on or off at the nozzle end, it is generally undesirable to leave the water flow on at the source when the hose is no longer in use. Continual water pressure along the entire length of the hose is undesirable for a number of reasons. The pressure tends to form leakage paths at joints between multiple lengths of hose, at the joint between the nozzle and the nozzle attachment (such as a spray gun), and at the joint between the faucet and the hose. Furthermore, continual pressure can also form leaks along the hose line itself. Leakage at these points leads to flooded or muddied garden areas, particularly near the faucet where the user has to go to turn the water source on or off. Moreover, it is difficult to manipulate the hose, move it from place to place, or coil the hose for storage with constant pressure along the hose line. This leads the user to turn off the water flow at the source, e.g., by the manual spigot on the outside faucet. However, the faucet is often obstructed or inconvenient or difficult to reach and the area around the faucet tends to be muddied by water leakage.

Systems for programming future operations and movements of water valves are known. Such systems normally include a valve unit containing a plurality of valves, and a user interface panel in a stationary location. For example, programmable sprinkler systems for gardens typically include a user interface panel that may be located indoors, such as mounted on a wall inside a user's garage. Alternatively, the user interface panel may be located in direct proximity to the valves.

Remote controls for controlling a water valve and/or an outdoor hose reel are also known. For example, commonly owned U.S. Patent Application Publication No. 2004/0231723 discloses a handheld remote control for wirelessly controlling a motorized hose reel and a water valve upstream of the reel. The remote control can be strapped onto the hose via an attachment band, for ease of use while using the hose.

SUMMARY

In certain embodiments, an apparatus comprises a handheld element and a remote control. The handheld element has a proximal end, a distal end, and an internal flow conduit. The internal flow conduit extends between the proximal and distal ends. The internal flow conduit is configured to be in fluid communication with a hose. The remote control is integrated with the handheld element. The remote control is configured to transmit wireless data signals for controlling a device associated with the hose. The device comprises a reel including a rotatable element on which a hose can be spooled. The remote control is adapted to transmit wireless data signals to control rotation of the rotatable element.

In certain embodiments, an apparatus comprises a handheld element and a remote control. The handheld element has a proximal end, a distal end, and an internal flow conduit. The internal flow conduit extends between the proximal and distal ends. The internal flow conduit is configured to be in fluid communication with a hose. The remote control is integrated with the handheld element. The remote control is configured to transmit wireless data signals for controlling a device associated with the hose. The device comprises a valve system adapted to control fluid flow through the hose. The remote control is adapted to transmit wireless data signals to control movement of the valve system. The valve system is disposed along a flow path between a fluid inlet and a fluid outlet. The valve system comprises a first valve positioned along the fluid flow path and a second valve positioned along the flow path in series with the first valve. The first valve has an open position in which the first valve permits fluid flow through the first valve. The first valve has a closed position in which the first valve substantially completely blocks fluid flow through the first valve. The second valve has a maximum flow position in which the second valve permits a maximum rate of fluid flow through the second valve. The second valve has one or more stable partially open positions in which the second valve permits fluid flow through the second valve at different rates less than the maximum flow rate.

In certain embodiments, an apparatus comprises a handheld element and a remote control. The handheld element has a proximal end, a distal end, and an internal flow conduit. The internal flow conduit extends between the proximal and distal ends. The internal flow conduit is configured to be in fluid communication with a hose. The remote control is integrated with the handheld element. The remote control is configured to transmit wireless data signals for controlling a device associated with the hose. The device comprises a valve system adapted to control fluid flow through the hose. The remote control is adapted to transmit wireless data signals to control movement of the valve system. The valve system comprises a plurality of valves.

In certain embodiments, an apparatus comprises a handheld element and a remote control. The handheld element has a proximal end, a distal end, and an internal flow conduit. The internal flow conduit extends between the proximal and distal ends. The internal flow conduit is configured to be in fluid communication with a hose. The handheld element includes an integrally formed nozzle configured to spray fluid flowing into the flow conduit from a hose fluidly attached to the proximal end of the handheld element. The remote control is integrated with the handheld element. The remote control is configured to transmit wireless data signals for controlling a device associated with the hose.

In certain embodiments, an apparatus comprises a handheld element, a remote control, and a nozzle. The handheld element has a proximal end, a distal end, and an internal flow conduit. The internal flow conduit extends between the proximal and distal ends. The internal flow conduit is configured to be in fluid communication with a hose. The remote control is integrated with the handheld element. The remote control is configured to transmit wireless data signals for controlling a device associated with the hose. The nozzle is configured to be selectively and removably fluidly attached to and detached from the distal end of the handheld element. The nozzle is in fluid communication with the internal flow conduit when attached.

In certain embodiments, an apparatus comprises a handheld element and a remote control. The handheld element has a proximal end, a distal end, and an internal flow conduit. The internal flow conduit extends between the proximal and distal ends. The internal flow conduit is configured to be in fluid communication with a hose. The remote control is integrated with the handheld element. The remote control is configured to transmit wireless data signals for controlling a device associated with the hose. The remote control comprises a display surface.

In certain embodiments, an apparatus comprises a handheld element and a remote control. The handheld element has a proximal end, a distal end, and an internal flow conduit. The internal flow conduit extends between the proximal and distal ends. The internal flow conduit is configured to be in fluid communication with a hose. The remote control is integrated with the handheld element. The remote control is configured to transmit wireless data signals for controlling a plurality of devices associated with the hose.

In certain embodiments, an apparatus comprises a handheld element and a remote control. The handheld element has a proximal end, a distal end, and an internal flow conduit. The internal flow conduit extends between the proximal and distal ends. The internal flow conduit is configured to be in fluid communication with a hose. The remote control is integrated with the handheld element. The remote control is configured to transmit wireless data signals for controlling a device associated with the hose. The device comprises a valve unit. The valve unit has a proximal end configured to be selectively removably fluidly attached to and detached from the distal end of a hose. The valve unit has a distal end configured to be selectively removably fluidly attached to and detached from the proximal end of the handheld element. The remote control is adapted to transmit wireless data signals to control movement of the valve unit.

In certain embodiments, an apparatus comprises a handheld element and a remote control. The handheld element has a proximal end, a distal end, and an internal flow conduit. The internal flow conduit extends between the proximal and distal ends. The internal flow conduit is configured to be in fluid communication with a hose. The proximal end of the handheld element is configured to be selectively and removably fluidly attached to and detached from a distal end of a hose. The remote control is integrated with the handheld element. The remote control is configured to transmit wireless data signals for controlling a device associated with the hose.

In certain embodiments, an apparatus comprises a handheld element and a remote control. The handheld element has a proximal end, a distal end, and an internal flow conduit. The internal flow conduit extends between the proximal and distal ends. The internal flow conduit is configured to be in fluid communication with a hose. The remote control is integrated with the handheld element. The remote control is configured to transmit and receive wireless data signals for controlling a device associated with the hose.

In certain embodiments, a hose reel comprises a rotatable drum, a motor configured to rotate the drum, a hose configured to be spooled around the drum, a motor controller configured to activate the motor, a flow controller configured to start and stop a flow of a fluid through the hose, and a programmable electronics unit in communication with the motor controller and the flow controller. Activation of the motor rotates the drum and spools the hose around the drum.

In certain embodiments, a method of operating a hose reel comprises providing a hose reel. The hose reel comprises a rotatable drum, a motor configured to rotate the drum, a hose configured to be spooled around the drum, a motor controller configured to activate the motor, a flow controller configured to start and stop a flow of a fluid through the hose, and a programmable electronics unit in electrical communication with the motor controller and the flow controller. Activation of the motor rotates the drum and spools the hose around the drum. The method further comprises programming the electronics unit to cause the flow controller to start a flow of a fluid through the hose for a first duration, programming the electronics unit to cause the flow controller to stop the flow of the fluid after the first duration, programming the electronics unit to cause the motor controller to activate the motor to rotate the drum after the first duration, and executing a program stored in the electronics unit.

In certain embodiments, a remotely programmable flow control system comprises a fluid inlet, a fluid outlet adapted to be in fluid communication with a hose, a flow path between the inlet and the outlet, an electronically controlled valve along the flow path between the inlet and the outlet, a memory, a controller configured to move the valve in accordance with instructions stored in the memory, a receiver configured to receive wireless data signals to be stored in the memory, and a remote control configured to send wireless data signals to the receiver. The valve has an open position in which the valve permits fluid flow through the valve. The valve also has a closed position in which the valve substantially completely blocks fluid flow through the valve. The controller and/or the receiver is/are configured to store the instructions in the memory. The remote control includes an attachment structure for selectively attaching and detaching the remote control with respect to a hose.

In certain embodiments, a remotely programmable flow control system comprises a fluid inlet, a fluid outlet, a flow path between the inlet and the outlet, an electronically controlled valve system along the flow path between the inlet and the outlet, a memory, a controller configured to adjust the valve system, a receiver configured to receive wireless data signals to be stored in the memory, and a remote control configured to send wireless data signals to the receiver. The valve system has a maximum flow condition in which the valve system permits a fluid flow at a maximum flow rate from the inlet to the outlet. The valve system has a completely closed condition in which the valve system substantially completely blocks fluid flow from the inlet to the outlet. The valve system has a plurality of stable intermediate conditions in which the valve system permits fluid flow at different flow rates from the inlet to the outlet. The different flow rates are less than the maximum flow rate. The data comprises instructions for future movements of the valve system. The controller and/or the receiver is/are configured to store the instructions in the memory.

In certain embodiments, a flow controller comprises a fluid inlet, a fluid outlet, a flow path between the inlet and the outlet, a first valve positioned along the flow path, and a second valve positioned along the flow path in series with the first valve. The first valve has an open position in which the first valve permits fluid flow through the first valve. The first valve has a closed position in which the first valve substantially completely blocks fluid flow through the first valve. The second valve has a maximum flow position in which the second valve permits a maximum rate of fluid flow through the second valve. The second valve has one or more stable partially open positions in which the second valve permits fluid flow through the second valve at different rates less than the maximum flow rate.

In certain embodiments, an apparatus comprises a nozzle unit and a remote control integrated with the nozzle unit. The nozzle unit is configured to be attached to a distal end of a hose so that the nozzle unit is in fluid communication with the hose. The nozzle unit includes a nozzle for spraying a fluid conveyed from the hose into the nozzle unit. The remote control is configured to transmit wireless data signals for controlling a device associated with the hose.

In certain embodiments, a hose reel system comprises a rotatable element on which a hose can be spooled, a motor configured to rotate the rotatable element, a valve unit, a hose attachment fitting on the rotatable element, a controller configured to electronically control the motor and the valve, and a user interface in communication with the controller. The valve unit has a fluid inlet, a fluid outlet, and at least one electronically controllable valve along a flow path between the inlet and the outlet. The hose attachment fitting is in fluid communication with the outlet of the valve unit. The hose attachment fitting is adapted to attach to a proximal end of a hose in a manner allowing the hose to be spooled onto the rotatable element and such that the hose is in fluid communication with the flow controller. The user interface is configured to receive user commands for operation of the motor and the valve. The controller is configured to, upon receipt of a specific user command by the user interface, open the valve and operate the motor to rotate the rotatable element in a direction to substantially completely spool a hose onto the rotatable element.

In certain embodiments, a method of operating a hose reel system comprises providing a rotatable element on which a hose can be spooled, providing a motor configured to rotate the rotatable element, providing a valve unit, providing a hose attachment fitting on the rotatable element, attaching a proximal end of a hose to the hose attachment fitting in a manner allowing the hose to be spooled onto the rotatable element and such that the hose is in fluid communication with the flow controller, receiving a specific user command, and in response to the user command, simultaneously opening the valve and operating the motor to rotate the rotatable element in a direction to substantially completely spool a hose onto the rotatable element. The valve unit has a fluid inlet, a fluid outlet, and at least one electronically controllable valve along a flow path between the inlet and the outlet. The hose attachment fitting is in fluid communication with the outlet of the flow controller.

For purposes of summarizing the invention and the advantages achieved over the prior art, certain objects and advantages of the invention are described herein. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught or suggested herein without necessarily achieving other objects or advantages as may be taught or suggested herein.

All of these embodiments are intended to be within the scope of the invention herein disclosed. These and other embodiments will become readily apparent to those skilled in the art from the following detailed description having reference to the attached figures, the invention not being limited to any particular preferred embodiment(s) disclosed.

BRIEF DESCRIPTION OF THE DRAWINGS

FIG. 7 is a partially cut-away perspective view of one embodiment of a valve system of a flow controller;

FIG. 8 is an example of a representational data structure for storing user instructions for future movements of a valve having open and closed positions;

FIG. 9 is an example of a representational data structure for storing user instructions for future movements of a valve having completely open, completely closed, and partially open positions;

FIG. 10 is an example of a representational data structure for storing user instructions for future movements of a dual valve system;

FIG. 11 is an example of a representational data structure for storing user instructions for future movements of a motorized reel;

FIG. 12 is an example of a representational data structure for storing user instructions for future movements of a valve system and a motorized reel;

FIG. 13A illustrates a perspective view of an example programming device for a hose reel apparatus;

FIG. 13D illustrates a bottom perspective view of the embodiment of the programming device of FIG. 13C;

FIG. 15Cii is a perspective view of an example embodiment of a quick connector that can be fluidly coupled with the remote control nozzle, nozzle, and/or valve unit of FIG. 15A;

DETAILED DESCRIPTION

Figure 1:
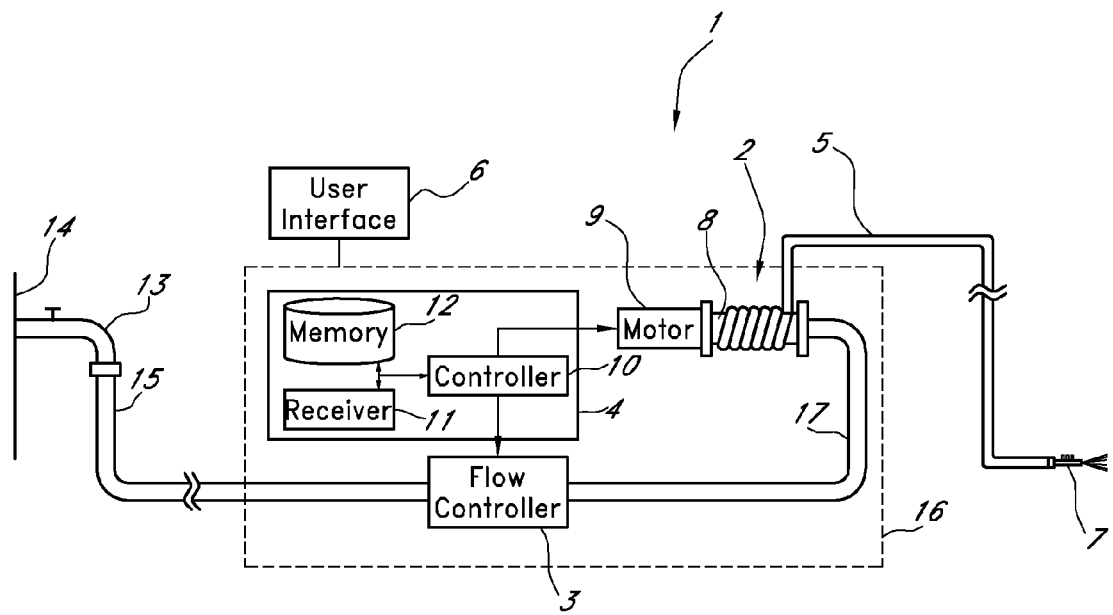
FIG. 1 is a schematic view of one embodiment of a hose reel system.

While illustrated in the context of garden hoses for household watering applications, the skilled artisan will readily appreciate that the principles and advantages of the preferred embodiments are applicable to other types of hose products.

When utilizing a hose (e.g., a garden hose) for watering a lawn, trees, bushes, flowers, fruits and vegetables, and other plants, without a sprinkler system, a hose is typically set proximate to the plant to be watered and run for a certain amount of time. When the area is a lawn, a sprinkler may be used to saturate a certain portion of the lawn that the sprinkler is adapted to canvas. For some fruits and vegetables, a soaker hose may be used. However, leaving the hose and any associated attachments out in the open can be unsightly and dangerous (e.g., for example, people tripping over the hose, a lawnmower or other such appliance mangling the hose, etc.). If the user of a hose forgets to turn off the water, flooding and waste of water may result. Kitchen timers have been attached to garden hoses to shut the water off at the spigot after a certain amount of time, but that leads to the pressure build-up problems (e.g., leakage) described above. Additionally, the hose remains unspooled after the water is shut off.

In certain embodiments, a hose reel comprising a rotatable element on which linear material may be spooled (such as a drum, preferably a cylindrical drum), a motor coupled to the rotatable element, a motor controller, a valve system in fluid communication with an inlet and an outlet, and a programming apparatus can be programmed with a timer that can turn a fluid flow off after a certain amount of time and that can spool a hose after a certain amount of time. Commonly owned U.S. patent application Ser. No. 11/172,420, filed Jun. 30, 2005, published on Jan. 5, 2006 as U.S. Patent Application Publication No. 2006/0000936, entitled "Systems and Methods for Controlling Spooling of Linear Material," describes a motor controller for spooling linear material and the electronics associated therewith. Commonly owned U.S. patent application Ser. No. 10/799,362, filed Mar. 12, 2004, published on Nov. 25, 2004 as U.S. Patent Application Publication No. 2004/0231723, entitled "Remote Control for Hose Operation," discloses a remote control apparatus for controlling a reel motor and a flow controller that may be adapted to be inside or outside of a hose reel housing. Commonly owned U.S. patent application Ser. No. 11/420,164, filed May 24, 2006, published on Nov. 30, 2006 as U.S. Patent Application Publication No. 2006/0266868, entitled "Reciprocating Mechanism for a Reel Assembly," describes a reciprocating mechanism for evenly spooling a linear material (such as hose) onto a reel. The disclosures of the above-identified applications are incorporated herein by reference in their entirety.

The programming device of the present application communicates with the motor controller and the valve system in the hose reel. In a typical environment, the hose reel is positioned next to, and in fluid communication with, a municipal or residential outdoor faucet (e.g., a faucet on the outside of a house). The programming device may be located at the hose reel or may comprise a wireless remote control (e.g., via infrared (IR), radio frequency (RF) (e.g., at about 915 MHz), Bluetooth, 802.11x, and the like). A remote control programming device may thus be located at the end of a hose, elsewhere outdoors, in a garage, or indoors. In some embodiments, a programming device is accessible via the internet (e.g., via a computer in communication with the hose reel) and may be used to program the hose reel from anywhere in the world. The programming device may also be located remotely, and disks, flash memory, etc. may be used to transport stored programs from the programming device to the electronics unit in the hose reel.

Hose Reel System

FIG. 1 is a schematic view of an example embodiment of a hose reel system 1. The system 1 comprises a motorized hose reel 2, a flow controller 3, an electronics unit 4, a partially spooled fluid conductive element or hose 5, a user interface 6, and a remote control 7. In the illustrated embodiment, the reel 2, the flow controller 3, and the electronics unit 4 are substantially enclosed within a common housing 16. In other embodiments, the housing 16 substantially encloses the reel 2 and the electronics unit 4, but not the flow controller 3. For example, the flow controller 3 can be outside the housing 16, such as directly on an exterior surface of the housing 16. In other embodiments, the housing 16 substantially encloses the reel 2, but not the flow controller 3 or the electronics unit 4. In other embodiments, the housing 16 substantially encloses the flow controller 3 and the reel 2, but not the electronics unit 4. For example, the electronics unit 4 can communicate with the user interface 6 and perform its control of the reel 2 and flow controller 3 wirelessly. The housing 16 can have any suitable shape, including spherical. In some embodiments, the housing 16 is omitted from the design.

The hose reel 2 includes a rotatable element, illustrated as a drum 8, onto which the hose 5 can be spooled. As used herein, a "drum" is a broad term that encompasses a variety of different structures on which a hose can be spooled, including non-cylindrical structures and frames. The drum 8 is preferably substantially cylindrical. In some embodiments, the drum 8 includes one or more hose guide grooves, a retraction limiting band, and/or a hose connector ramp as taught in commonly owned U.S. Pat. No. 6,981,670, which is incorporated herein by reference in its entirety. The hose reel 2 preferably also includes a motor 9 coupled with respect to the drum 8. In use, the motor 9 can preferably rotate the drum 8 in both directions, for powered spooling and unspooling of the hose 5. The motor 9 is preferably electronically controllable.

In the illustrated embodiment, the flow controller 3 controls fluid flow from an outdoor faucet 13 on a building wall 14 to the hose reel 2. A first fluid conduit 15 extends from the faucet 13 to the flow controller 3. The conduit 15 may include a hose, possibly in combination with a non-hose conduit. For example, the conduit 15 may include a hose extending from the faucet 13 to a hose attachment fitting on an exterior of the housing 16, and a non-hose conduit extending from the housing interior to the flow controller 3. Alternatively, the conduit 15 may comprise a single hose with a proximal end connected to the faucet 13 and a distal end connected to the flow controller 3. In yet another embodiment, the conduit 15 may comprise a first hose with a proximal end connected to the faucet 13 and a distal end connected to a hose attachment fitting on the housing 16, and a second hose with a proximal end connected to the hose attachment fitting in fluid communication with the first hose and a distal end connected to the flow controller 3. In still yet other embodiments, the conduit 15 may comprise a rigid fluid conductive element such as polyvinyl chloride (PVC) pipe or metal tubing extending from the faucet 13 to the hose reel 2 or to the flow controller 3. Still other arrangements are possible, giving due consideration to the goal of conveying fluid from the faucet 13 to the flow controller 3.

Figure 2:
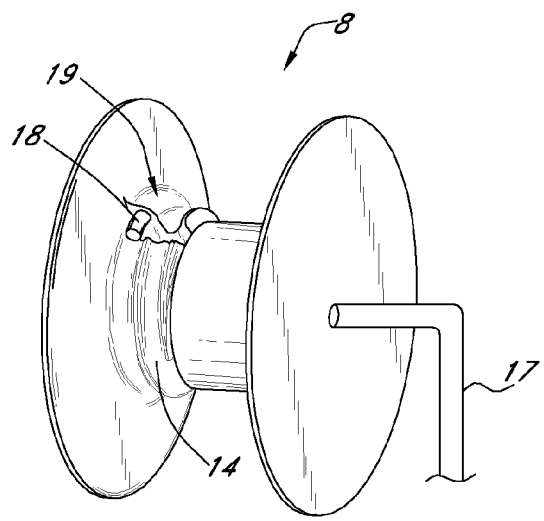
FIG. 2 is a perspective view of an embodiment of a rotatable drum onto which a hose can be spooled.

In the illustrated embodiment, a conduit 17 is provided between a fluid outlet of the flow controller 3 and the reel 2. While not shown, the reel 2 preferably includes an internal conduit that conveys fluid from the conduit 17 to the hose 5 attached to the rotatable element 8. For example, FIG. 2 shows an embodiment of a rotatable element or drum 8 having a hose attachment fitting 18 on a connector ramp 19. Preferably, the fitting 18 is adapted to fluidly attach to a proximal end of a hose 5 in a manner allowing the hose to be spooled onto the rotatable element 8. As known in the art, the internal conduit within the rotatable element 8 may comprise a rotating elbow joint connected between the conduit 17 and the hose attachment fitting 18, to convey the fluid to the fitting 18. Other types of internal conduits can be provided, giving due consideration to the goal of conveying fluid from the flow controller 3 through the fitting 18 to an attached hose 5 in a manner allowing the element 8 to be rotated and the hose 5 simultaneously spooled or unspooled with respect to the element 8. Further details of the illustrated rotatable element 8, fitting 18, and connector ramp 19 are described in U.S. Pat. No. 6,981,670.

In another embodiment, the flow controller 3 is located outside of the housing 16. For example, the flow controller 3 can be fluidly attached directly to the faucet 13. In this embodiment, the hose 15 can have a proximal end secured to the flow controller 3 and a distal end in fluid communication with the conduit 17. In another embodiment, the flow controller 3 is secured directly to an exterior or interior surface of the housing 16. Other arrangements are possible, giving due consideration to the goal of positioning the flow controller 3 along a flow path from the faucet 13 to the hose 5.

With continued reference to FIG. 1, the illustrated electronics unit 4 includes a controller 10, a receiver 11, and memory 12. The electronics unit 4 is preferably configured to control the motor 9 and flow controller 3. Preferably, the controller 10 is configured to move one or more valves of the flow controller 3 in accordance with instructions received from a user. The controller 10 is also preferably configured to electronically control the motor 9 and, in turn, the rotation of the rotatable element 8, again by executing instructions received from a user. The user instructions can be received from the user interface 6 and/or the remote control 7. The controller 10 can comprise an electronic microprocessor chip. The controller 10 can be configured to interact with a motor controller (not shown) for control of the motor 9. For example, the hose reel 2 can include a motor-controller similar to those described in U.S. Patent Application Publication No. 2006/0000936.

The remote control 7 is preferably configured to communicate wirelessly with the receiver 11, such as by a radio frequency link, Bluetooth link, or the like. The remote control 7 can preferably send wireless data signals to the receiver 11, the data signals including user instructions for operation of a device associated with the hose 5, such as, in the illustrated embodiment, the reel 2 and/or the flow controller 3. Accordingly, the receiver 11 is configured to receive the wireless data signals from the remote control 7. In some embodiments, the wireless data signals comprise instructions for real-time control of the device. In other embodiments, the wireless data signals comprise instructions for future operation of the device, allowing the user to program the device. It will be understood that both real-time and future control can be provided in the same system and can be performed electronically by the controller 10.

The memory 12 is preferably configured to store user instructions for future operations of the device associated with the hose 5. In the illustrated embodiment, the memory 12 can store user instructions for future movements of the reel 2 (including direction, duration, and rotation speed of the rotatable element 8), and/or future movements of one or more valves of the flow controller 3. The memory 12 can comprise an electronic memory chip, as is well known. In certain embodiments, the remote control 7 comprises the memory 12. In some embodiments, the remote control 7 is configured to transmit instructions stored in the memory 12 for operation of the device as the instructions are to be executed. In some embodiments, the remote control 7 is configured to transmit sets of instructions stored in the memory 12 for operation of the device as the instructions are to be executed. In certain embodiments, each of the remote control 7 and the electronics unit 4 comprises a memory. Preferably, the controller 10 is configured to read the user instructions in the memory 12 and to execute them on the motor 9 and flow controller 3. When a user's instructions are received by the user interface 6 and the receiver 11 (from the remote control 7), the controller 10 can also be configured to store the instructions in the memory 12. In an alternative embodiment, the user interface 6 and the receiver 11 are configured to directly store the instructions in the memory 12 without involving the controller 10.

With continued reference to FIG. 1, the user interface 6 is preferably configured to receive user instructions for electronically controlling the motor 9 (and, in turn, the rotation of the rotatable element 8), in real-time or in the future. The user interface 6 is also preferably configured to receive user instructions for controlling one or more valves of the flow controller 3, in real-time or in the future. The user interface 6 may comprise, for example, a control panel on the housing 16 of the reel 2. Alternatively, the user interface 6 can comprise a separate, standalone unit located in close proximity to the housing 16, in which case the user interface 6 is preferably within 10 feet, more preferably within 5 feet, even more preferably within 2 feet, and even more preferably within 1 foot of the rotatable element 8. It will be understood that either of the user interface 6 and the remote control 7 can be omitted from the design.

Preferably, the electronics unit 4 is substantially enclosed within the reel housing 16. However, in other embodiments, some or all of the components of the electronics unit 4 may be located outside of the housing 16, for example in a home computer or other unit adapted for wireless communication and control of the reel 2 and/or flow controller 3. In some embodiments, an indoor computer comprises the memory 12 and the electronics unit 4 comprises the controller 10 and the receiver 11. In certain embodiments, an indoor computer comprises the memory 12 and the receiver 11 and the electronics unit 4 comprises the controller 10. The memory 12 may be modular (e.g., comprising a disk, flash drive, etc.).

Flow Controller

Figure 3:
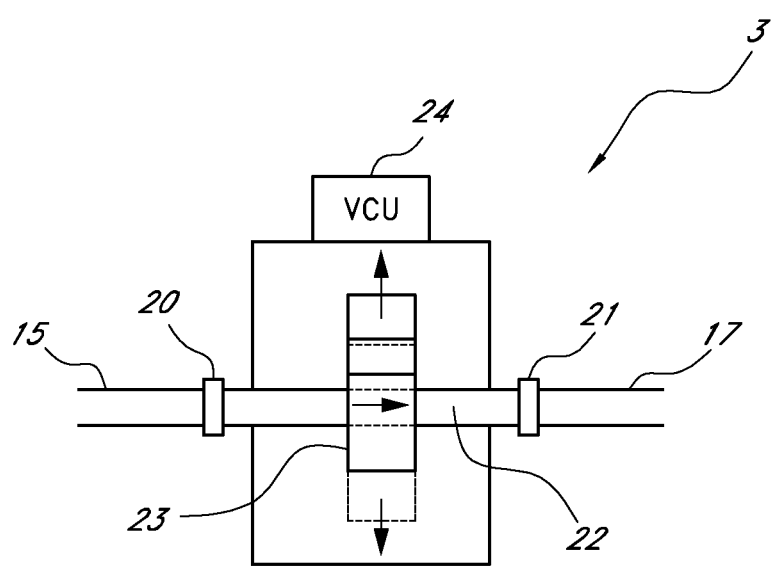
FIG. 3 is a schematic view of one embodiment of a flow controller.

FIG. 3 schematically shows an example embodiment of a flow controller 3, which includes a fluid inlet 20, a fluid outlet 21, a flow path 22 between the inlet 20 and the outlet 21, and an electronically controlled valve 23 along the flow path 22. The inlet 20 is preferably configured to be fluidly coupled to the conduit 15 or directly to a faucet 13. The outlet 21 is preferably configured to be fluidly coupled to the conduit 17. The illustrated valve 23 is shown merely schematically, and it will be understood that a wide variety of valve structures are suitable for the purposes of the present application. The illustrated valve 23 has an open position (shifted downward, as shown by dotted lines in FIG. 3) in which the valve 23 permits fluid flow therethrough along the flow path 22, through a flow path 22 defined by the valve. The valve 23 also has a closed position (as shown, shifted upward) in which the valve 23 substantially completely blocks fluid flow through the valve along the flow path 22. The illustrated flow controller 3 includes a valve control unit (VCU) 24 configured to receive signals from the controller 10 for adjusting the position of the valve 23. For example, the VCU 24 can include known structure for adjusting valve position with the use of a solenoid (i.e., the valve 23 can comprise a solenoid valve, as is well known in the art). Alternatively, the VCU 24 can include a valve positioning motor and associated mechanism for moving the valve 23. Skilled artisans will appreciate that a variety of different apparatuses can be used for adjusting the position of the valve 23.

In one embodiment, the valve 23 of the flow controller 3 is capable of occupying only two positions: a completely closed position in which the valve substantially completely blocks fluid flow, and an open or "maximum flow" position in which it permits fluid flow at a maximum flow rate from the inlet 20 to the outlet 21. In this context, "open position" broadly encompasses positions in which the valve may partially impede the fluid flow, as well as valve positions in which the fluid flow is substantially unimpeded by the valve. For example, the valve 23 can be controlled via a solenoid such that the valve 23 is only capable of moving to one of two extreme positions.

In another embodiment, the valve 23 is capable of occupying a plurality of stable intermediate positions in which the valve 23 permits fluid flow at different flow rates from the inlet 20 to the outlet 21, said different flow rates being less than the maximum flow rate associated with the open or maximum flow position. In certain embodiments, the valve 23 is configured to always be at least partially open (e.g., at least about 25% open). A valve positioning motor can be provided to move the valve to the intermediate positions.

Figure 4:
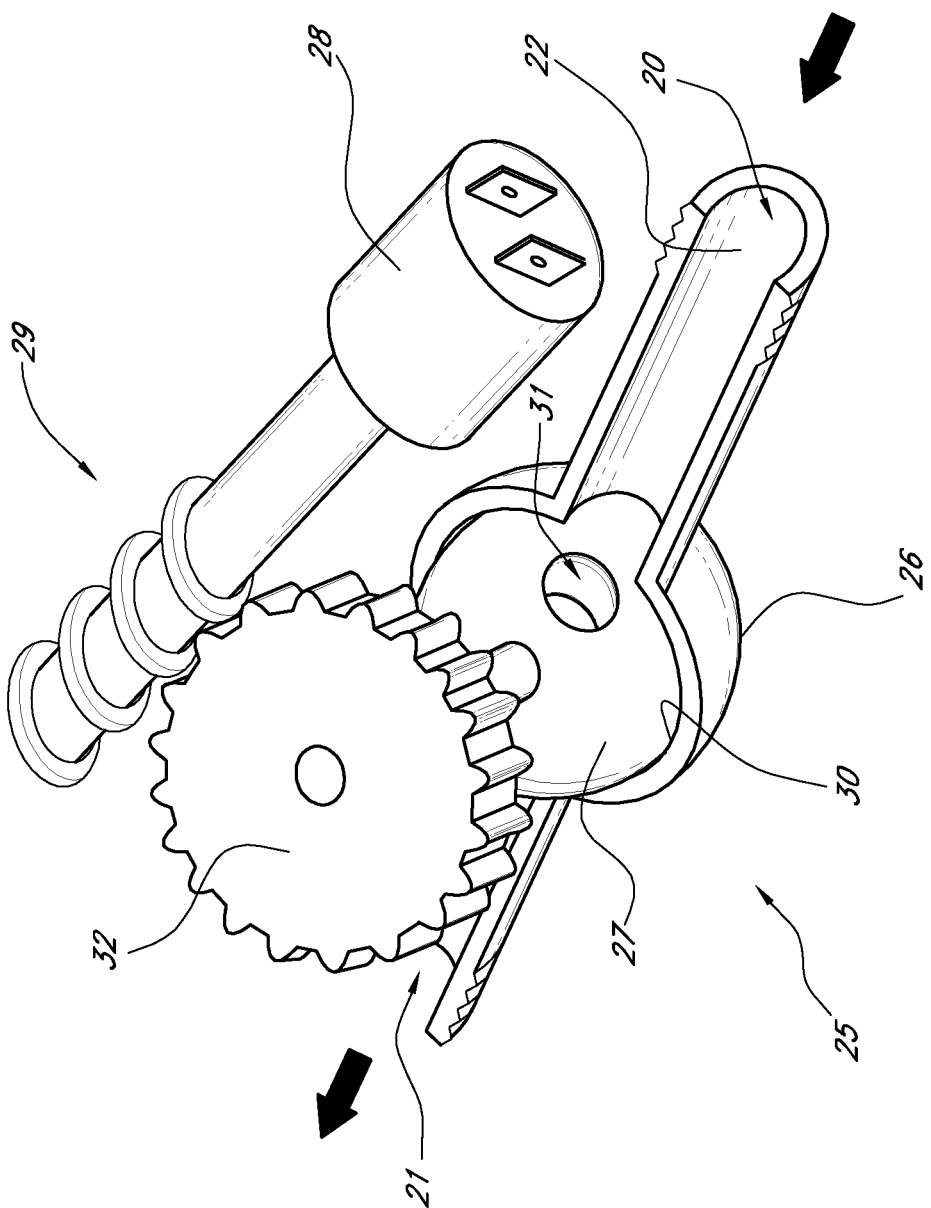
FIG. 4 is a partially cut-away perspective view of one embodiment of a valve for regulating fluid flow rate.
Figure 5:
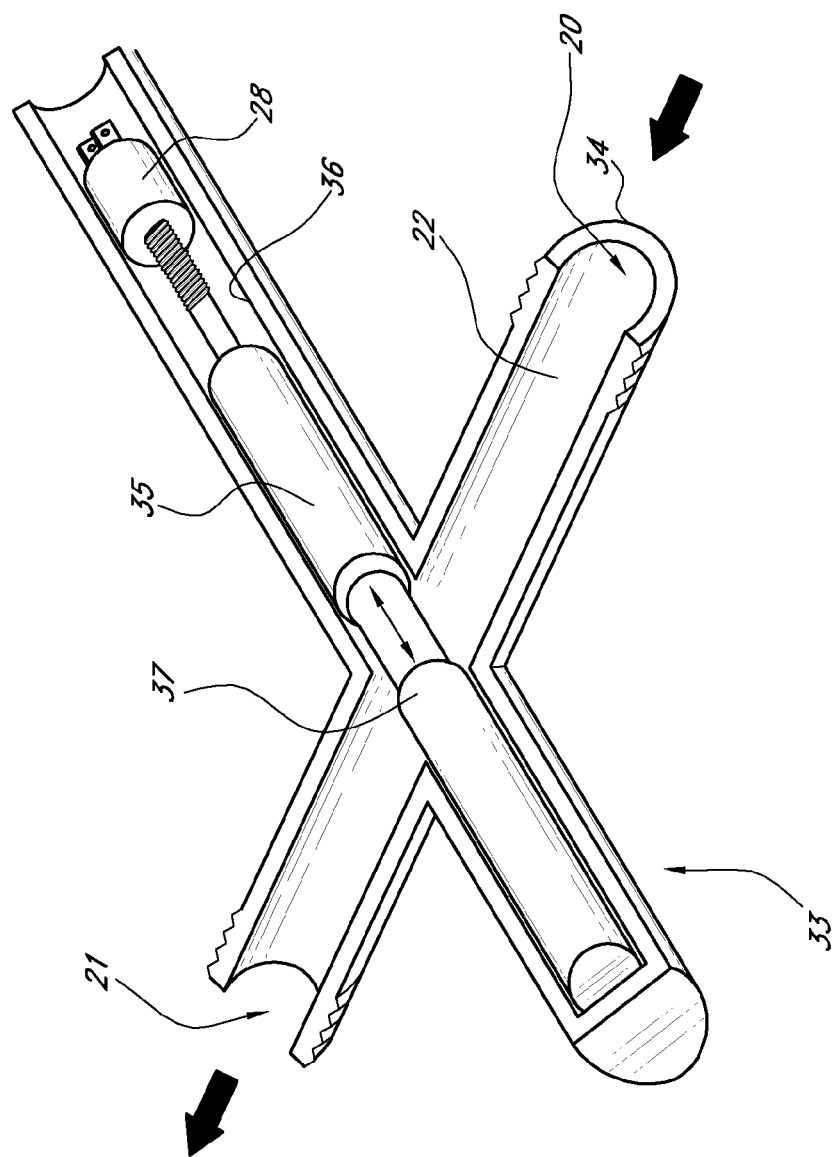
FIG. 5 is a partially cut-away perspective view of another embodiment of a valve for regulating fluid flow rate.
Figure 6:
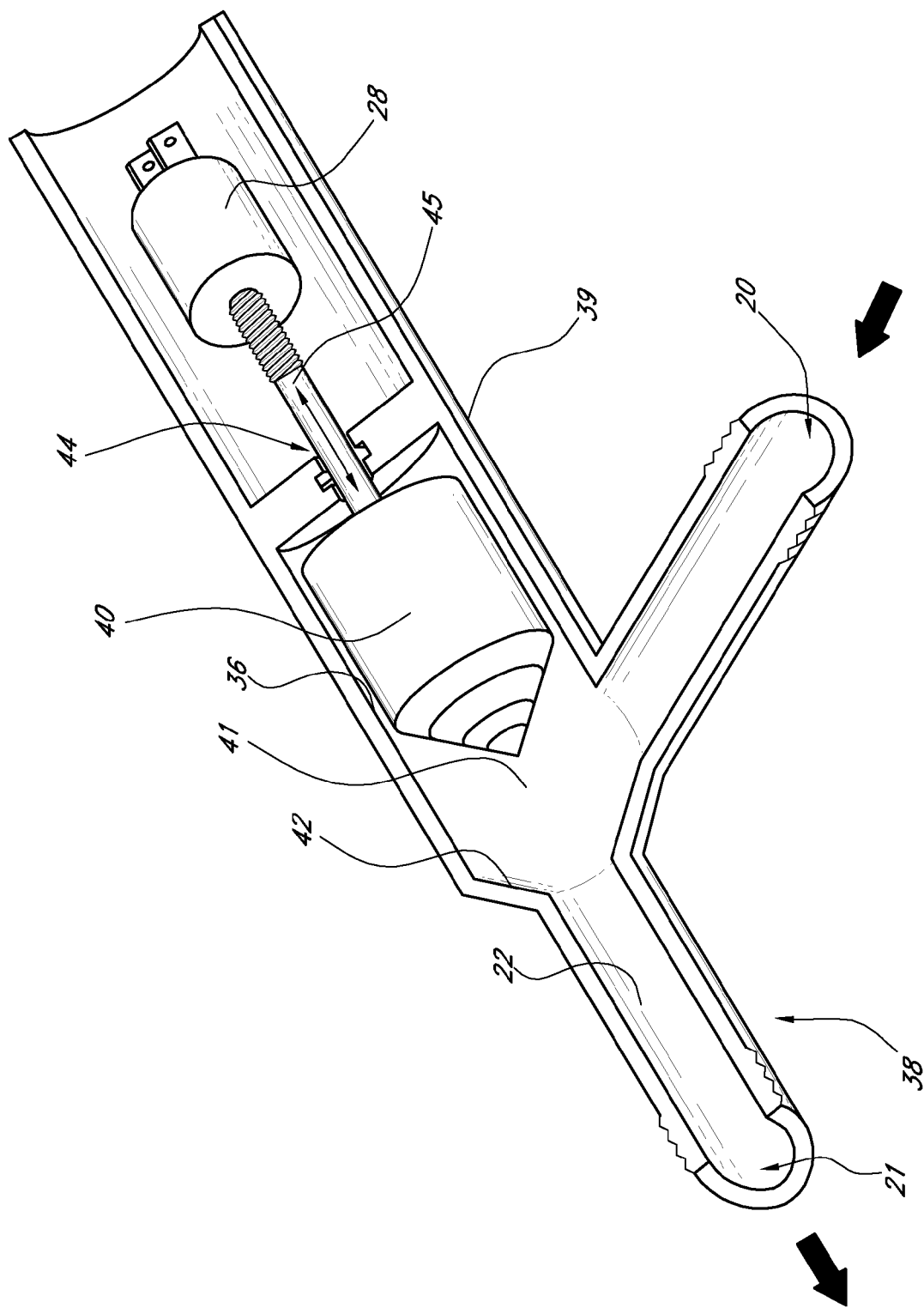
FIG. 6 is a partially cut-away perspective view of still another embodiment of a valve for regulating fluid flow rate.

For example, FIGS. 4-6 show embodiments of valves that are capable of occupying stable intermediate positions as described above. Skilled artisans will understand that these embodiments are merely exemplary and a wide variety of alternative valve configurations are possible. FIG. 4 is a partially cut-away view of a valve 25 comprising a housing 26, an inlet 20, an outlet 21, a rotatable valve body 27, and a worm gear 29. The housing 26 includes a chamber 30 tightly (and preferably in fluid-sealing engagement) enclosing a main portion of the valve body 27 in a manner allowing the body 27 to rotate about an axis transverse to the longitudinal axis of the housing 26. The body 27 includes a passage 31. As the body 27 rotates, the flow restricting behavior of the body 27 varies. In a maximum flow position of the body 27 (shown in FIG. 4), the passage 31 is substantially aligned with the inlet 20 and the outlet 21, such that fluid flow is substantially unimpeded by the valve 25. In this position, fluid flows through the valve 25 at a maximum rate. As the body rotates in either direction, the body 27 becomes more of a flow restriction, and the fluid flows through the valve at progressively lower rates. The body 27 can be further rotated so that the passage 31 is no longer in fluid communication with the inlet 20 or the outlet 21 (e.g., with the valve body 27 rotated 90° from the position of FIG. 4). In this completely closed position, the valve 25 substantially completely blocks fluid flow. The illustrated body 27 includes a gear 32 engaged with the worm gear 29. The motor 28 is coupled with respect to the worm gear 29 to rotate the body 27, as will be understood by skilled artisans. It will be appreciated that the motor 28, worm gear 29, and gear 32 may comprise a valve control unit, as described above.

FIG. 5 is a partially cut-away view of a valve 33 comprising a housing 34, an inlet 20, an outlet 21, a spool 35, and a motor 28. The housing 34 includes a spool passage 36 and a fluid flow path 22. The spool 35 is positioned tightly (preferably in fluid-sealing engagement) within the spool passage 36, as known in the spool valve art. The spool 35 includes a lower diameter portion 37. The motor 28 is coupled with respect to the spool 35 to move the spool axially within the passage 36, such as via a leadscrew engaged within an axial slot (not shown). The flow-restricting behavior of the valve 33 varies as the spool 35 moves axially. The spool 35 has a maximum flow position (shown in FIG. 5) in which the portion 37 is substantially aligned with the flow path 22. In this position, fluid flows through the valve 33 at a maximum rate. Note that fluid flow along the flow path 22 is not unimpeded when the valve 33 is in its maximum flow position, as the portion 37 partially impedes the flow. As the spool 35 moves axially, the portion 37 moves away from the flow path 22, and a larger diameter portion of the spool 35 partially blocks the fluid flow. Eventually, continued axial movement of the spool 35 causes the larger diameter portion of the spool to substantially completely block fluid flow from the inlet 20 to the outlet 21. This corresponds to a completely closed position of the valve 33. It will be appreciated that the motor 28 and mechanism for moving the spool 35 may comprise a valve control unit, as described above.

FIG. 6 is a partially cut-away view of a valve 38 comprising a housing 39, an inlet 20, an outlet 21, a spool 40, and a motor 28. Similar to the valve 33 shown in FIG. 5, the spool 40 is positioned tightly (preferably in fluid-sealing engagement) within a spool passage 36, as known in the spool valve art. The spool 40 includes an end surface 41 (in the illustrated embodiment, a conical surface) configured to sealingly engage a bearing surface 42 of the housing 39. The motor 28 is coupled with respect to the spool 40 to move the spool axially within the passage 36, as described above. The housing 39 includes a divider wall 43 between a main portion of the spool 40 and the motor 28. The divider wall 43 includes a through-passage 44 that allows pass-through of a stem 45 of the spool 40, the stem 45 mechanically coupling the end portion of the spool 40 to the motor 28. Preferably, a seal is formed between the stem 45 and the passage 44 (e.g., via an O-ring). The flow-restricting behavior of the valve 38 varies as the spool 40 moves axially. The spool 40 has a maximum flow position when the end surface 41 is retracted far enough from the bearing surface 42 so that the spool 40 does not limit fluid flow beyond the extent to which the flow is limited by the cross-sectional areas of the conduits of the inlet 20 and the outlet 21. In this position, fluid flows through the valve 38 at a maximum rate. As the spool 40 moves axially toward the bearing surface 42, it progressively restricts the flow. Eventually, continued axial movement of the spool 40 causes the end surface 41 to form a seal with the bearing surface 42 to substantially completely block fluid flow from the inlet 20 to the outlet 21. This corresponds to a completely closed position of the valve 38. It will be appreciated that the motor 28 and the mechanism for moving the spool 40 may comprise a valve control unit, as described above.

FIG. 7 shows an example embodiment of a flow controller 3 comprising a valve system 46 comprising a plurality of valves 47, 48. The flow controller 3 includes a fluid inlet 20, a fluid outlet 21, a flow path 22 between the inlet 20 and the outlet 21, and the valve system 46. In FIG. 7, a hose is shown fluidly coupled to the outlet 21. In the illustrated embodiment, the valve system 46 comprises a first valve 47 and a second valve 48 positioned in series with one another along the flow path 22. However, skilled artisans will appreciate that additional valves can be provided. Preferably, both of the valves 47 and 48 are electronically controllable, such as by the controller 10 (FIG. 1). Further, as described in greater detail below, the controller 10 can be configured to move the valves 47 and 48 in accordance with instructions stored in the memory 12. Moreover, the user interface 6 and/or the remote control 7 can be configured to receive user instructions for future movements of the valves 47 and 48, which instructions can be stored in the memory 12.

In a preferred embodiment, the first valve 47 of FIG. 7 is configured to have only two positions: an open position in which the valve 47 permits fluid flow through itself, and a closed position in which the valve 47 substantially completely blocks fluid flow through itself. For example, the first valve 47 can be a solenoid valve. The first valve 47 can be used to control the on/off aspect of the valve system 46. In one embodiment, the first valve 47 in its open position permits substantially unimpeded fluid flow through itself, while in another embodiment the fluid flow is still somewhat impeded when the valve 47 is in the open position.

With continued reference to FIG. 7, the second valve 48 is preferably configured to permit a degree of control of the rate of fluid flow through the valve system 46, beyond merely turning the flow on and off. Accordingly, the second valve 48 preferably has a maximum flow position in which the valve 48 permits a maximum rate of fluid flow through itself. In one embodiment, the second valve in its maximum flow position permits substantially unimpeded fluid flow through itself, while in another embodiment the fluid flow is still somewhat impeded in the valve's maximum flow position. The second valve 48 preferably also has one or more stable partially open positions in which the valve 48 permits fluid flow through itself at different rates less than said maximum flow rate associated with the maximum flow position. For example, the second valve 48 may comprise one of the valves 25, 33, or 38 shown in FIGS. 4, 5, and 6, respectively. In the illustrated embodiment, the second valve 48 comprises the valve 25 shown in FIG. 4. Alternatively, the second valve 48 may comprise any of a wide variety of other types of valves capable of a degree of control of fluid flow rate beyond merely turning the flow on and off.

In one embodiment, the one or more partially open positions of the second valve 48 include (1) a 25% open position in which the valve 48 permits a fluid flow rate through itself of approximately 25% of the maximum flow rate; (2) a 50% open position in which the valve 48 permits a fluid flow rate through itself of approximately 50% of the maximum flow rate; and (3) a 75% open position in which the valve 48 permits a fluid flow rate through itself of approximately 75% of the maximum flow rate. Many other partially open positions and intermediate flow rates are possible. For example, the intermediate flow rates can comprise increments of 10% (i.e., 10% flow, 20% flow, 30% flow, 40% flow, 50% flow, 60% flow, 70% flow, 80% flow, and 90% flow). In another embodiment, the intermediate flow rates can comprise increments of 5%. In other embodiments, the second valve 48 can permit relatively continuously adjustable flow, as opposed to discrete flow rate increments.

In a preferred embodiment, the second valve 48 does not have a position in which the second valve 48 is completely closed (e.g., always allowing some amount of fluid to flow through the second valve 48). In certain such embodiments, the second valve 48 includes a structure, such as a mechanical stop, that prevents the second valve from completely closing. For example, the valve 25 of FIG. 4 can include a mechanical stop that prevents the gear 32 and valve body 27 from rotating to a position at which the passage 31 is no longer in fluid communication with the inlet 20 and the outlet 21. As another example, the valves 33, 38 of FIGS. 5, 6 can include a mechanical stop in the spool passage 36, the stop preventing the spool 35, 40 from sliding axially to a position in which the inlet 20 is no longer in fluid communication with the outlet 21. Skilled artisans will understand that mechanical stops can be provided in a variety of different types of valves for preventing the valve from completely closing. In some embodiments, the valve system 46 comprises control logic configured to limit operation of the second valve 48 based on the position of the first valve 47. For example, the second valve 48 might only be operable when the first valve 47 is in an open position. In some embodiments, the valve system 46 comprises control logic configured to limit operation of the first valve 47 based on the position of the second valve 48.

One advantage of providing the valves 47 and 48 is that the valve system 46 has the ability to regulate fluid flow rate to values between about 0% and 100% of the maximum allowable flow rate, while avoiding the need for a relatively high power load. The first valve 47 provides the on/off functionality and can be operated by a low power electromechanical device, such as a solenoid. The second valve 48 regulates fluid flow rate, but can be configured to never completely close. During fluid flow, the power required to move the second valve 48 among partial flow positions is relatively low compared to the power required to completely close the valve 48. This is because it takes more energy to completely stop the flowing fluid than to merely restrict the flow. For example, the motor 28 of the valves 25, 33, and 38 of FIGS. 4, 5, and 6, respectively, requires much more power to close the valve than to move the valve to a partial flow position. Advantageously, the dual valve system 46 of FIG. 7 preferably includes a first low power valve 47 for opening and completely closing and a second low power valve 48 for regulating flow among partial flow positions. In some embodiments, the second valve 48 uses less power than the first valve 47 such that a motor 28 controlling the second valve 48 may be small. Such embodiments may reduce power consumption of the valve system 46 because operation of smaller motors generally uses less energy than operation of motors for adjustable valves that are not in series with an on/off valve. Such embodiments may reduce the size of the second valve 48, which can facilitate disposing the second valve 48 at certain positions, for example proximate to the remote control 7.

Programmable User Instructions

As noted above, the user instructions for future control of the reel 2 and/or flow controller 3 can be stored in the memory 12. For example, FIGS. 8-12 illustrate embodiments of representational data structures for storing user instructions for future valve movements and motor movements. In a preferred embodiment, these data structures store user instructions for future movements of the motor 9 (FIG. 1) and one or more valves of the flow controller 3 of the hose reel system 1. In the illustrated embodiments, temporal data is stored in terms of minutes, but skilled artisans will understand that temporal data can be stored in other units, such as seconds, hours, or fractions thereof. Further, the illustrated embodiments only provide representational examples of data structure formats, and skilled artisans can readily implement a variety of different methods for storing the user instructions in an electronically accessible memory 12.

FIG. 8 shows a data structure 863 including a first array of time data and a second array of corresponding user instructions for a condition of a valve. In one embodiment, the valve associated with data structure 863 is one that is capable of occupying only two positions: open and closed. For example, the valve of data structure 863 can be similar to valve 47 of FIG. 7, either alone or in combination with another valve (such as valve 48 of FIG. 7). In the example data set of the illustrated data structure 863, the user has instructed that the valve is to be closed for an initial 15 minutes (minutes 0-15), then open for 15 minutes (minutes 15-30), then closed for 210 minutes (minutes 30-240), then open for 15 minutes (minutes 240-255), and then closed for 345 minutes (minutes 255-600).

FIG. 9 shows a data structure 64 including a first array of time data and a second array of corresponding user instructions for a condition of a valve. In this embodiment, the valve associated with data structure 64 is capable of occupying a plurality of partially open positions, as described above. For example, the valve may be similar to the valves 25, 33, and 38 of FIGS. 4, 5, and 6, respectively. In the example data set of the illustrated data structure 863, the user has instructed that the valve is to be closed for an initial 15 minutes (minutes 0-15), then 100% open for 15 minutes (minutes 15-30), then closed for 210 minutes (minutes 30-240), then 50% open for 15 minutes (minutes 240-255), and then closed for 345 minutes (minutes 255-600). In this particular example, the user has instructed the hose reel system 1 to water an area for 15 minutes at a full flow rate and then, 3.5 hours later, to water the area for an additional 15 minutes at about half the full flow rate.

FIG. 10 shows a data structure 65 including a first array of time data, a second array of user instructions for a corresponding condition of a first valve, and a third array of user instructions for a corresponding condition of a second valve. In this embodiment, the first valve may be capable of occupying only open and closed positions, and the second valve may be capable of occupying a plurality of partially open positions, as described above. For example, the first and second valves can be similar to the valves 47 and 48 of FIG. 7, respectively. In the example data set of the illustrated data structure 65, the user has instructed that, during an initial 15 minutes (minutes 0-15), the first valve is to be closed. The reader will appreciate that there is no need to provide a corresponding instruction for the second valve, as the flow through the valve system is substantially completely shut-off when the first valve is closed. In one embodiment, the second valve has a default position (e.g., closed or 100% open) when the first valve occupies its closed position. In another embodiment, the second valve simply retains its prior position when the first valve is moved to its closed position. With continued reference to the example data set of the illustrated data structure 65, the user has instructed that, after the initial 15 minutes, the first valve is to open and the second valve is to open 100% for the next 15 minutes (minutes 15-30). Then the first valve is to be closed for 210 minutes (minutes 30-240). Then the first valve is to open and the second valve is to open 50% for 15 minutes (minutes 240-255). Finally, the first valve is to close for the next 345 minutes (minutes 255-600).

FIG. 11 shows a data structure 66 including a first array of time data and a second array of corresponding user instructions for operations of a motor associated with a hose reel, such as the reel 2 comprising a motor 9 and a rotatable element 8 (FIG. 1). In the example data set of the illustrated data structure 66, the user has instructed that the motor is to wind in 10 feet of hose at minute 15, then wind in another 20 feet of hose at minute 30, and then wind in another 15 feet of hose at minute 40. Advantages of programming future winding operations of the hose reel will become apparent below. While not illustrated in FIG. 11, the stored user instructions can also include instructions for the speed and direction (e.g., "wind" or "dispense") of rotation of the motor 9 or the rotatable element 8 of the reel 2.

FIG. 12 shows a data structure 67 including a first array of time data and a second array of operations of a valve system (such as the flow controller 3 of FIG. 1) and a motor of a hose reel (such as the motor 9 of the reel 2). In the example data set of the illustrated data structure 67, the user has provided the following instructions. During minutes 0-15, the valve system is to be 100% open, reflecting that the user wants to water a first area at a full flow rate. Then, during minutes 15-20, the valve system is to be closed. At minute 15, the motor is to wind in 10 feet of hose, reflecting that the user wants to subsequently water a second area. During minutes 20-30, the valve system is to be 25% open, reflecting that the user wants to water the second area at a significantly reduced flow rate. For example, the second area may be sensitive to over-watering. During minutes 30-31, the valve system is to be closed. At minute 30, the motor is to wind in another 20 feet of hose, reflecting that the user wants to water a third area. During minutes 31-40, the valve system is to be 50% open, reflecting again that the user wants to water the third area at a reduced rate. At minute 40, the valve system is to be closed. It will be appreciated that many other sequences of valve and motor movements can be programmed and stored in the memory 12.

Remote Control

While most of the remainder of this specification refers to a "programming device," note that the programming device can also be used for real-time control. For example, the user interface 6 (FIG. 1) and/or the remote control 7 can provide real-time control or programming of, for example, the reel 2 and/or the flow controller 3. Accordingly, the discussion below of the functionality of the remote control 7 or remote control programming devices 100, 101 can also be provided in user interface 6.

Figure 13B:
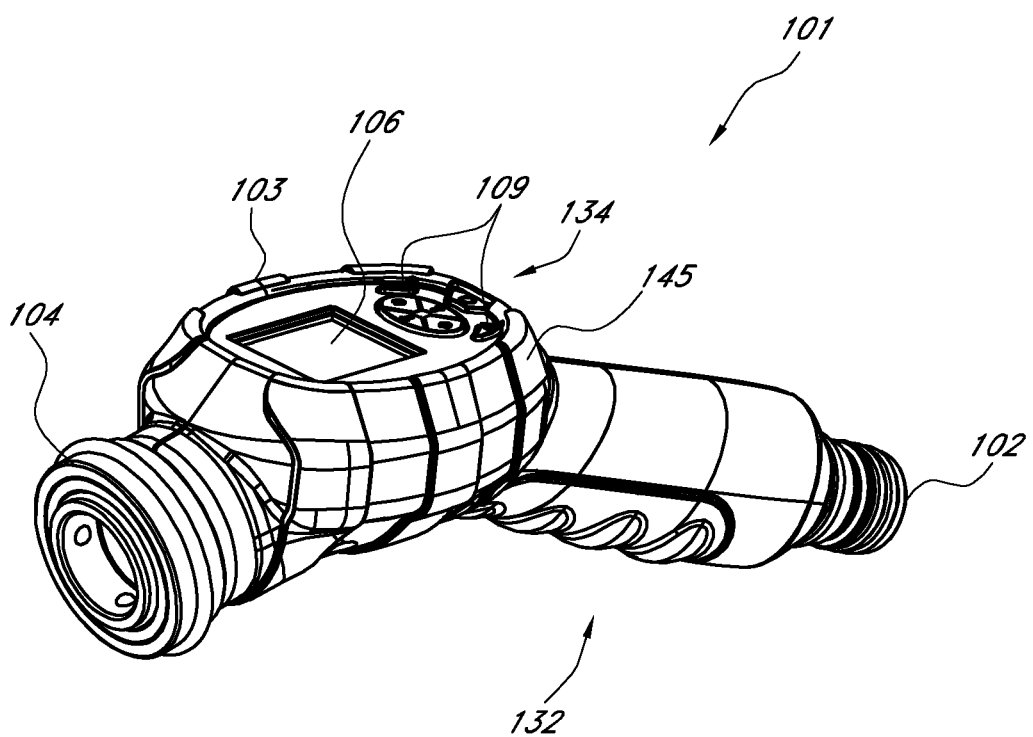
FIG. 13B illustrates a top perspective view of another example programming device for a hose reel apparatus.

In a preferred embodiment, the remote control 7 and/or user interface 6 (FIG. 1) can allow a user to program operations of the reel 2 and/or the flow controller 3. FIGS. 13A-13D illustrate example embodiments of remote controls 7 for use with devices associated with the hose 5, such as the reel 2 and/or the flow controller 3. FIG. 13A is a perspective view of an example embodiment of a remote control programming device 100 for use with a programmable hose reel. The programming device 100 comprises a first end 102 configured to be selectively and removably fluidly attached to and detached from a distal end of a hose (e.g., a hose 5 partially spooled onto and extending from a hose reel 2, as shown in FIG. 1). In certain embodiments, the size of the connection 102 can be adapted for various hose sizes. The programming device 100 further comprises a second end 104 configured to be selectively and removably fluidly attached to and detached from a distal end of another hose or an attachment such as a sprinkler or nozzle (e.g., pressure nozzle). Alternatively, the second end 104 may itself be used as a watering device. For example, the programming device 100 may be integrated with a nozzle at the second end 104. In certain embodiments, the programming device 100 comprises a valve between the first end 102 and the second end 104 (e.g., to reduce the flow of fluid therethrough by ¼, ½, ¾, or entirely).

A front portion of the programming device 100 comprises a display 106 (e.g., comprising light emitting diodes, liquid crystal display cells, and the like). The surface of the display 106 may be covered by a replaceable transparent face (e.g., a sturdy piece of plastic, glass, etc.) in order to enhance its durability in an outdoor environment. The front portion further comprises a plurality of buttons 108, which are described in further detail below. The programming device 100 is preferably waterproof, such that water cannot disturb the internal electronics. In certain embodiments, the display 106 is water resistant to a depth of at least about 20 feet, a depth of between about 8 feet and 20 feet, or a depth of between about 8 feet and 15 feet, for example by using sealing means such as double o-rings.

FIG. 13B illustrates a perspective view of another example embodiment of a remote control programming device 101 for use with a programmable hose reel. The programming device 101 comprises a first end 102 configured to be selectively and removably fluidly attached to and detached from a distal end of a hose (e.g., a hose 5 partially spooled onto and extending from a hose reel 2, as shown in FIG. 1). The distal end of components described herein may comprise a plurality of o-rings in order to reduce leakage. In certain embodiments, the size of the connection 102 can be adapted for various hose sizes. The programming device 101 further comprises a second end 104 configured to be selectively and removably fluidly attached to and detached from a distal end of another hose or an attachment such as a sprinkler or nozzle (e.g., pressure nozzle). Alternatively, the second end 104 may itself be used as a watering device. For example, the programming device 101 may be integrated with a nozzle at the second end 104. A front portion of the programming device 101 comprises a display 106 (e.g., comprising light emitting diodes, liquid crystal display cells, and the like).

The remote control programming device 101 may be configured such that the surface of the display 106 generally does not contact a ground surface when the programming device 101 is dragged along the ground surface by a hose attached to the proximal end of the programming device 101. For example, the surface of the display 106 may be covered by a replaceable transparent face (e.g., a sturdy piece of plastic, glass, etc.) in order to enhance its durability in an outdoor environment. The front portion further comprises a plurality of buttons 109, which are described in further detail below. For another example, the surface of the display 106 may be recessed within the remote control programming device 101 (e.g., the surface of the display 106 may be disposed lower than one or more protrusions 103). In some embodiments, the protrusions 103 comprise a ring protruding above and around the display 106 and the buttons 109. The programming device 101 is preferably waterproof, such that water cannot disturb the internal electronics.

The programming device 101 comprises a handle portion 132 and an interface portion 134. The interface portion 134 is preferably accessible to at least one finger of a user when a hand of the user grasps the handle portion 132. For example, the fingers of a hand may wrap around the handle portion 132, leaving the thumb of the same hand available to operate the buttons 109. Such operation may leave another hand of the user free to perform another function, such as holding a program to be entered, spreading seed or fertilizer, operating a manual valve, attaching and detaching nozzles, hoses, etc., and the like. Manipulation of the buttons 109 by a finger (e.g., thumb) of a hand grasping the handle portion 132 also preferably does not obstruct the display 106.

In certain embodiments, the programming device 100, 101 comprises a receiver configured to receive wireless data signals from a hose-related device such as a reel or a valve system. In some embodiments, the receiver of the programming device 100, 101 is configured to adapt the wireless instructions for controlling the hose-related device based on the wireless data signal received from the hose-related device. In certain such embodiments, this synchronization acts as a security measure. For example, the device and the programming device 100, 101 may be synchronized to only work with each other and not any other devices or programming devices. In certain embodiments, once a programming device 100, 101 is paired with a device associated with the hose, the programming device 100, 101 will only synchronize with the paired device associated with the hose, and the device associated with the hose will only synchronize with the paired programming device 100, 101 unless a security code is entered to release the devices from that pairing. In some embodiments, interaction between the programming device 100, 101 and the hose-related device allows the programming device 100, 101 to discover controllable local hose-related devices. In embodiments in which the programming device 100, 101 is removable and comprises a receiver, the programming device 100, 101 can be attached to a first apparatus (e.g., a hose reel and valve system in a front yard), used to program or otherwise control the first apparatus, removed from the first apparatus, and attached to a second apparatus (e.g., a hose reel and valve system in a back yard) while the first apparatus is executing the programmed instructions. Similarly, a programming device 100, 101 comprising a receiver is replaceable if the programming device 100, 101 (or a handheld element to which the programming device 100, 101 is attached or integrated) becomes lost, stolen, or damaged.

Figure 13C:
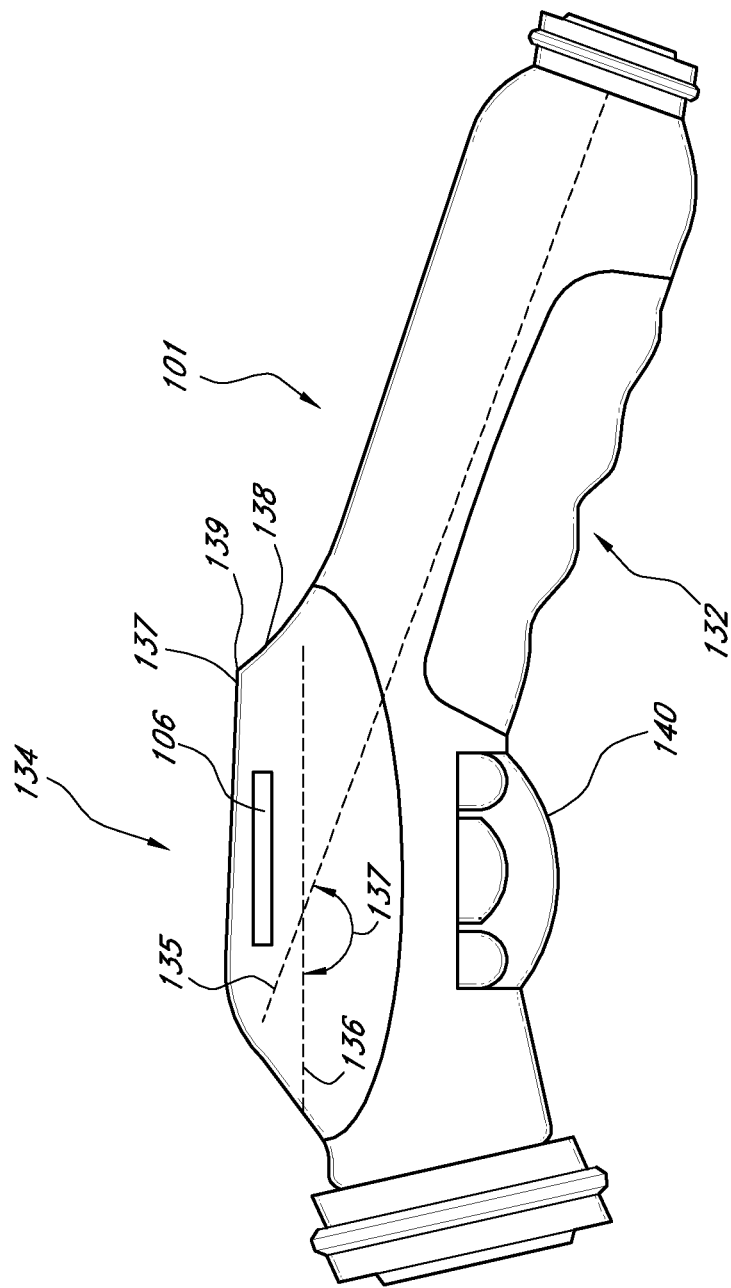
FIG. 13C illustrates a side elevational view of an example embodiment of the programming device of FIG. 13B.

In certain embodiments, the programming device 101 comprises a valve between the first end 102 and the second end 104 (e.g., to reduce the flow of fluid therethrough by ¼, ½, ¾, or entirely). As illustrated in FIG. 13C, the remote control programming device 101 comprises an elongated handle portion 132 (e.g., being elongated so as to be graspable by a user's hand) along an axis 135 and an elongated display portion 134 along an axis 136. The handle portion 132 may include contours configured to engage a plurality of fingers. The display portion 134 includes the display 106 (shown recessed with respect to surrounding structure). The display portion 134 is preferably oriented at an angle 137 with respect to the handle portion 132. The display portion 134 has a proximal end 137 connected to a distal end 138 of the handle portion 132 at a vertex 139 pointing in a direction 133. The display 106 generally faces the direction 133 because the angle 137 is oblique (i.e., greater than 90°), and also because the display 106 us on the upper surface of the display portion 134, as opposed to a side or bottom surface thereof. In certain embodiments, the angle 137 is between about 120 and 165 degrees. When the proximal end 102 of the programming device 101 is attached to a hose that is dragged along the ground (e.g., due to being pulled by a hose reel), the handle portion 132 and thus the axis 135 will generally be parallel to the ground surface. Even if the direction 133 points downward to the ground surface, the surface of the display 106, which is preferably generally parallel to the axis 136, is angled away from the ground such it does not contact the ground surface, thereby reducing damage.

The illustrated elongated programming device 101 comprises a plurality of generally coplanar elongated portions, including a handle portion 132 and a display portion 134 oriented at an angle 137 to each other, such that the orientation of the programming device 101 changes from the proximal end 102 to the distal end 104 and in which a plane defined by the display 106 is generally transverse to the plane defined by the elongated portions 132, 134 and in which the display 106 faces a direction that is generally parallel to the plane defined by the elongated portions 132, 134. The programming device 101 may comprise further elongated portions generally along the plane defined by the axes 135, 136. In alternative embodiments, the programming device may comprise one or more coplanar arcuate portions. The most stable position of the programming device 101 will be that in which the plane is generally parallel to the ground surface. In embodiments in which the programming device 101 comprises a handle portion 132 and a display portion 134, the direction 133 will also tend to be parallel to the ground surface. Thus, the display 106, which faces generally in the direction 133, is substantially prevented from facing the ground surface. In other embodiments, the display 106 also faces generally non-parallel to the ground surface in the most stable position of the programming device 101 because the direction in which the display 106 faces is generally transverse to the plane defined by the plurality of elongated portions or the one or more arcuate portions.

The embodiment of the remote control programming device 101 illustrated in FIG. 13C also illustrates a manual valve controller 140 disposed proximate to the handle portion 132 and on a side of the display portion opposite to the display 106. It will be appreciated that the manual valve controller 140 may be disposed anywhere on the programming device 101. FIG. 13D shows that the manual valve controller 140 is configured to rotate about an axis transverse (e.g., perpendicular) to the axis 135. Upon rotation of the manual valve controller 140, a valve disposed within the programming device 101 may be turned on, turned off, or have a flowrate adjusted, as described above.

Referring again to FIG. 13B, a shock absorbing overmold 145 may be disposed around the programming device 101 or a portion thereof. The overmold 145 preferably substantially surrounds the display portion 134, although the overmold 145 may cover some or all of the handle portion 132. The overmold 145 may comprise rubber, silicone, and the like. The overmold 145 may be replaceable or may be integrated with the programming device 101. In certain embodiments, the overmold 145 is configured to absorb an amount of shock due to the programming device 101 being dropped (from a height of about 3 to 4 feet) and due to being dragged along the ground or other surfaces. For example, the overmold 145 may be configured to absorb shocks of about 9 times the force of gravity. In some embodiments, the overmold 145 extends above the display 106 to provide clearance so that the display 106 will not contact the ground or another surface when the programming device 101 is dropped or dragged. In some embodiments, the overmold 145 extends above the buttons 109 to provide clearance so that the buttons 109 will not contact the ground or another surface when the programming device 101 is dropped or dragged. Overmolds are also possible for other components described herein (e.g., the programming device 100, other remote controls 7, nozzles, valve units, etc.). For example, in some embodiments the overmold 145 covers the display portion 134, including the display 106 and the buttons 109. In certain such embodiments, the overmold 145 includes a window through which to view the display 106 and/or indicia of the covered buttons 109.

In certain alternative embodiments, the programming device does not convey fluid. For example, the programming device may consist essentially of the display 106, the buttons 108, the housing, and any associated electronics from the programming device 100, 101 (i.e., not having a fluid flow path). Such a programming device may or may not be configured to be secured to a hose. Also, the user interface 6 can include the functionality of the programming device 100, 101, in which case a separate device 100, 101 can be omitted from the design. As still another example, the programming device may comprise a personal computer, a handheld apparatus, or the like (e.g., as described above).

Figure 14:
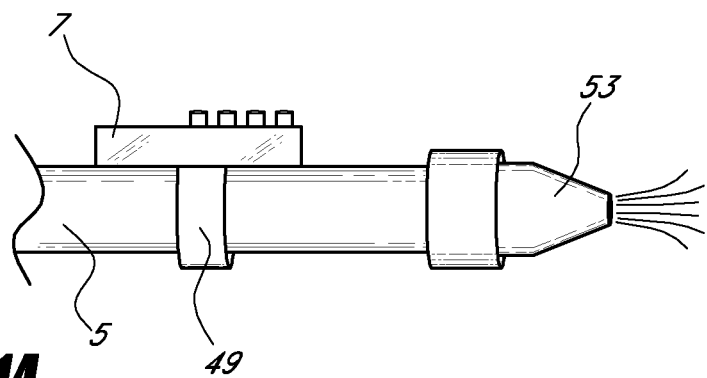
FIG. 14 is a side view of a hose having a remote control attached by an attachment band.

With reference to FIGS. 1, 13A, and 13B, the remote control 7 or the programming device 100, 101 preferably includes an attachment structure for selectively and removably fluidly attaching and detaching the remote control to the hose 5. For example, FIG. 14 is a side-elevational view of a remote control 7 secured to a hose 5 by a hose attachment structure comprising an attachment band 49 configured to tightly encircle and strap onto the hose. The band 49 can include a buckle, Velcro, or other means for securing the band 49. The hose 5 includes a nozzle 53 configured to spray fluid conveyed through the hose 5.

Figure 16A:
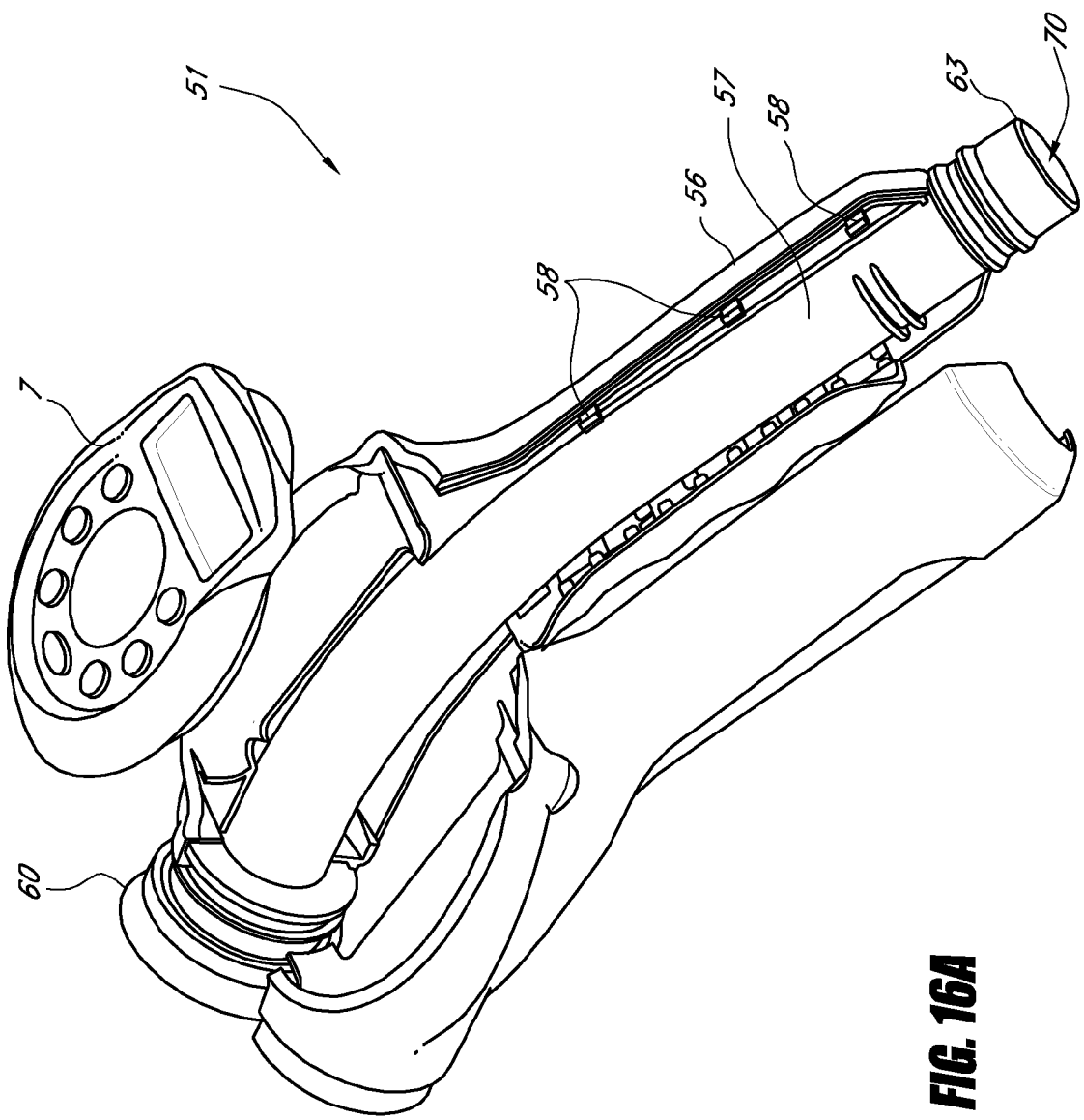
FIG. 16A is an exploded perspective view of a main body portion of the nozzle unit of FIG. 15A.
Figure 16B:
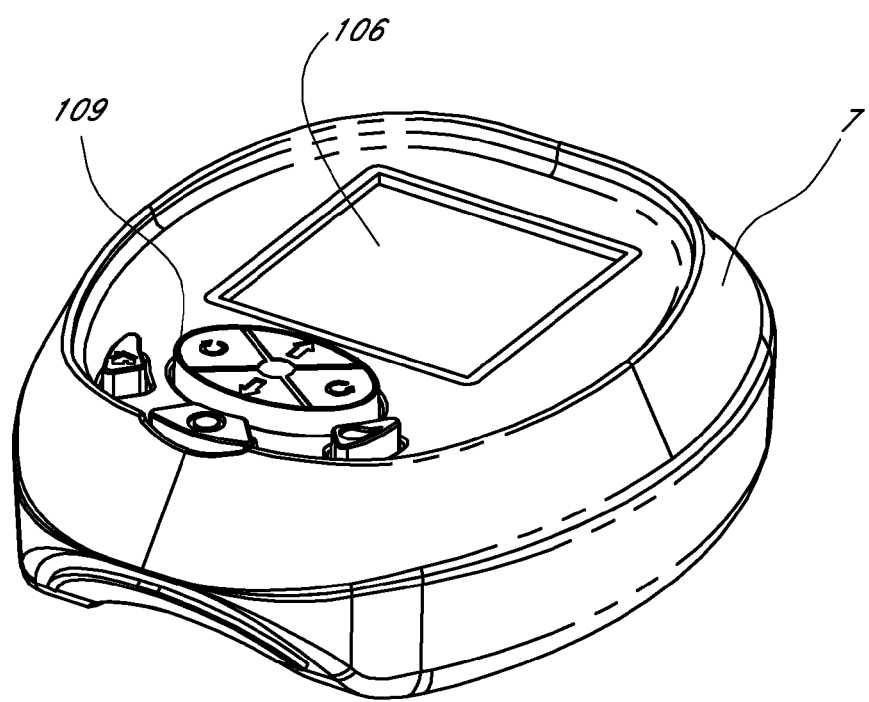
FIG. 16B is a perspective view of an example embodiment of a remote control.
Figure 17:
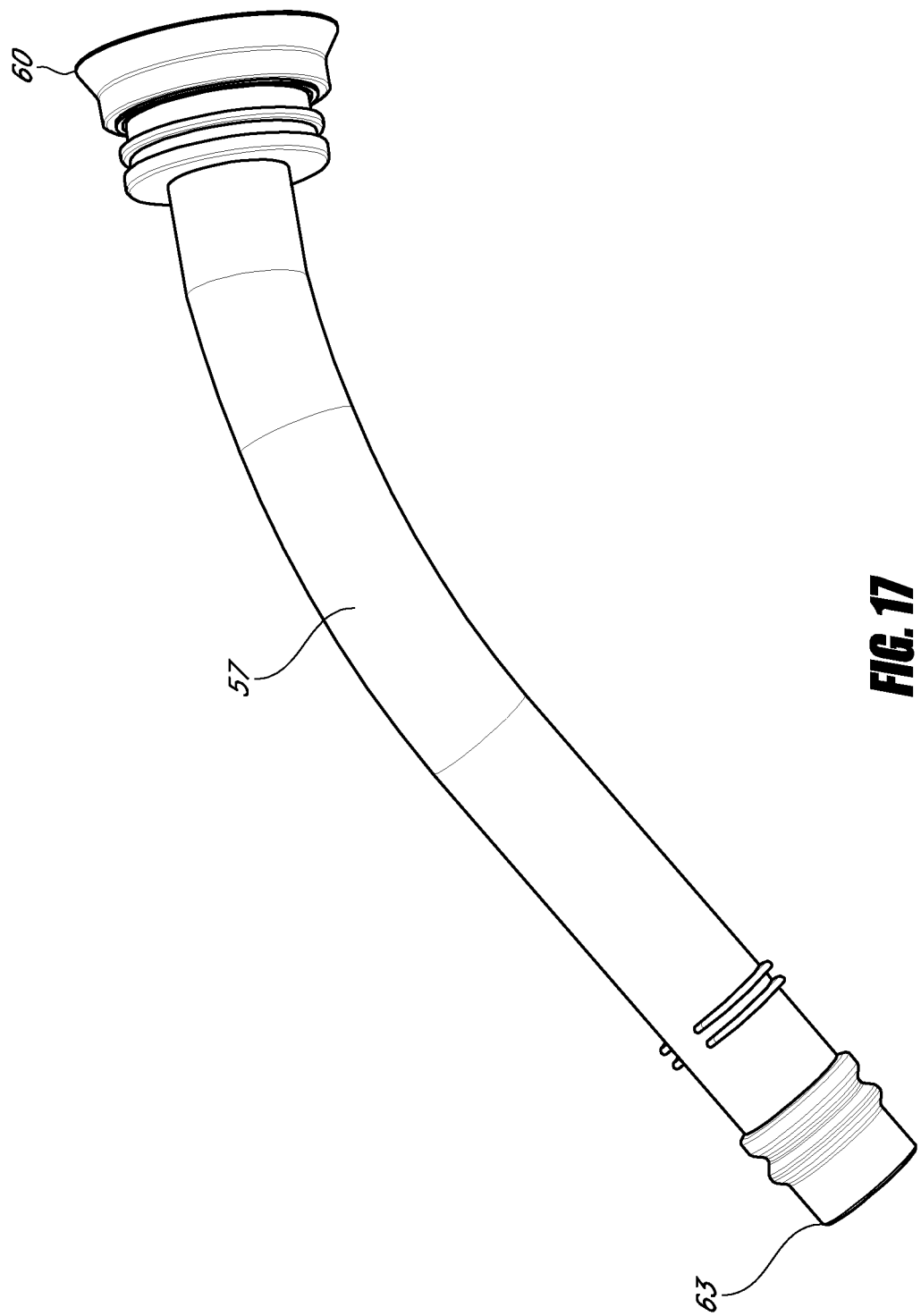
FIG. 17 is a perspective view of an interior fluid-conveying tube of the main body portion of FIG. 16A.

FIGS. 15-17 show an embodiment of a remote control 7 (which can comprise a programming device 100 described above) having another type of attachment structure for selectively and removably fluidly attaching and detaching the remote control 7 with respect to a hose. In particular, the attachment structure of the embodiment of FIGS. 15-17 may include one or more fittings for fluid attachment to a distal end of a hose. With reference to FIG. 15, the illustrated remote control 7 is part of a nozzle unit 50 comprising a main body portion 51, a valve unit 52, and a nozzle 53. Thus, the entire nozzle unit 50 can be considered a remote control unit having an attachment structure for selective and removable fluid attachment to a hose. The elements of a preferred embodiment of the nozzle unit 50 are now described.

The main body portion 51 is a handheld element, in that it includes a handle portion 54 that can be grasped by a user's hand. The main body portion 51 thus provides a convenient means for control of the hose. When the main body portion 51 is secured to the valve unit 52 and/or the nozzle 53, the entire nozzle unit 50 can likewise be considered a handheld element. The main body portion 51 also preferably includes a remote control interface portion 55 (described in further detail below), which is preferably accessible to one or more of the user's fingers (e.g., a thumb) when the user grasps the handle portion 54 by hand. FIG. 16A shows an example embodiment of an exploded view of the main body portion 51, which comprises a housing 56, a fluid-conveying tube 57, and the remote control 7. In the illustrated embodiment, the housing 56 includes a pair of housing portions that may be affixed together such that they substantially enclose the tube 57. For example, one of the housing portions may include snap-fit engagement flanges 58 configured to snap into and engage corresponding recesses or grooves in the other housing portion, such that the two housing portions snap together. Of course, alternative engagement structures can be provided (e.g., screws, nuts and bolts, and the like). The tube 57 is configured to convey fluid through the main body portion 51. Preferably, fluid attachment of the main body portion 51 to another element involves attachment such that the tube 57 fluidly communicates with said other element.

Similarly, the remote control 7 can include snap-fit engagement flanges configured to snap into and engage corresponding recesses or grooves in the housing 56. Of course, a wide variety of alternative engagement structures can be provided for selectively and removably fluidly attaching the remote control 7 to the housing 56. Thus, the remote control 7 is preferably integrated with the main body portion 51 and the nozzle unit 50 as a whole. In this sense, the term "integrated" encompasses embodiments in which the remote control 7 is at least partially integrally formed with the main body portion 51, as well as embodiments in which the remote control 7 is formed separately and attached to the main body portion 51. FIG. 16B illustrates an example embodiment of a remote control 7 that can be attached to or integrated with the housing 56. The remote control 7 preferably contains electronics such as a wireless transmitter and a processor configured to translate operation of the buttons 109 and to drive the display 106.

Although certain components described herein are selectively and removably fluidly attached to and detached from certain other components, it will be appreciated that, in alternative embodiments, the components may be integrally or non-removably attached. For example, the programming devices 100, 101 may comprise a first end 102 permanently fluidly attached to the distal end of a hose.

With continued reference to FIG. 15, the nozzle 53 is preferably formed separately from the main body portion 51. In particular, the nozzle 53 preferably has a proximal end 59 configured to be selectively and removably fluidly attached to and detached from a distal end 60 of the main body portion 51, preferably such that the nozzle 53 receives fluid flow from the tube 57 (FIGS. 16A and 17). The illustrated nozzle 53 includes a distal end 68 configured to spray fluid conveyed into the nozzle unit 50 from the hose. A plurality of similarly attachable and detachable nozzles 53 can be provided, each having a different fluid spraying property. Advantageously, the user can select a particular nozzle 53 based on the desired fluid spraying property.

Figure 15A:
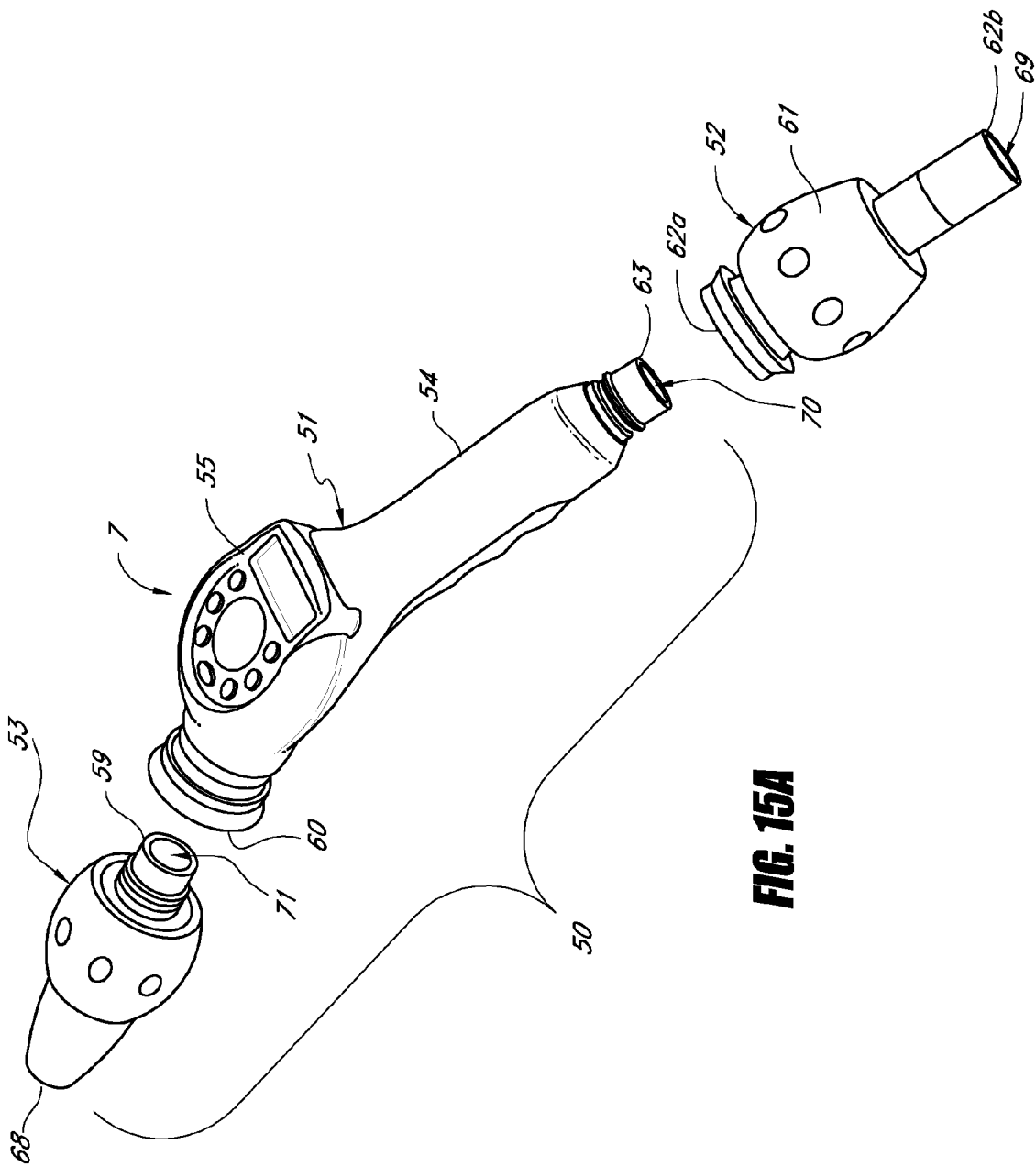
FIG. 15A is perspective view of an embodiment of an integrated remote control nozzle unit that can be fluidly coupled to a hose.
Figure 15B:
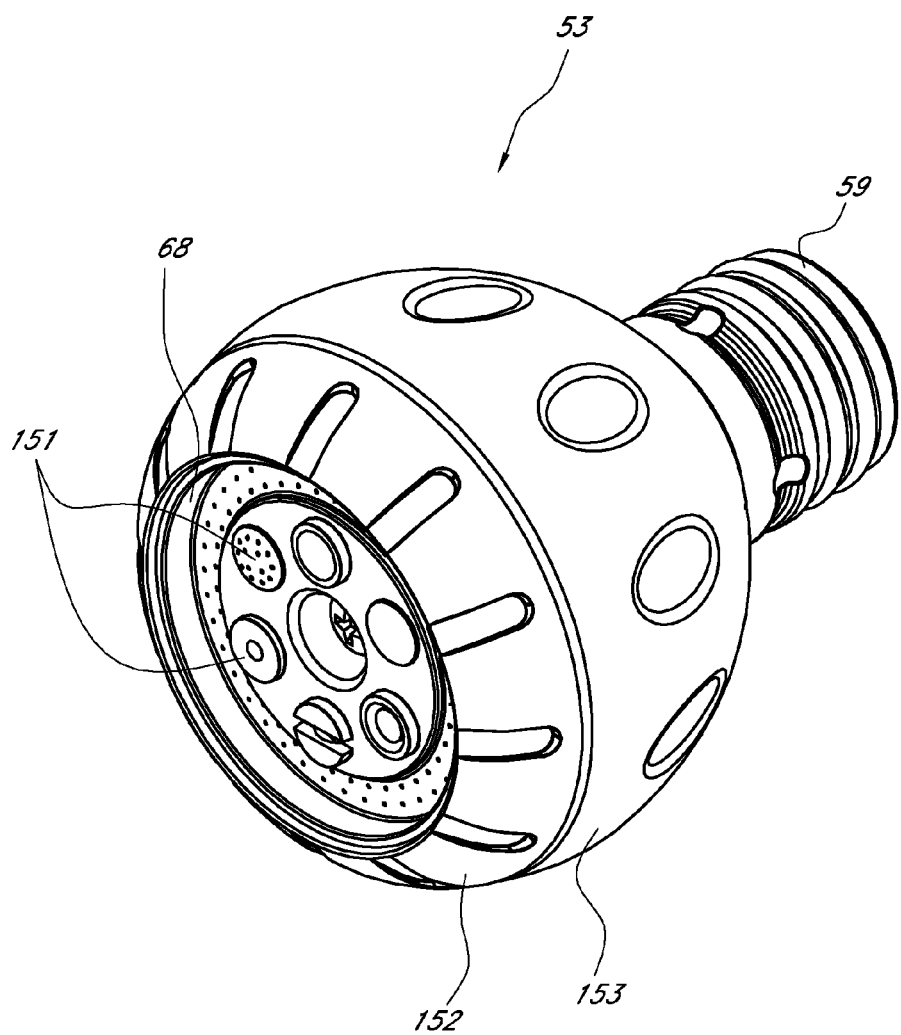
FIGS. 15Bi-15Bv are perspective views of example embodiments of nozzles that can be fluidly coupled within the remote control nozzle unit of FIG. 15A.
Figure 15B:
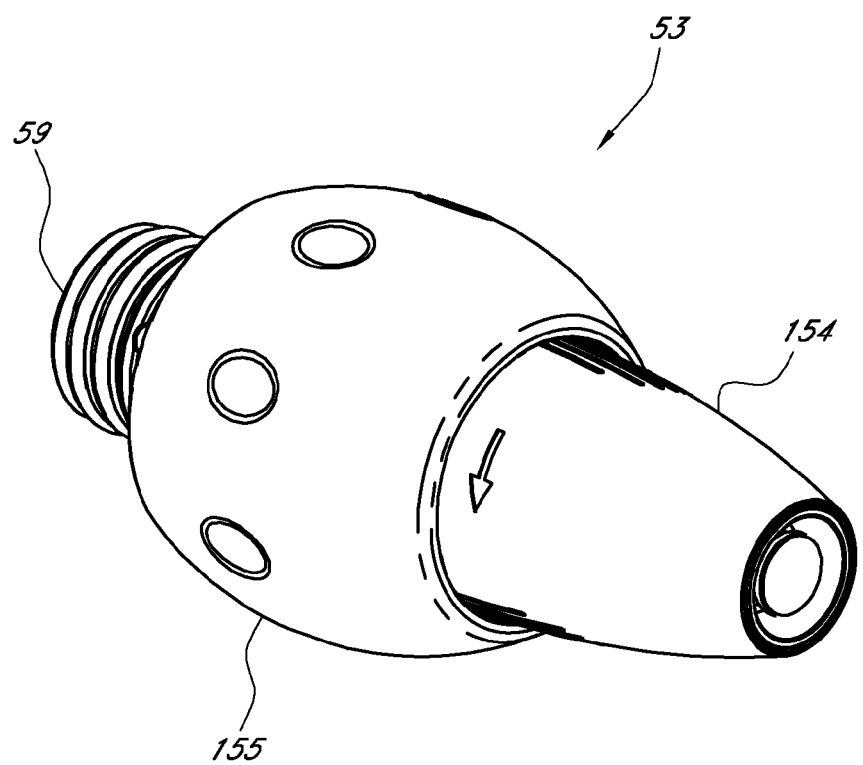

FIGS. 15Bi through 15Bv illustrate a plurality of example embodiments of nozzles 53 having different fluid spraying properties. Each nozzle 53 is preferably configured to be selectively and removably fluidly attached to and detached from the distal end 60 of the programming device 100 (or the programming device 101). In some embodiments, the nozzles 53 have proximal ends 59 configured to be selectively and removably fluidly attached to and detached from the distal end 60 of the programming device 100 (or the programming device 101) such that the nozzle 53 (e.g., the passage 71) is in fluid communication with the passage 70 when attached. Each nozzle 53 may also be configured to be selectively and removably fluidly attached to and detached from the distal end 62a of the valve unit 52 or a hose. In some embodiments, the nozzles 53 have proximal ends 59 configured to be selectively and removably fluidly attached to and detached from the distal end 62a of the valve unit 52 such that the nozzle 53 (e.g., the passage 71) is in fluid communication with the passage 69 of the valve unit 52 when attached and/or configured to be selectively and removably fluidly attached to and detached from a hose such that the nozzle 53 (e.g., the passage 71) is in fluid communication with the hose when attached.

FIG. 15Bi illustrates a nozzle 53 comprising a plurality of outlets 151, each with different spray profiles (e.g., a cylindrical stream at high pressure, a fan-shaped stream, no stream, etc.). In some embodiments, a first portion 152 of the nozzle 53 can be rotated relative to a second portion 153 of the nozzle 53. The rotation causes fluid flowing through the passage 71 to exit the nozzle 53 with a spray profile corresponding to a particular outlet 151. FIG. 15Bii illustrates a nozzle 53 in which the spray properties comprise a gentle fan spray. FIG. 15B iii illustrates a nozzle 53 configured to emit a pressurized spray. In some embodiments, the nozzle 53 includes a pathway 71 with a reduced diameter. In certain embodiments, the nozzle 53 includes a pump or other device configured to increase the pressure of fluid flowing therethrough. FIG. 15B iv illustrates a nozzle 53 including a sweeping tip. FIG. 15Bv illustrates a nozzle 53 including an adjustable pressure output. In some embodiments, a first portion 154 of the nozzle 53 can be rotated relative to a second portion 155 of the nozzle 53 to vary the pressure of fluid exiting the distal end 68.

Figure 18:
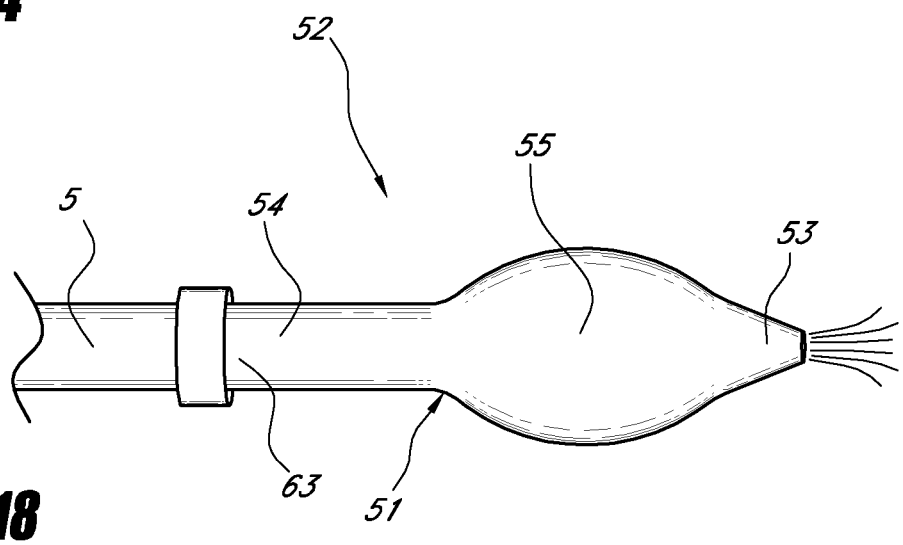
FIG. 18 is a top view of an embodiment of a remote control nozzle unit with an integrally formed nozzle.

FIG. 18 shows an alternative embodiment of a nozzle unit 50 in which the nozzle 53 is formed integrally with the main body portion 51. The illustrated main body portion 51 still includes a handle portion 54 and a remote control interface portion 55, as described above. The proximal end 63 of the main body portion 51 can be configured to be fluidly attached to the valve unit 52 or directly to a hose, as described elsewhere in this patent specification.

The valve unit 52 is preferably configured to regulate a flow of fluid from the hose through the nozzle unit 50 to the nozzle 53. A wide variety of valves can be used, such as valves similar to those shown in FIGS. 4-6. Accordingly, the valve of the valve unit 52 preferably includes an open position in which it permits a fluid flow at a maximum flow rate through the valve. The valve also preferably includes a plurality of stable partially open positions in which it permits fluid flow at different flow rates through the valve, said different flow rates being less than the maximum flow rate. For example, the partially open positions of the valve of the valve unit 52 can include (1) a 25% open position in which the valve permits a fluid flow rate through itself of approximately 25% of the maximum flow rate; (2) a 50% open position in which the valve permits a fluid flow rate through itself of approximately 50% of the maximum flow rate; and (3) a 75% open position in which the valve permits a fluid flow rate through itself of approximately 75% of the maximum flow rate. Many other partially open positions and intermediate flow rates are possible. For example, the intermediate flow rates can comprise increments of 10% (i.e., 10% flow, 20% flow, 30% flow, 40% flow, 50% flow, 60% flow, 70% flow, 80% flow, and 90% flow). In another embodiment, the intermediate flow rates can comprise increments of 5%. In other embodiments, the valve can permit relatively continuously adjustable flow, as opposed to discrete flow rate increments.

The valve of the valve unit 52 can be manually adjustable, for example by rotating a knob 61. For example, the knob 61 can adjust a ball valve similar to the valve 25 shown in FIG. 4. In another embodiment, the valve of the valve unit 52 can be controlled by wired or wireless data signals transmitted by the remote control 7. If the control is wireless, it will be understood that the valve unit 52 can include a receiver configured to receive wireless signals from the remote control 7. In still another embodiment, the valve is controllable both manually and by the remote control 7.

The valve unit 52 preferably has a proximal end 62b configured to be selectively fluidly attached to and detached from a distal end of a hose, such as the hose 5 shown in FIG. 1. Accordingly, the proximal end 62b may comprise an attachment structure (in the form of a hose attachment fitting) for selectively fluidly attaching and detaching the remote control 7 with respect to a hose. The valve unit 52 preferably has a distal end 62a configured to be selectively fluidly attached to and detached from a proximal end 63 of the main body portion 51 of the nozzle unit 50. In the illustrated embodiment, the distal end 62a attaches to the proximal end 63 such that the valve unit 52 conveys water into the tube 57 of the main body portion 51.

In a preferred configuration, the main body portion 51 can alternatively be directly attached to the hose, such that the valve unit 52 is omitted from the assembly. Accordingly, the proximal end 63 of the main body portion 51 is preferably configured to be selectively fluidly attached to and detached from the distal end of the hose. In this embodiment, the proximal end 63 may itself comprise an attachment structure (in the form of a hose attachment fitting) for selectively attaching and detaching the remote control 7 with respect to a hose. This allows the user to simplify the apparatus when fluid flow rate control is not needed. In another embodiment, the nozzle 53 can be directly attached to the valve unit 52, such that the main body portion 51 is omitted from the assembly. Accordingly, the distal end 62a of the valve unit 52 can be configured to be selectively fluidly attached to and detached from the proximal end 59 of the nozzle 53, with the main body portion 51 completely detached from both the nozzle 53 and the valve unit 52. In still another embodiment, the proximal end 59 of the nozzle 53 can be configured to be selectively fluidly attached to and detached from the distal end of the hose, such that both the main body portion 51 and the valve unit 52 are omitted from the assembly.

In a preferred embodiment, the attachments of one or more of (1) the valve unit 52 to the main body portion 51, (2) the main body portion 51 to the nozzle 53, and (3) the valve unit 52 to the nozzle 53 can be implemented by using an attachment structure allowing relatively quick connection and disconnection, thus improving ease of use.

Figure 15C:
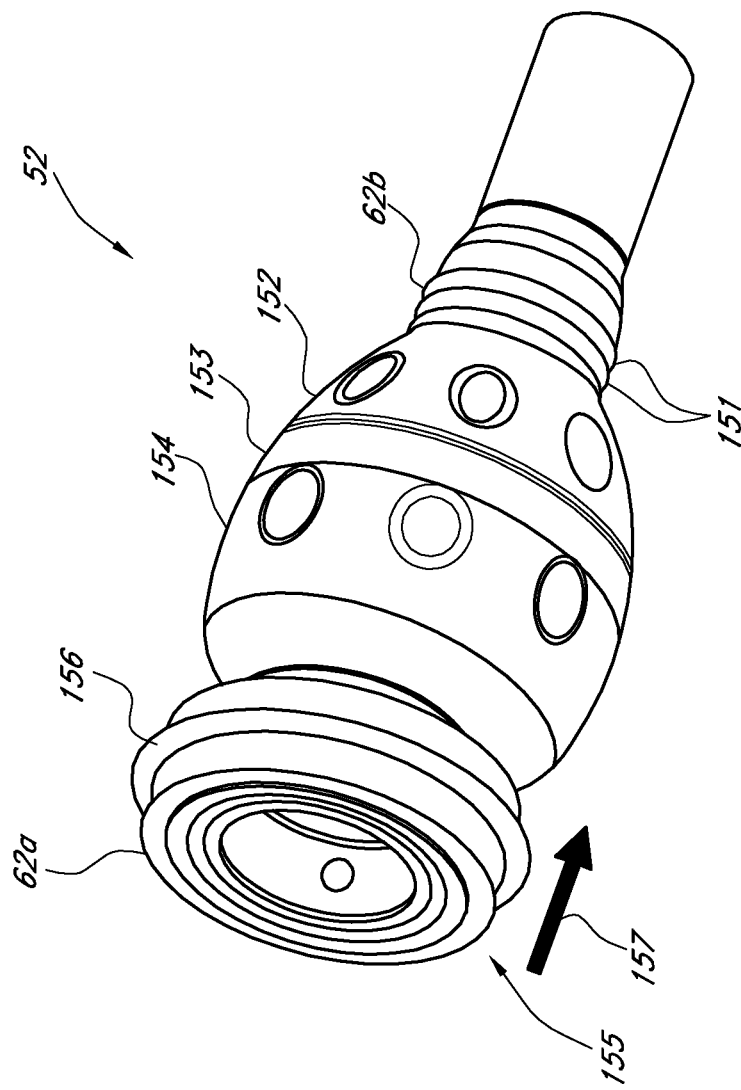
FIG. 15Ci is a perspective view of an example embodiment of a valve unit that can be fluidly coupled with the remote control nozzle unit of FIG. 15A.

FIG. 15Ci illustrates an example embodiment of a valve unit 52 comprising a ball valve unit. The ball valve unit comprises a first portion 152 and a second portion 154. When the second portion 154 rotates with respect to the first portion 152 or a stationary portion 153, the valve within the valve unit 52 is actuated (e.g., as described above with respect to FIG. 4 with the second portion 154 mechanically coupled to the gear 32).

The illustrated valve unit 52 of FIG. 15Ci further comprises a quick connect mechanism 155 that comprises a collar 156 at the distal end 62a. When the collar 156 is urged towards the proximal end 62b as indicated by the arrow 157, other components having appropriately configured proximal ends may be inserted and removed from the quick connect mechanism 155. Components may also be attached with the collar 156 at the distal end 62a, in which case those components would automatically force the collar 156 towards the proximal end 62b. The collar 156 is preferably biased towards the distal end 62a, which locks inserted components. To release the attached component, the collar 156 is urged towards the proximal end 62b.

The valve unit 52 may be directly attached to a hose. In the illustrated embodiment, as the proximal end 62b of the valve unit 52 is urged towards a distal end of a hose having no attachment fittings, the hose wraps around a plurality of annular tapered projections 151. The elasticity of the hose allows the hose to wrap around the various diameters of the tapered projections 151, but, once the hose is wrapped around the tapered projections 151, the various diameters increase friction so as to reduce the chances of the hose sliding off the valve unit 52. The connection between the valve unit 52 and the hose may be made more secured by using a locking mechanism of the valve unit 52. In the illustrated embodiment, a portion 152 of the valve unit 52 may be rotated to move proximally until it clamps onto the exterior of the hose, such as by having a conical interior clamping surface. It will be appreciated that other types of connections or joints between the hose and the valve unit 52 may also be appropriate. For example, the distal end of the hose and the proximal end 62b of the valve unit 52 may have standard fittings for a threaded connection. For another example, the hose may comprise a quick connect mechanism and the proximal end 62b of the valve unit 52 may comprise a quick connect coupling.

FIG. 15Cii illustrates an example embodiment of a quick connector 160 attached to a hose. Similar to the proximal end 62b of the valve unit 52 described with respect to FIG. 15Ci, as proximal end 161 of the quick connector 160 is urged towards a distal end of a hose having no attachment fitting, the hose wraps around a plurality of tapered projections. The connection between the quick connector 160 and the hose may be made more secure by using a locking mechanism of the quick connector 160 (e.g., by rotating a portion 162 until it clamps onto the exterior of the hose). Other types of connections or joints between the hose and the quick connector 160 are also possible. For example, the distal end of the hose and the proximal end 161 of the quick connector 160 may have standard fittings for a threaded connection. The quick connector 160 also comprises a quick connect mechanism including a collar 156, as described above, which allows the hose to be attached to components having a quick connect coupling at a proximal end thereof (e.g., a valve unit or system, a handheld element, a nozzle, etc.).

Figure 15D:
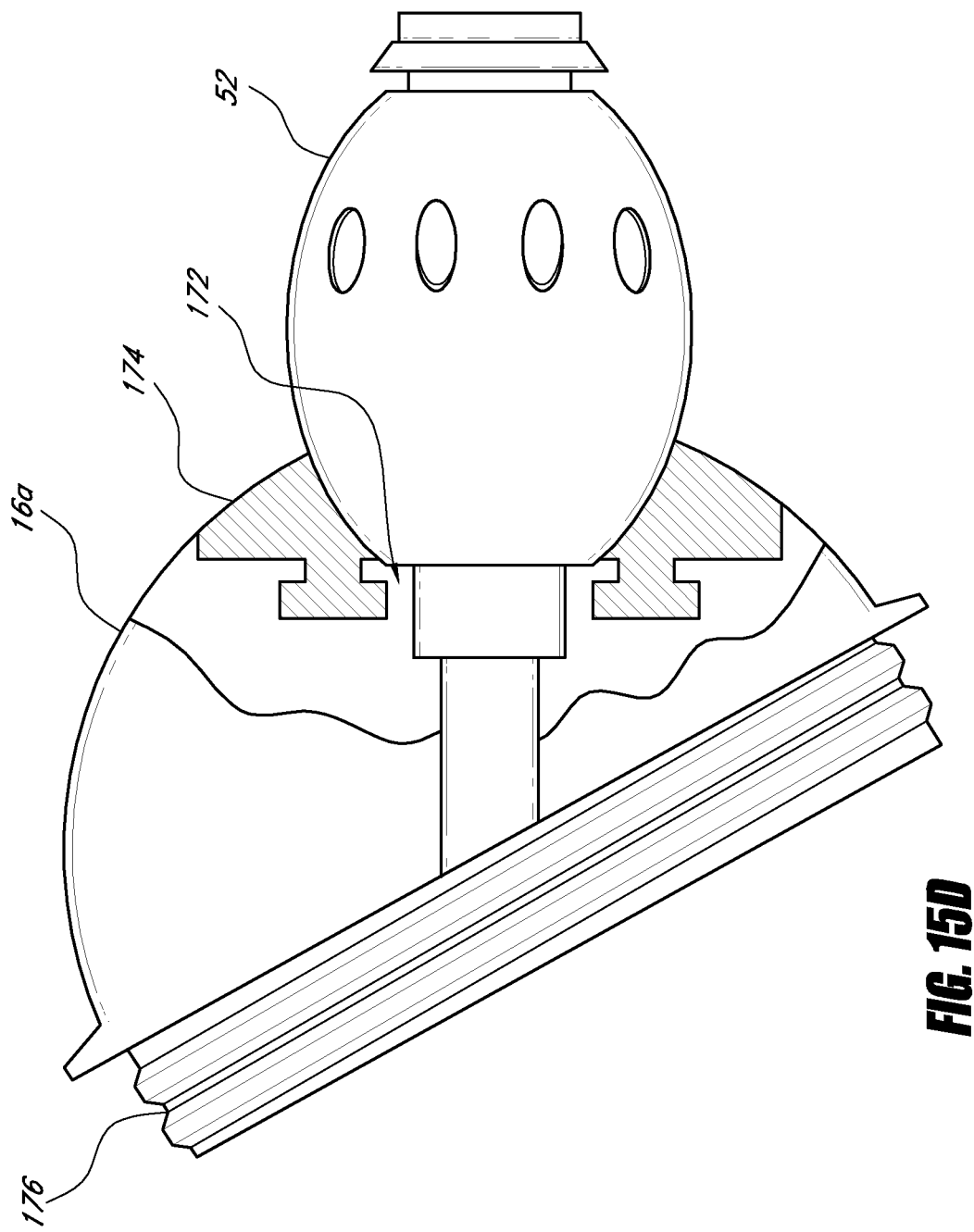
FIG. 15D is a cross-sectional view of an example embodiment of a portion of a hose reel.

FIG. 15D is a cross-sectional view of an example embodiment of a reel housing attachement 16a. The illustrated housing attachment 16a, also referred to as a "nose cone," may be coupled to a main reel housing 16 (shown schematically in FIG. 1). For example, the housing attachment 16a includes a threaded base 176 that may be screwed into a threaded opening of a housing 16. However, other embodiments are also possible (e.g., the housing attachment 16a may be formed integrally with a main reel housing, the housing attachment 16a may be coupled to a main reel housing fasteners such as screws, etc.). As an example, the housing attachment 16a is illustrated interacting with a valve unit 52. The hose is configured to be spooled onto the rotatable element 8 (FIG. 1) through an aperture 172 in the housing attachment 16a. A hose bib is mechanically coupled to a distal end of the hose. The bib is sized and shaped such that the bib is unable to pass through the aperture 172. In some embodiments, the valve unit 52 comprises the bib. In certain embodiments, a quick connector 160 comprises the bib. In some embodiments, the bib is a solid piece that is mechanically coupled to an exterior of a portion of the hose. For example, if a portion of the hose desirably should remain outside of the housing attachment 16a by a certain distance, the bib may be coupled to a location of the hose that is at least that distance away from the distal end of the hose. When the hose is reeled in, the bib will contact the housing attachment 16a at the aperture 172. In some embodiments, the housing attachment 16a comprises a support structure 174 configured to absorb the shock of the bib contacting the housing attachment 16a. The support structure 174 may be sized and shaped to reduce damage to the bib (e.g., by being concave when the proximal end of the bib is convex). The support structure may comprise plastic, rubber, silicone, and the like. The housing 16 or a different housing attachment 16a may comprise an aperture 172 that similarly interacts with a bib.

Thus, the nozzle unit 50 has an internal flow conduit extending between its proximal end 62b (or 63, where the valve unit 52 is omitted) and distal end 68 (or 60, where the nozzle 53 is omitted). In the illustrated embodiment, the internal flow conduit of the nozzle unit 50 comprises a passage 69 of the valve unit 52, a passage 70 of the main body portion 51, and a passage 71 of the nozzle 53. Alternatively, where the valve unit 52 is omitted from the assembly, the internal flow conduit of the illustrated nozzle unit 50 comprises the passages 70 and 71 alone. It will be understood that the passage 70 of the main body portion 51 can be defined by the tube 57 shown in FIG. 16A. As noted above, the proximal end 62b (or 63) of the nozzle unit 50 may be configured to be attached to a distal end of a hose so that the internal flow conduit of the nozzle unit is in fluid communication with the hose. In certain embodiments, the nozzle unit 50 is permanently or non-removably attached to a distal end of a hose.

Figure 19A:
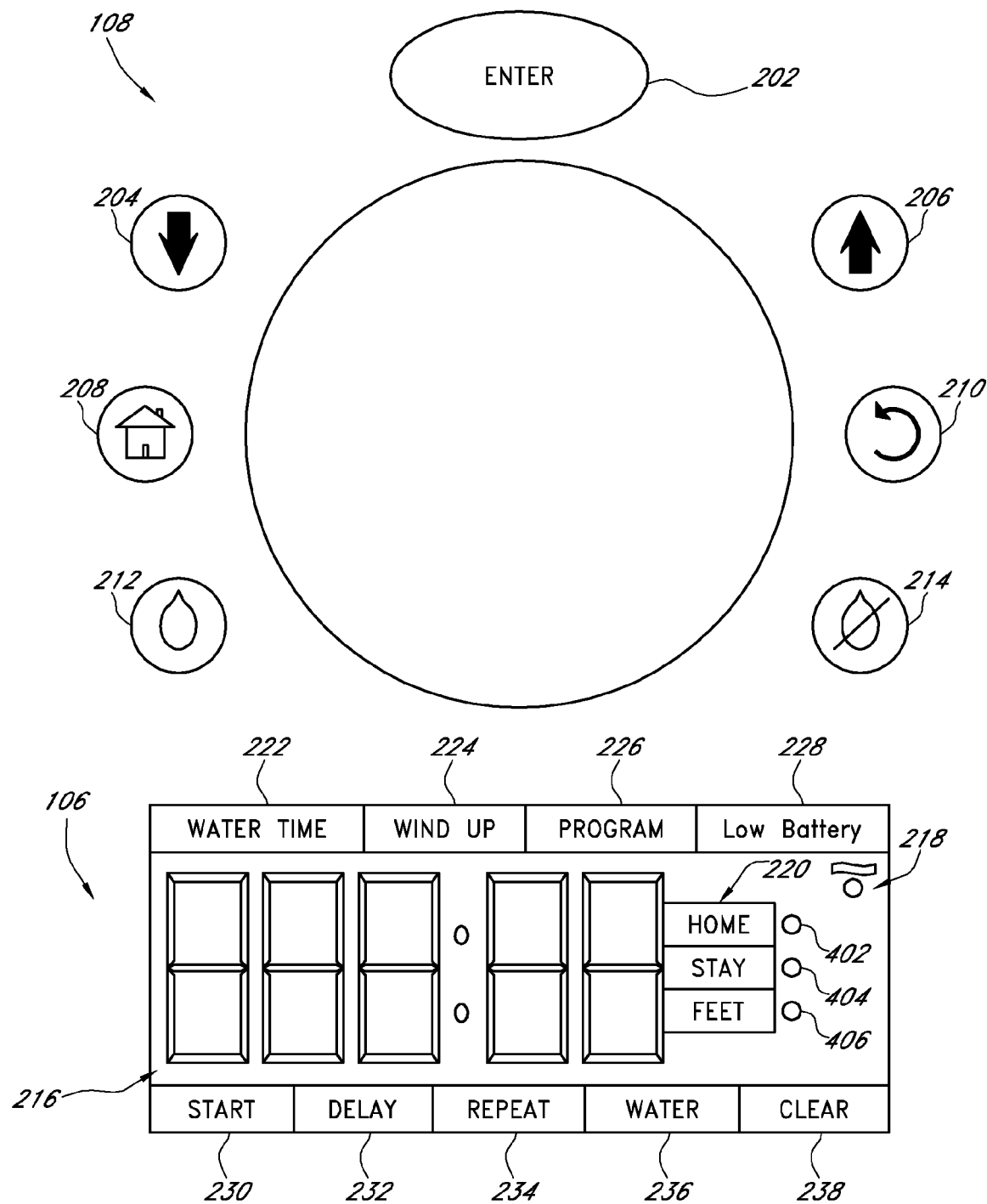
FIG. 19A illustrates a schematic view of an example interface of the programming device of FIG. 13A.

FIG. 19A illustrates an example embodiment of a plurality of buttons 108 and a display 106 on a programming device 100. In some embodiments, the buttons 108 are ergonomically laid out around a central contour. The buttons 108 include an "ENTER" button 202, a down arrow button 204, an up arrow button 206, a "home" button 208 (e.g., having a house icon), a "jog" button 210, a "water on" button 212, and a "water off" button 214. In certain embodiments, the "water on" button 212 and the "water off" button 214 may be used to remotely and wirelessly operate an electrically actuated valve, as described in U.S. Patent Application Publication No. 2004/0231723. In some embodiments, the valve system can occupy positions between fully open and fully closed to permit heightened control of fluid flow, while in other embodiments the controlled valve is only capable of being either completely open or completely closed. In certain embodiments, the "jog" button 210 is configured to spool (i.e., wind up onto the hose reel) the hose while the button 210 is pressed, such that the hose may be spooled remotely and wirelessly, for example by a user walking with the hose. In certain embodiments, if a user presses the "home" button 208, the hose will spool completely onto the hose reel (e.g., until a stop position is reached).

In some embodiments, the programming device 100 has an input device different from the buttons 108. For example, a programming device may only have an ENTER button and a single arrow. Conversely, a programming device may have additional buttons not described herein (e.g., a dedicated on/off button). The programming device may comprise an input device such as a keyboard, a mouse, a trackball, a touchscreen, etc. In certain embodiments, the ENTER button 202 and the up and down arrows 204, 206 may be used to program the hose reel to turn on and shut off a water supply at predetermined intervals and to reel a hose into the hose reel at predetermined intervals.

The display 106 comprises a plurality of display areas including a numerical display portion 216, a power indicator area 218, a "HOME/STAY/FEET" area 220 having LEDs associated therewith, a "WATER TIME" area 222, a "WIND UP" area 224, a "PROGRAM" area 226, a "Low Battery" area 228, a "START" area 230, a "DELAY" area 232, a "REPEAT" area 234, a "WATER" area 236, and a "CLEAR" area 238. Displays 106 having additional, alternative, and fewer areas are also possible. The illustrated numerical display area 216 comprises LCDs capable of displaying times ranging up to 999 hours and 59 minutes or 999 minutes and 59 seconds, although other configurations are also possible (e.g., capable of displaying hours, minutes, and seconds).

Figure 19B:
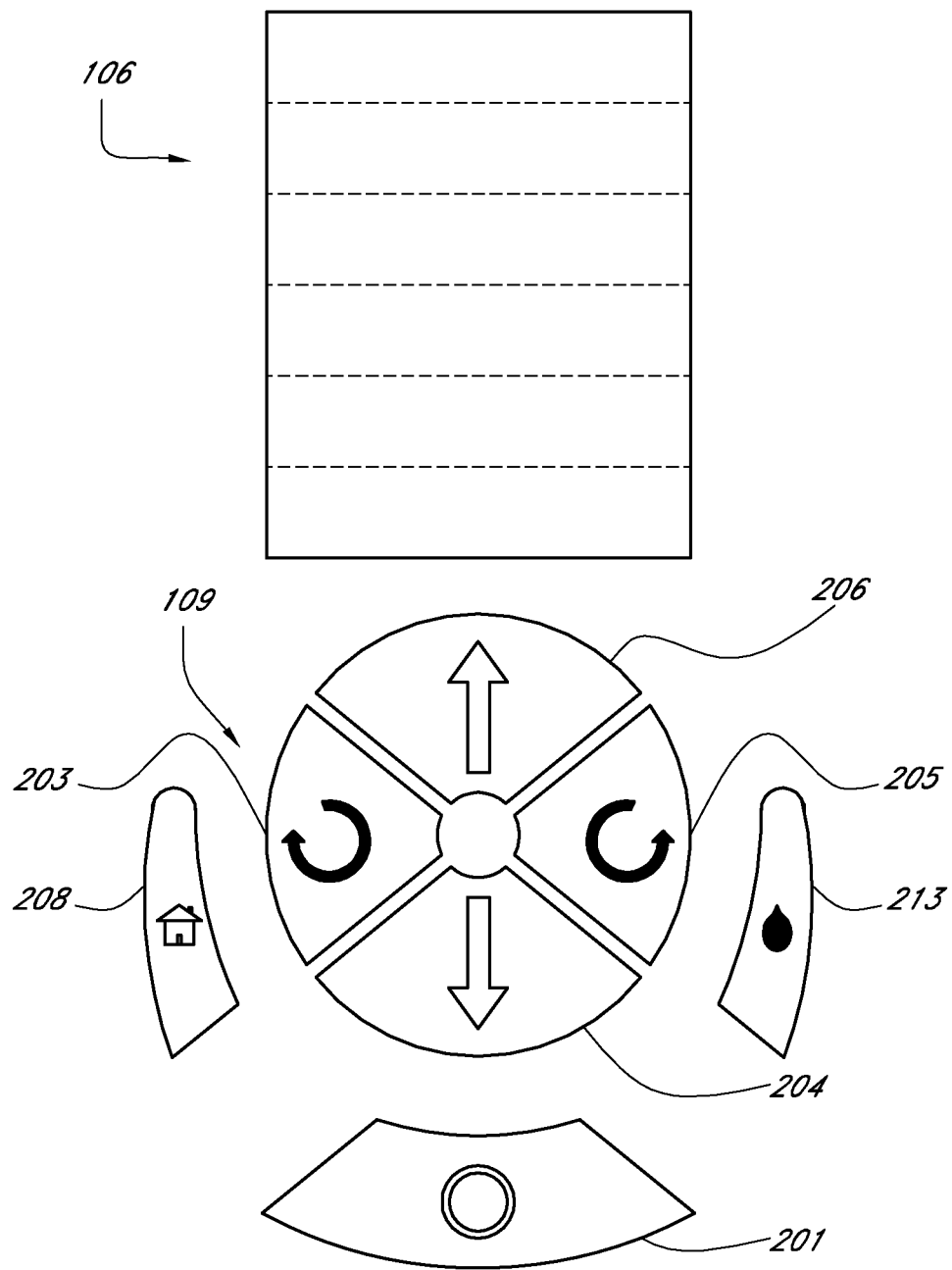
FIG. 19B illustrates a schematic view of an example interface of the programming device of FIG. 13B.

FIG. 19B illustrates an example embodiment of a plurality of buttons 109 and a display 106 on a programming device 101. In some embodiments, the buttons 109 are ergonomically laid out around a central contour or a central button. The buttons 109 include an on/off button 201, a down arrow button 204, an up arrow button 206, a forward button 205, a backwards button 203, a "home" button 208 (e.g., having a house icon), and a water on/off button 213. In certain embodiments, the water on/off button 213 may be used to remotely and wirelessly operate an electrically actuated valve. In some embodiments, the valve system can occupy positions between fully open and fully closed to permit heightened control of fluid flow, while in other embodiments the controlled valve is only capable of being either completely open or completely closed. In certain embodiments, if a user presses the "home" button 208, the hose will spool completely onto the hose reel (e.g., until a stop position is reached). In some embodiments, the programming device 101 has an input device different from the buttons 109. In certain embodiments, the buttons 109 may be used to program the hose reel to turn on and shut off a water supply at predetermined intervals and to reel a hose into the hose reel at predetermined intervals. The display 106 may be configured to change over time, for example as a user scrolls through menus (e.g., hierarchical menus). In some embodiments, a portion of the display 106 may be stationary LCD's while a second portion of the display 106 can change (e.g., comprising LED's). Although the programming below is described with respect to the programming device 100 and the buttons 109, it will be appreciated that similar programming may be achieved via other screens and buttons (e.g., a system having a hierarchical menu structure).

Figure 20:
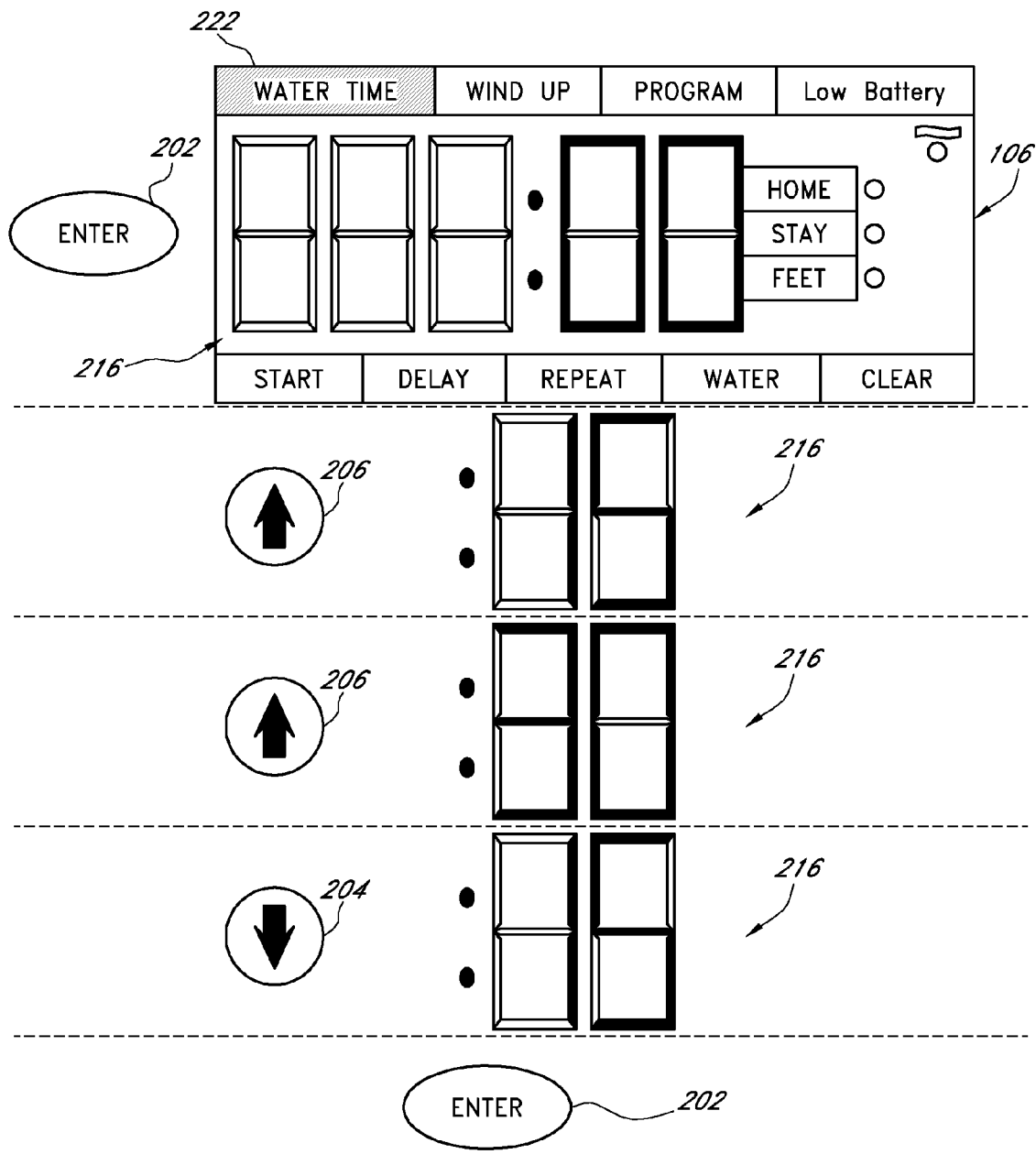
FIGS. 20-22E illustrate example features of an example program for a hose reel apparatus.

Referring now to FIG. 20, an example embodiment of a first programming step is now described. In some embodiments, pressing the ENTER button 202 turns on the programming device 100 and/or the hose reel. When a user presses the ENTER button 202, the "WATER TIME" section 222 of the display 106 illuminates and the numerical display portion 216 of the display 106 shows a duration of time. In certain embodiments, the default duration is zero or another duration, such as 15 minutes. Upon pressing the up arrow button 206, the displayed duration increments a certain value. As illustrated in FIG. 20, the value increments 15 minutes each time the up arrow button 206 is pressed, and also decrements by 15 minutes each time the down arrow button 204 is pressed. Other increments may also be used (e.g., one minute, five minutes, ten minutes, 20 minutes, 30 minutes, 45 minutes, one hour, two hours, etc.). Once the desired duration for that segment of the program is exhibited by the display 106, the ENTER button 202 is again pressed. At that point, the program offers a plurality of options, as described with respect to FIGS. 21A-21E.

Figure 21A:
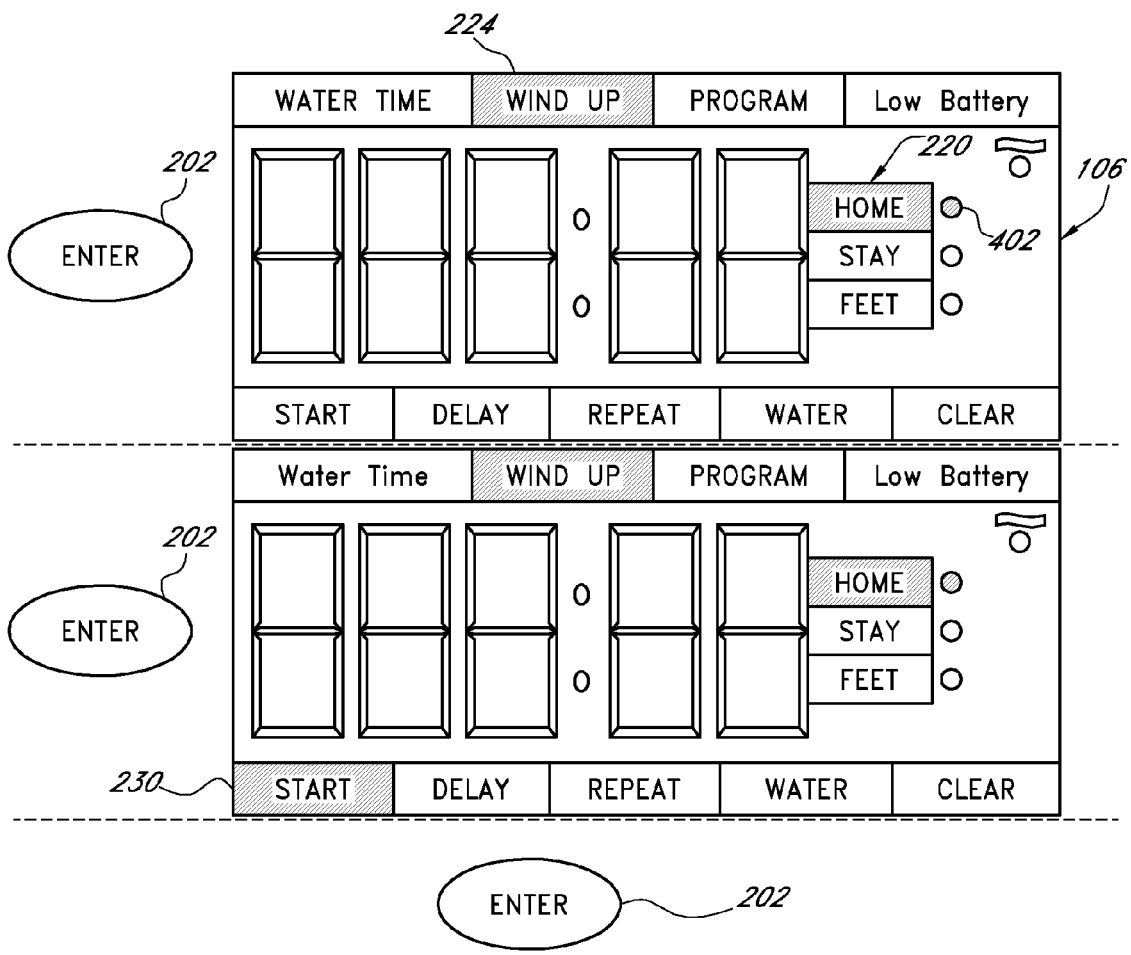

In FIG. 21A, a first option is illustrated. Beginning with the pressing of ENTER button 202 after programming the duration of water time from FIG. 20, the WIND UP portion 224 of the display 106 is illuminated. A first option for the WIND UP segment of the program is HOME, as illustrated by the illuminated "HOME" portion 220 of the display 106, as well as in some embodiments an LED 402 next to the HOME portion 220. Pressing the ENTER button 202 in the HOME screen programs the hose reel to spool the hose completely onto the hose reel (preferably excepting the programming device 100 if coupled to the hose, an attached sprinkler, or another portion near the end of the hose distal to the hose reel). When a user presses the ENTER button 202 in the HOME screen, two options are possible (represented by FIGS. 21A and 21B).

First, as illustrated in FIG. 21A, the "START" portion 230 of the display 106 will illuminate. Pressing the ENTER button 202 again will cause the programming to be completed and will cause the program to start running. In view of the programming steps shown in FIGS. 20 and 21A, the executed program will run fluid through the hose for 15 minutes, after which the water will automatically shut off (e.g., by actuating an electronically controlled valve). The hose reel will then automatically spool the hose completely onto the hose reel. The 15 minutes is derived from the time chosen in FIG. 20, and is for illustration only. Other times are also possible. A single watering step followed by completely winding up the hose onto the hose reel may be useful for certain tasks such as filling a pool (e.g., for a long duration such as 5 hours). Rather than offering additional programming options, as discussed below, programming a hose reel to spool the hose completely acts as a terminal part of the program because no additional spooling steps are possible and because a user is not likely to desire additional timed waterings with the hose in a completely spooled position. However, if additional timed waterings are desired with the hose in a completely spooled position, for example, embodiments are possible in which the user is presented with at least the options available in the "PROGRAM" screen described below for FIGS. 22A-22E upon pressing the ENTER button 202 in the HOME screen.

Figure 21B:
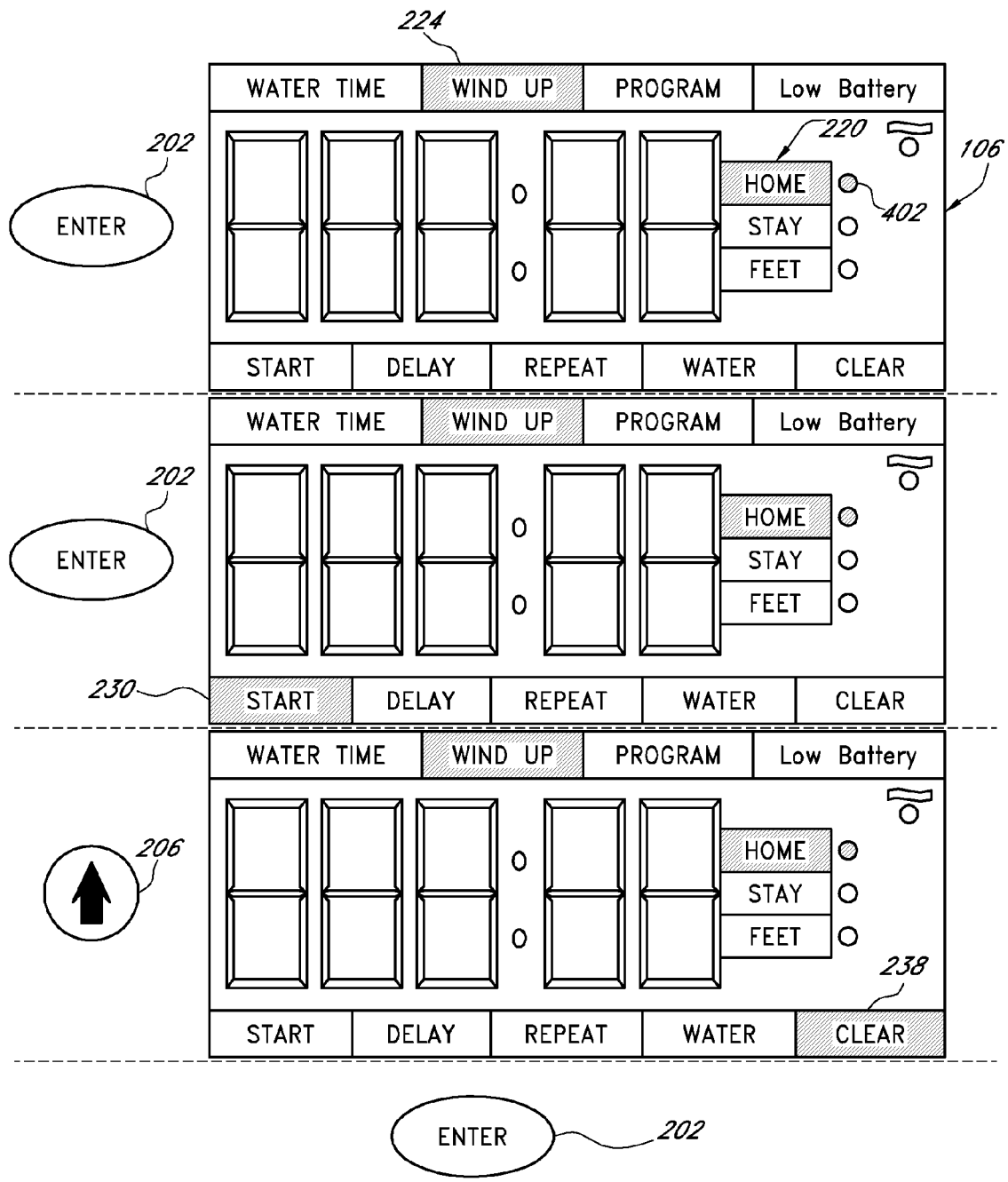

Second, in the option illustrated in FIG. 21B, the up arrow button 206 (or the down arrow button 204) is pressed one time in order to move from the START screen to a CLEAR screen in which the "CLEAR" portion 238 of the display 106 is illuminated. Pressing the ENTER button 202 while the CLEAR portion 238 of the display 106 is illuminated cancels all previous programming. For example, the 15 minutes water time duration will no longer be programmed. In some embodiments, the display 106 returns to the screen shown at the top of FIG. 20 if the ENTER button 202 is pressed while the CLEAR portion 238 of the display 106 is illuminated. In some embodiments, the programming device 100 will turn off if the ENTER button 202 is pressed while the CLEAR portion 238 of the display 106 is illuminated. However if the up or down arrow buttons 206, 204 are pressed during a CLEAR screen, the START portion 230 of the display 106 will be illuminated and the programming is not lost.

Figure 21C:
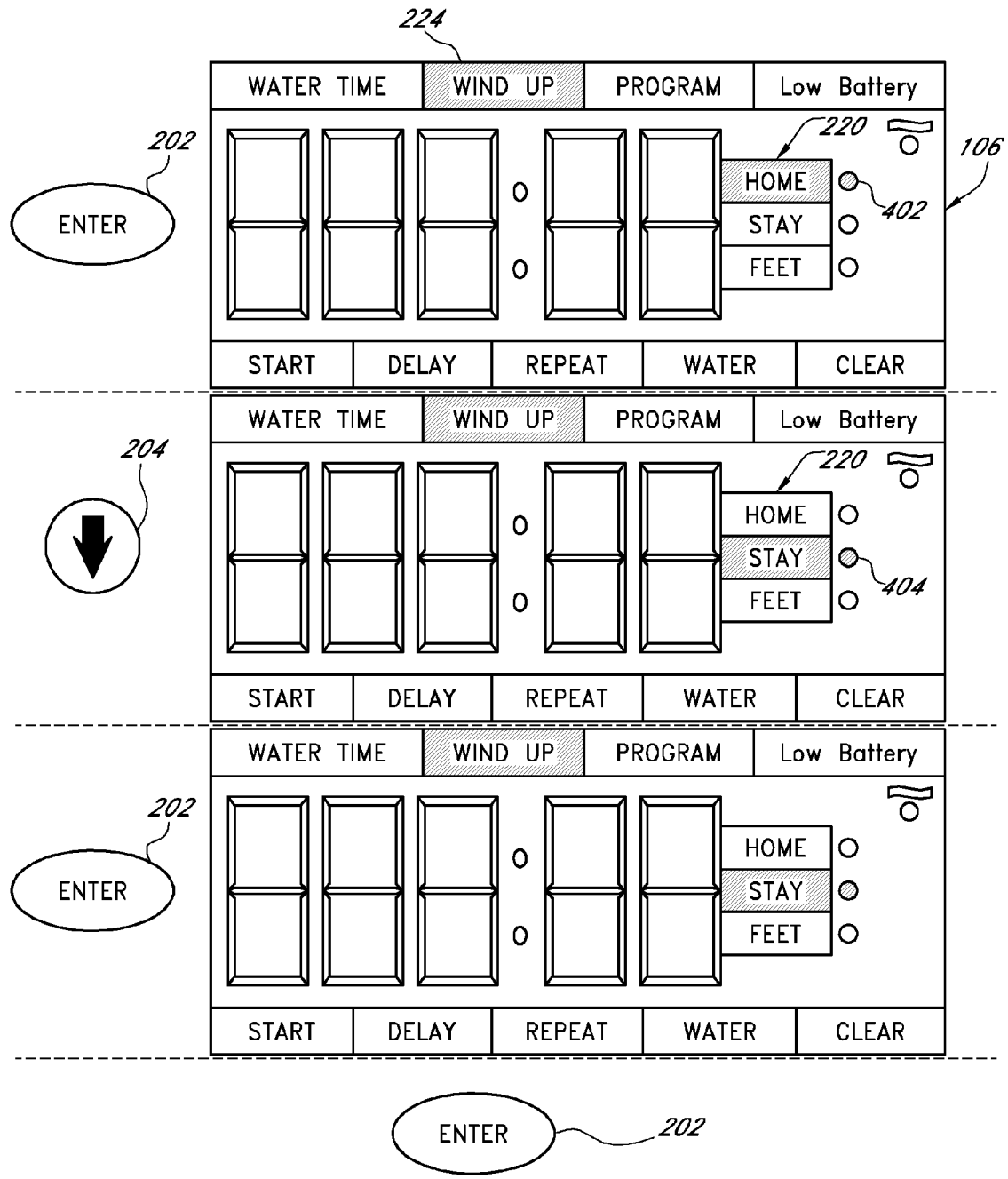

FIG. 21C illustrates another example alternative for what happens after the ENTER button 202 is pressed at the end of FIG. 20. Again, the HOME portion 220 of the display 106 and/or the LED 402 are illuminated, but the down arrow button 204 is pressed rather than the ENTER button 202 (as in the embodiments of FIGS. 21A and 21B). The down arrow button 204 causes the HOME portion and the LED 402 to not be illuminated and the "STAY" portion 220 and/or the LED 404 to become illuminated. If the ENTER button 202 is pressed, then the user will be presented with a variety of choices described below with respect to FIGS. 22A-22E.

Figure 21D:
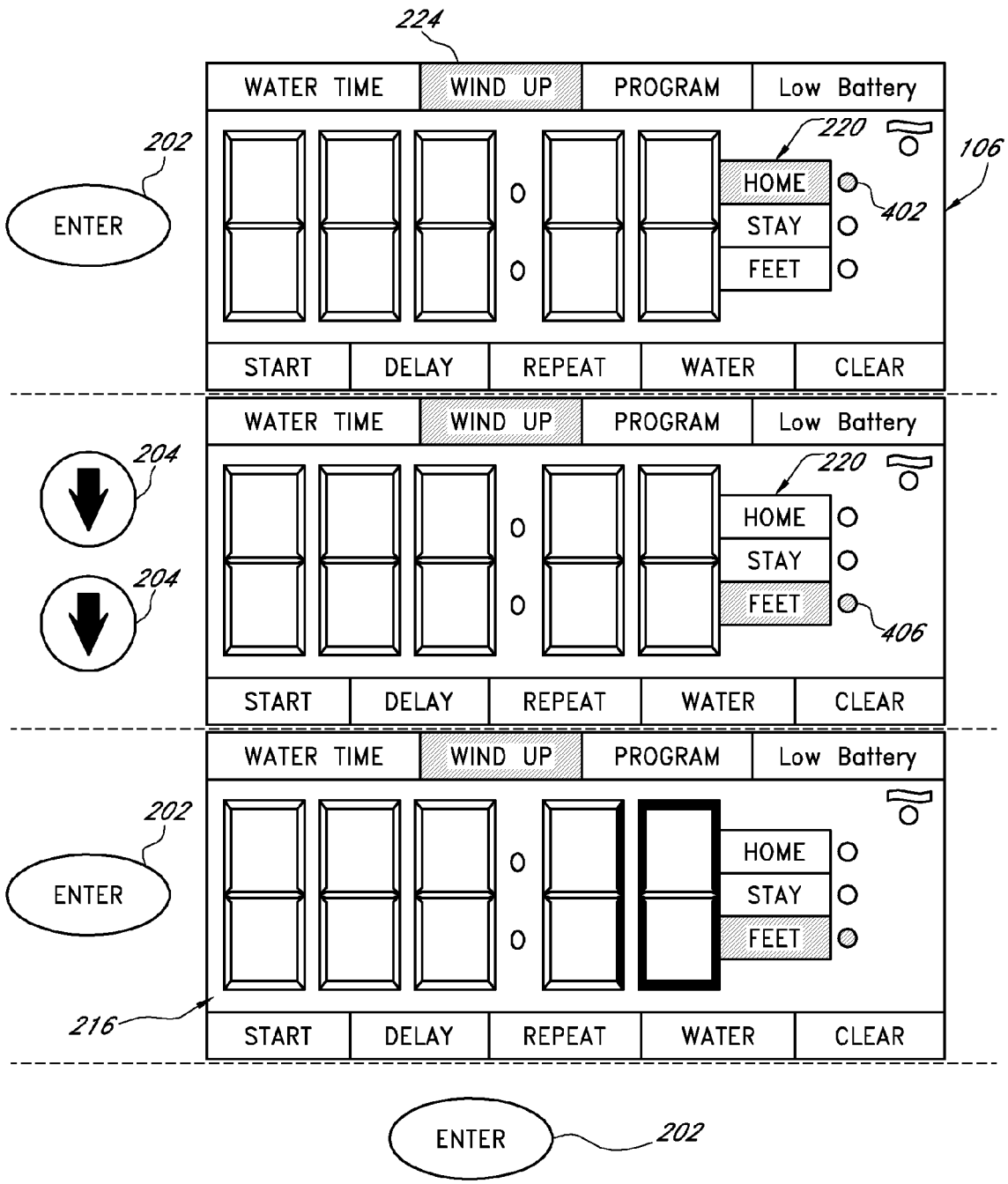

FIG. 21D illustrates another alternative for what happens after the ENTER button 202 is pressed at the end of FIG. 20. Again, the HOME portion 220 of the display 106 and/or the LED 402 are illuminated, but the down arrow button 204 is pressed twice to illuminate the "FEET" portion 220 and/or the LED 406. Alternatively, the up arrow button 206 may be pressed once to illuminate the FEET portion 220 and/or the LED 406. A combination of the up and down arrow buttons 206, 204 may be used to cycle between the HOME, STAY, and FEET displays. After the FEET portion 220 and/or the LED 406 is illuminated, upon pressing of the ENTER button 202, a default number of feet of hose to be spooled into the hose reel will be illuminated in the numerical display portion 216 of the display 106. In certain embodiments, the default is zero feet, 10 feet (e.g., as depicted in FIG. 21D), 20 feet, or other lengths. If the ENTER button 202 is pressed, then the reel will be programmed to, after 15 minutes of watering, shut off the water and then wind in 10 feet of the hose. Also, after pressing the ENTER button 202, the user will be presented with a variety of choices described below with respect to FIGS. 22A-22E.

Figure 21E:
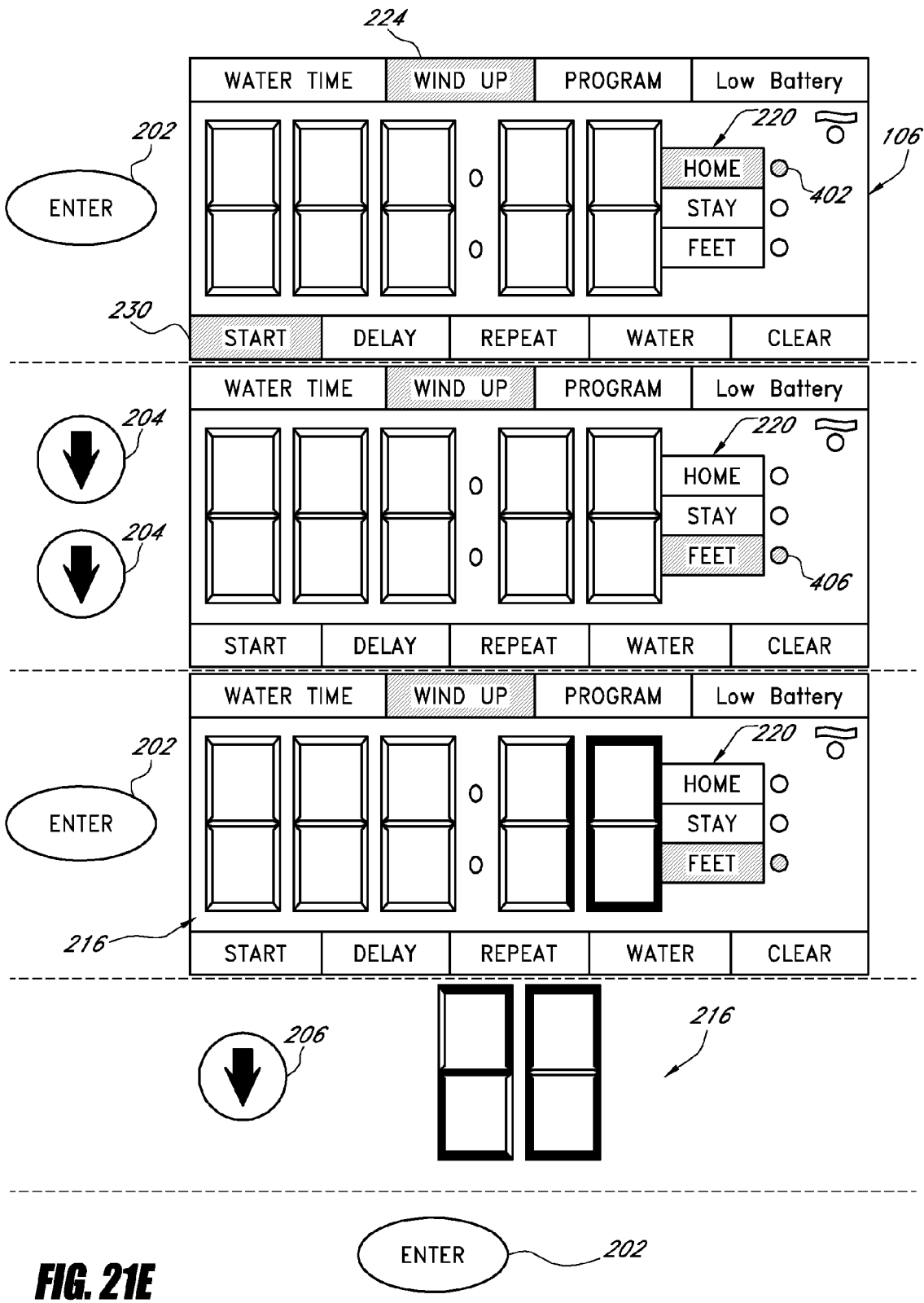

FIG. 21E illustrates yet another example alternative for what happens after the ENTER button 202 is pressed at the end of FIG. 20. As in FIG. 21D, the HOME portion 220 of the display 106 and/or the LED 402 are illuminated, and the down arrow button 204 is pressed twice to illuminate the "FEET" portion 220 and/or the LED 406. Upon pressing of the ENTER button 202, 10 feet is illuminated in the numerical display portion 216 of the display 106. Rather than pressing the ENTER button 202 as in FIG. 21D, the up arrow button is pressed one time to increase the length from 10 feet to 20 feet. Other length increments are also possible (e.g., 1 foot, 2 feet, 3 feet, 5 feet, 8 feet, 10 feet, 20 feet, 30 feet, etc.). Once the numerical display portion 216 of the display 106 displays the desired length for the hose to be spooled, the ENTER button 202 is pressed and the user will be given a number of options as described below with respect to FIGS. 22A-22E. As in FIG. 21D, the reel will be programmed to allow the watering for 15 minutes and then shut off the water and wind in 20 feet of hose.

In certain preferred embodiments, a default is to turn the water off upstream of the hose reel device before spooling the hose, for example to decrease stress on the hose. In some alternative embodiments, the program may advance to another screen (not shown) in which the user may select to leave the water on or turn the water off during the spooling.

Figure 22A:
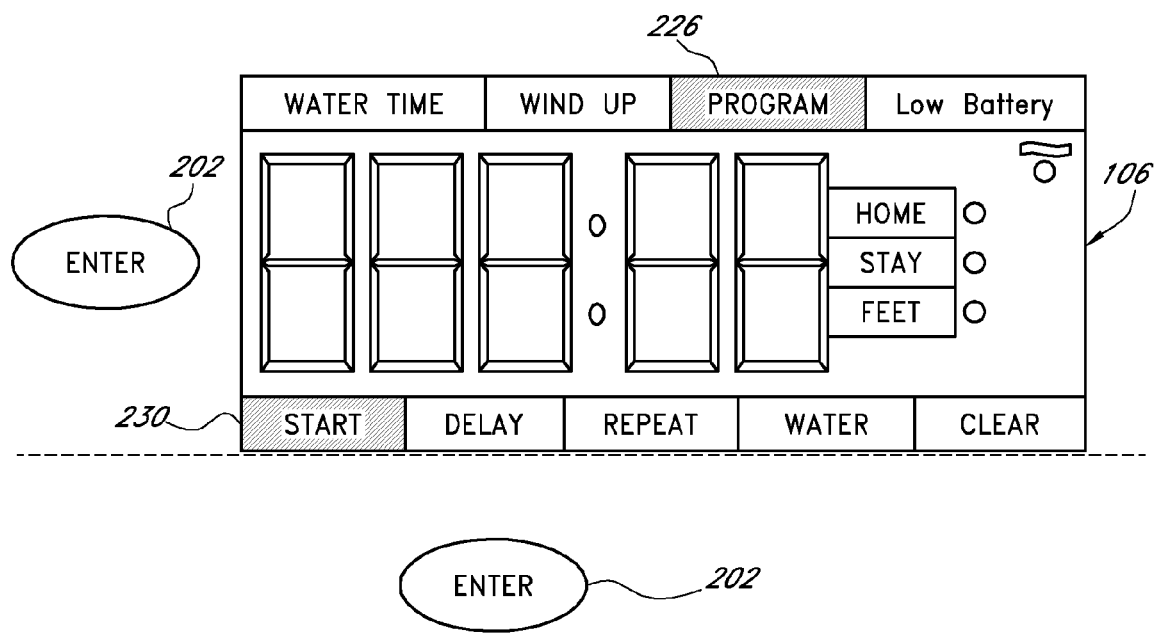

Referring again to FIGS. 21C-21E, after the ENTER button 202 at the bottom of each figure, the user is shown a screen in which the "PROGRAM" portion 226 of the display 106 is illuminated. In the PROGRAM screen, the START portion 230 of the display 106 is also first illuminated, as illustrated in FIG. 22A. As described above with respect to FIG. 21A, pressing the ENTER button 202 when the START portion 230 of the display 106 is illuminated causes the program to execute. The START portion 230 of the display 106 may also be illuminated after browsing through the available options (e.g., pressing the up arrow button 206 five times, pressing the up arrow button 206 two times and pressing the down arrow button 204 two times, etc.).

Figure 22B:
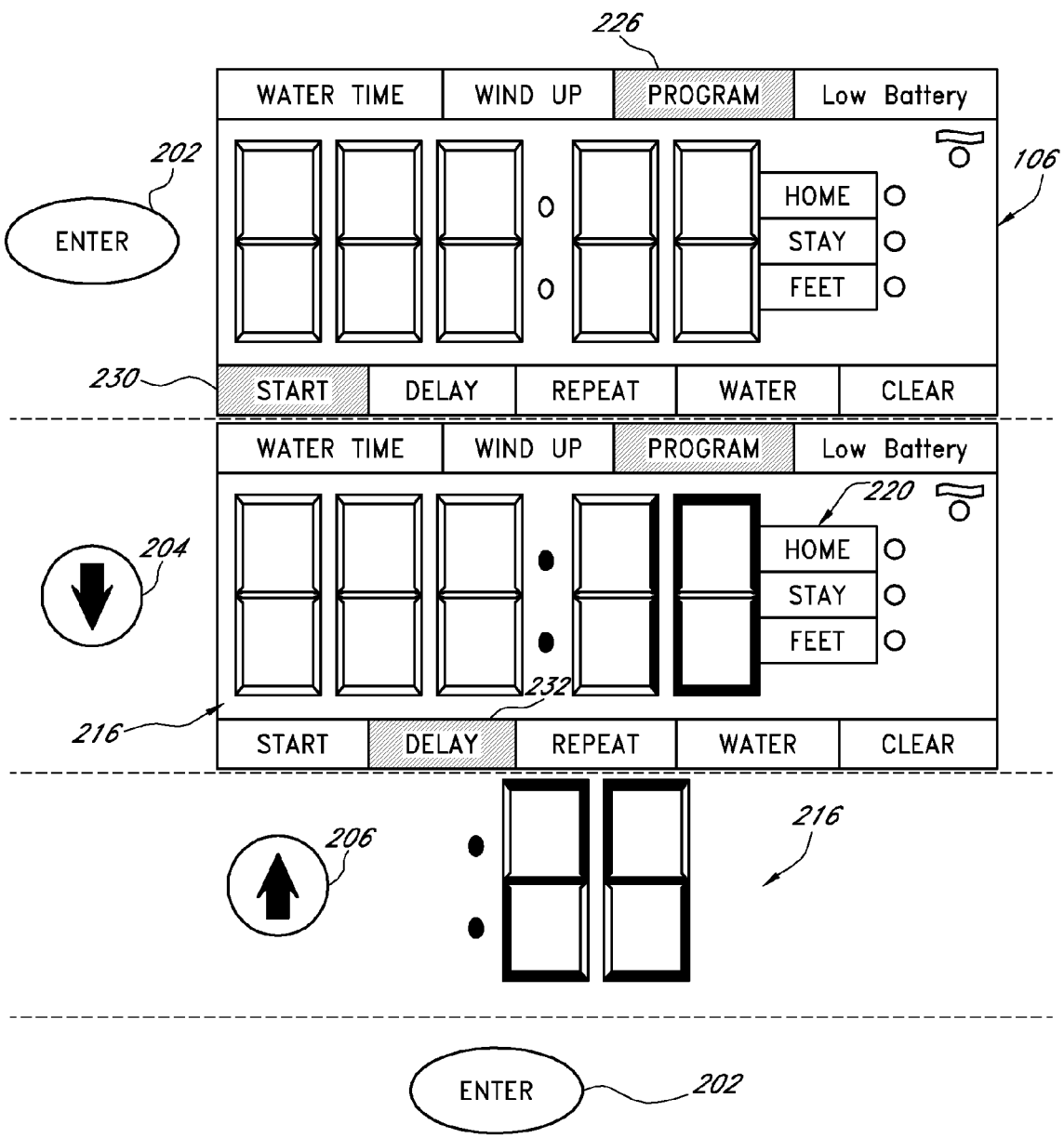

FIG. 22B illustrates a second option presented to a user after the ENTER button 202 is pressed in FIGS. 21C-21E. The PROGRAM portion 226 of the display 106 and the START portion 230 of the display 106 are illuminated. However, rather than pressing the ENTER button 202 as in FIG. 22A, if the down arrow button 204 is pressed one time (or if the up arrow button 206 is pressed four times, etc.), the "DELAY" portion 232 of the display 106 illuminates. The numerical display portion 216 of the display 106 also illuminates with a default duration of delay, which is how long the hose reel will wait to execute the program once the ENTER button 202 is pressed in a START screen. The default delay duration may be zero or a number, such as 10 minutes (e.g., as shown in FIG. 22B). In some embodiments, the delay is expressed in minutes, while in certain alternative embodiments, the delay is expressed in seconds. Pressing the ENTER button 202 would present the user with additional options such as REPEAT, WATER, and CLEAR, which are described below. In FIG. 22B, the up arrow button 206 is pressed to increase the amount of delay from 10 seconds to 25 seconds. The incremental duration may be any number and need not be uniform. In some embodiments, a single press of the up arrow button 206 or the down arrow button 204 increases the delay duration by one value (e.g., 15 seconds), while a plurality of quick presses increases the duration by another value (e.g., 1 minute). Pressing the ENTER button 202 after increasing or decreasing the delay duration (e.g., by pressing the down arrow button 204) also presents the REPEAT, WATER, and CLEAR options described below.

Figure 22C:
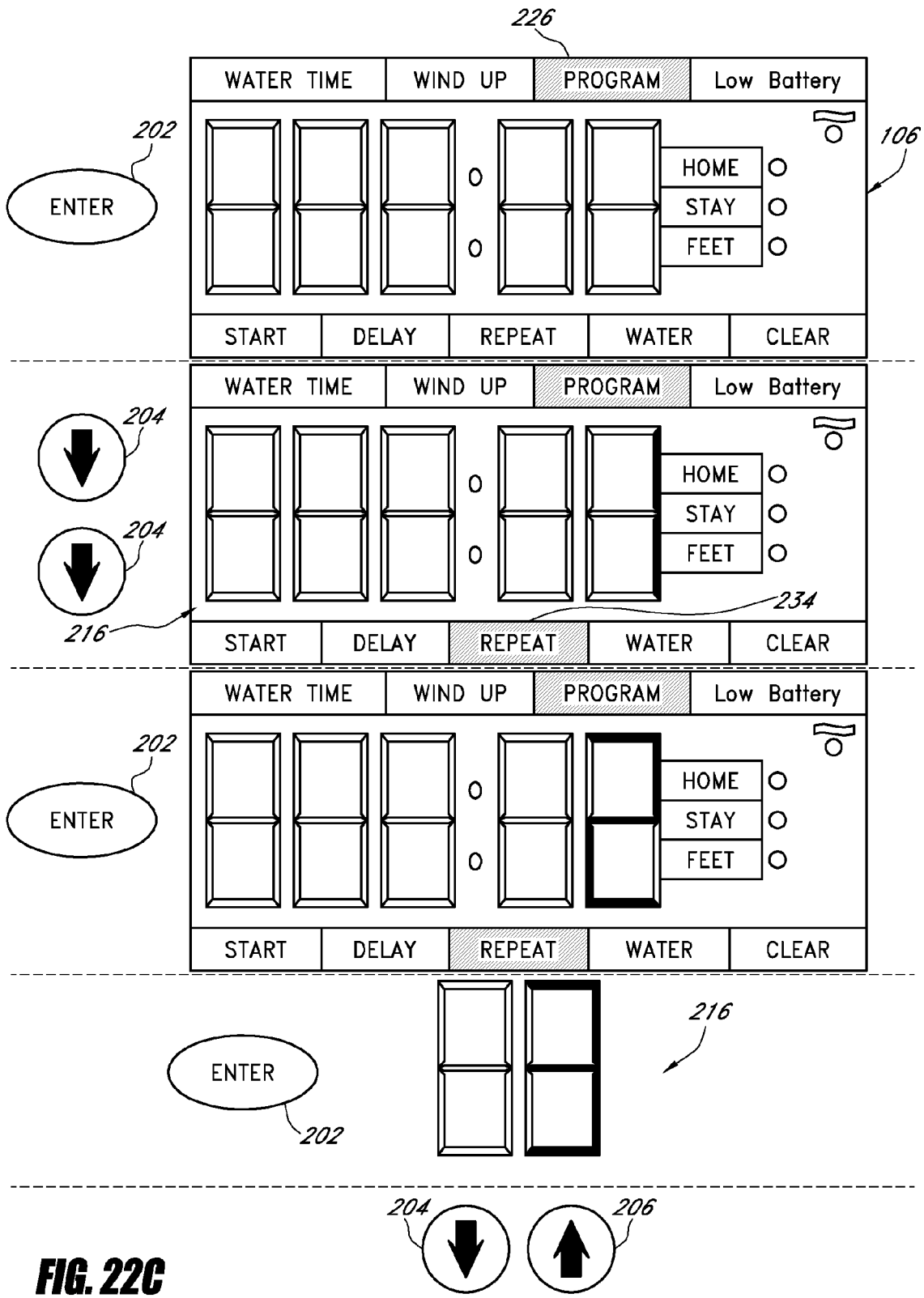
Figure 22C:
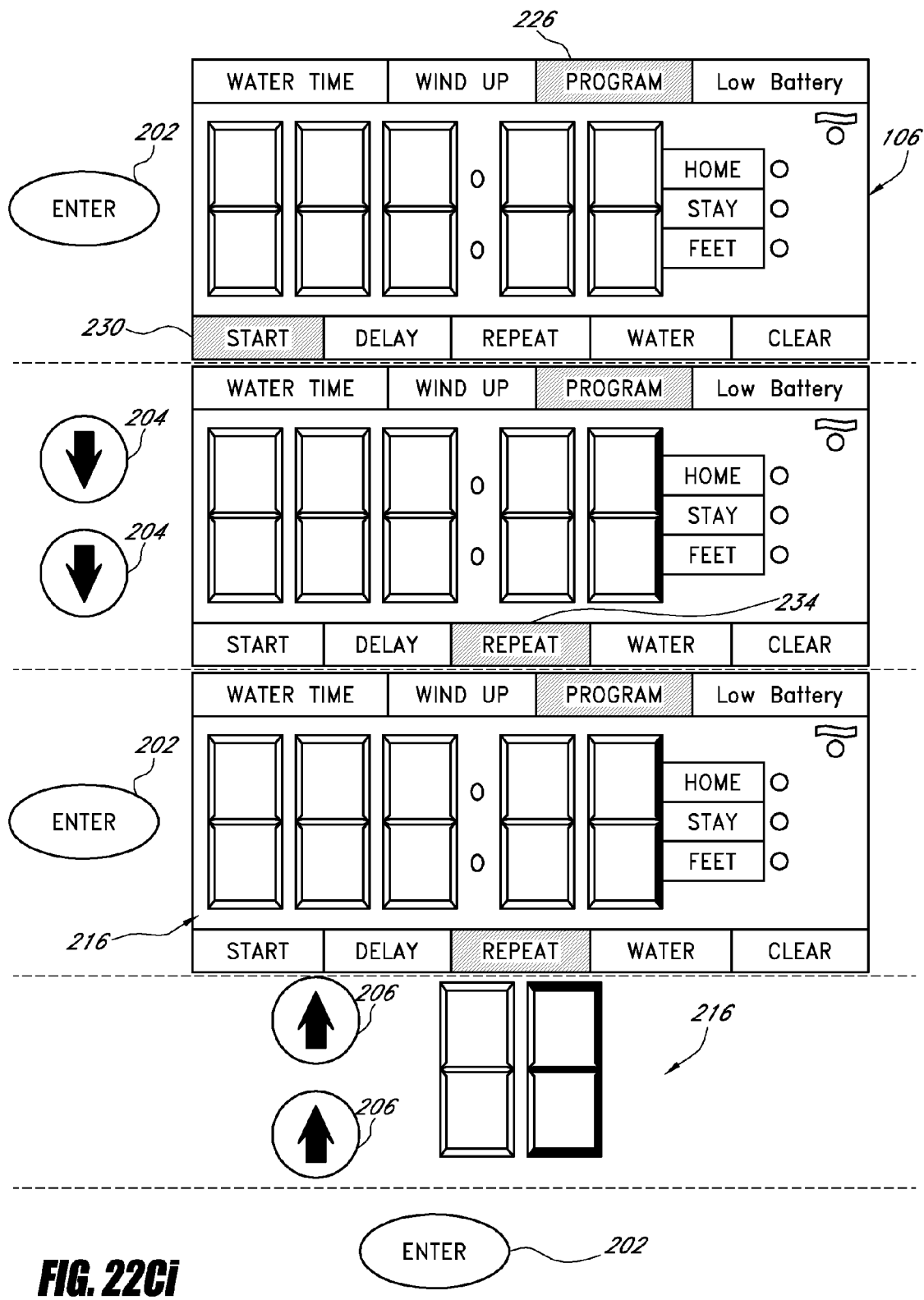

FIG. 22C illustrates a third option presented to a user after the ENTER button 202 is pressed in FIGS. 21C-21E. The PROGRAM portion 226 of the display 106 and the START portion 230 of the display 106 are illuminated. Rather than pressing the ENTER button 202 as in FIG. 22A, or pressing the down arrow button 204 once as in FIG. 22B, the down arrow button 204 is pressed two times (or the up arrow button 206 is pressed three times, etc.) to illuminate the REPEAT portion 234 of the display 106 and to cause a number to appear in the numerical display portion 216 of the display 106. In some embodiments, the number shown in the numerical display portion 216 of the display 106 is the number of times that the program or a portion thereof will be executed (i.e., if 1 is selected, the program will occur one time; if 3 is selected, the program will occur three times). In some alternative embodiments, the number shown in the numerical display portion 216 of the display 106 is the number of times that the program or a portion thereof will be repeated (i.e., if 1 is selected, the program will occur two times; if 3 is selected, the program will occur four times). The number may also default to zero (e.g., in embodiments in which the number represents the number of times that the program is repeated) or to a number such as one (e.g., as illustrated in FIG. 22C, and preferred in embodiments in which the number represents the number of times that the program will be executed). The number may be increased in certain increments (e.g., one) with the ENTER button 202 (e.g., as illustrated with pressing the ENTER button 202 twice to increase the number from 1 to 3). The user may then press the up and down arrow buttons 206, 204 to toggle to the other options available in the PROGRAM screen (e.g., the START screen illustrated in FIG. 22A, the DELAY screen illustrated in FIG. 22B, the WATER screen illustrated in FIG. 22D, and the CLEAR screen illustrated in FIG. 22E). If the user toggles back to the REPEAT screen, the number previously chosen will appear in the numerical display portion 216 of the display 106, and the user may again press the ENTER button to increase the number of repeat cycles.

FIG. 22Ci illustrates an alternative embodiment for a third option presented to a user after the ENTER button 202 is pressed in FIGS. 21C-21E. The PROGRAM portion 226 of the display 106 and the START portion 230 of the display 106 are illuminated. Rather than pressing the ENTER button 202 as in FIG. 22A, or pressing the down arrow button 204 once as in FIG. 22B, the down arrow button 204 is pressed two times (or the up arrow button 206 is pressed three times, etc.) to illuminate the REPEAT portion 234 of the display 106. Pressing the ENTER button 202 causes a number to appear in the numerical display portion 216 of the display 106. In some embodiments, the number shown in the numerical display portion 216 of the display 106 is the number of times that the program or a portion thereof will be executed (i.e., if 1 is selected, the program will occur one time; if 3 is selected, the program will occur three times). In some alternative embodiments, the number shown in the numerical display portion 216 of the display 106 is the number of times that the program or a portion thereof will be repeated (i.e., if 1 is selected, the program will occur two times; if 3 is selected, the program will occur four times). The number may also default to zero (e.g., in embodiments in which the number represents the number of times that the program is repeated) or to a number such as one (e.g., as illustrated in FIG. 22Ci, and preferred in embodiments in which the number represents the number of times that the program will be executed). The number may be increased and decreased in certain increments (e.g., one) with the up and down buttons 206, 204 (e.g., as illustrated with pressing the up arrow button 206 twice to increase the number of repeat cycles from 1 to 3). Pressing the ENTER button 202 returns to the initial PROGRAM screen illustrated at the top of FIG. 22Ci.

Figure 22D:
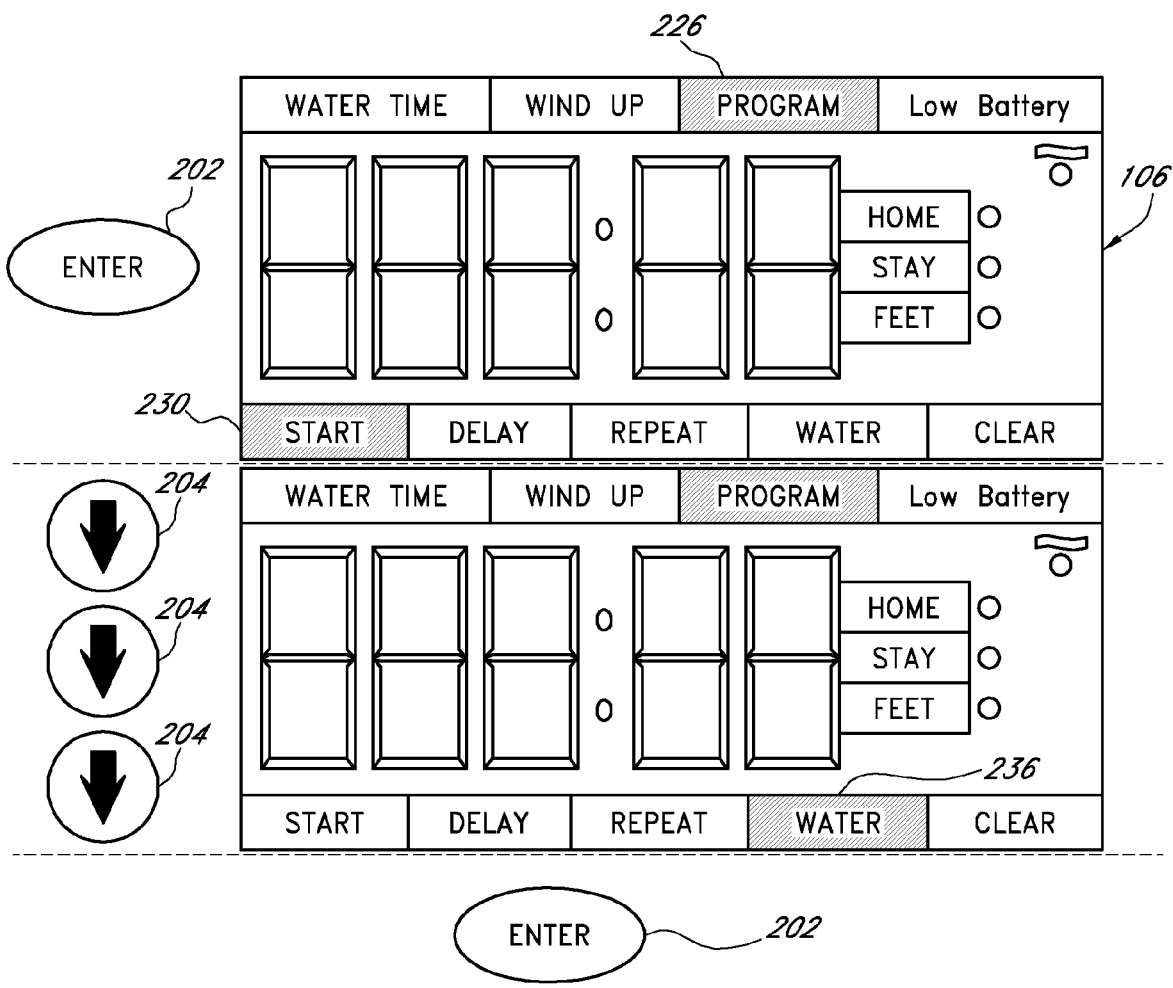

FIG. 22D illustrates a fourth option presented to a user after the ENTER button 202 is pressed in FIGS. 21C-21E. The PROGRAM portion 226 of the display 106 and the START portion 230 of the display 106 are illuminated. Rather than pressing the ENTER button 202 as in FIG. 22A, pressing the down arrow button 204 once as in FIG. 22B, or pressing the down arrow button twice as in FIG. 22C, the down arrow button 204 is pressed three times (or the up arrow button 206 is pressed two times, etc.) to illuminate the WATER portion 236 of the display 106. Pressing the ENTER button 202 causes the program to return to the WATER TIME screen (FIG. 20) for the entry of additional watering steps.

Figure 22E:
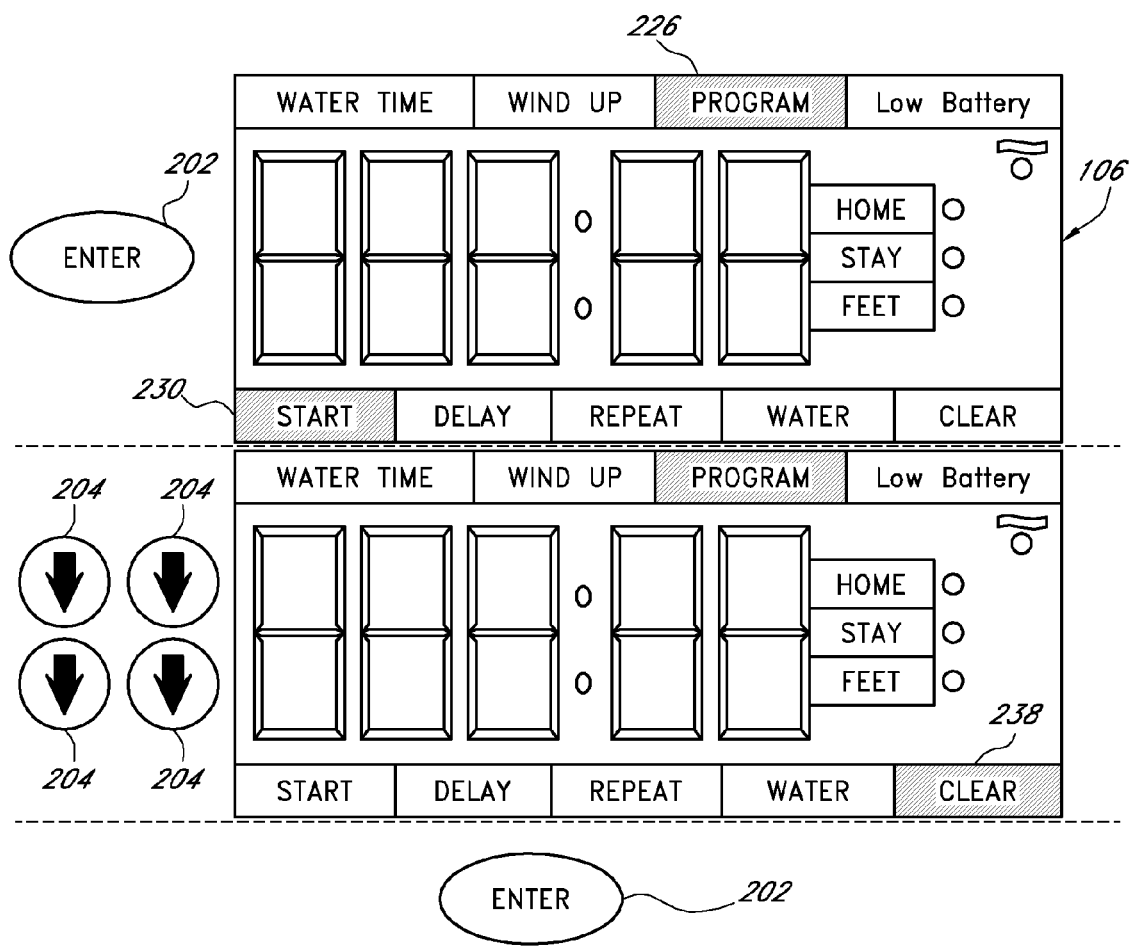

FIG. 22E illustrates a fifth option presented to a user after the ENTER button 202 is pressed in FIGS. 21C-21E. The PROGRAM portion 226 of the display 106 and the START portion 230 of the display 106 are illuminated. Rather than pressing the ENTER button 202 as in FIG. 22A, pressing the down arrow button 204 once as in FIG. 22B, pressing the down arrow button twice as in FIG. 22C, or pressing the down arrow button 204 three times as in FIG. 22D, the down arrow button 204 is pressed four times (or the up arrow button 206 is pressed one time, etc.) to illuminate the CLEAR portion 238 of the display 106. As described above with respect to FIG. 21B, pressing the ENTER button 202 while the CLEAR screen is shown will cause the entered program to be deleted. Such action may also shut down the programming device 100 or return the display 106 to the screen illustrated at the top of FIG. 20.

The embodiments and alternatives described above are only presented for illustration. In general, the arrow buttons 204, 206 may be used to scroll through the options and to modify (i.e., increase or decrease) the values exhibited on the numerical display portion 216 of the display 106, and the ENTER button 202 may be used to advance to the next level of programming. As such, the ENTER button 202 may, for example and without limitation, be called a "PROGRAM" button 202.

In certain embodiments, the programmatically controlled valve may occupy intermediate positions between fully open and fully closed to permit finer control of the fluid flow. In certain such embodiments, a WATER FLOW screen in which the user may select an intermediate position of the valve system is presented, for example, before or after the WATER TIME screen (e.g., FIG. 20). In some embodiments, controlling the flow of fluid by modifying the position of the valve system may act as a proxy for, or in combination with, the duration of watering (e.g., 10 minutes at a 50% open position may be used instead of 20 minutes at a 100% open position).

In certain embodiments, the hose reel is programmable to retract (e.g., to continuously retract) while watering. In certain such embodiments, a WHILE screen in which the user selects YES or NO is presented, for example, before or after the WATER TIME screen (e.g., FIG. 20). If YES is selected, the program may utilize the programmed water time and retract length to calculate a rate at which the hose reel will spool the hose while the water remains on (e.g., 1.5 feet per minute for 10 minutes and 15 feet). In certain other such embodiments, a RATE screen in which the user programs a retract rate is presented, for example, before or after the WATER TIME screen (e.g., FIG. 20). In some embodiments, the program spools the hose at the programmed rate for the watering duration (e.g., for an entire 10 minutes), followed by remaining stationary or winding the hose up the remaining programmed retract length. In some embodiments, the program spools the hose at the programmed rate until a certain length of hose has been wound up (e.g., for 15 feet), followed by continued watering or turning the flow of water off.

A detailed program example is provided below with respect to FIGS. 25A-25D, although it will be appreciated that such an apparatus and program offers a wide variety of possibilities for watering, spooling, and shutting off the water in a hose reel. Additionally, it will be appreciated that certain features described herein may be added, deleted, modified, and/or reordered. The display 106 may also be adjusted to correspond to such changes. In certain embodiments such as those that allow the use of a personal computer or personal digital assistant (PDA) to program the hose reel (e.g., via WiFi, Bluetooth, etc.), the screens and options may look quite different without departing from the spirit of the embodiments described herein.

Hose Retraction Guides and Watering Example

A hose reel typically does not have the ability to spool a hose directionally (i.e., a hose reel can generally retract a hose only linearly). In certain applications, the layout of a yard, garden, etc. presents a situation in which the hose desirably can turn while being spooled by the hose reel. In certain embodiments, at least one "retract guide" is used to directionally guide the hose as it is being spooled by the hose reel. The retract guide may be inserted into the ground (e.g., with an integrated stake) or may otherwise be stably positioned on the ground (e.g., with a weighted base).

Figure 23A:
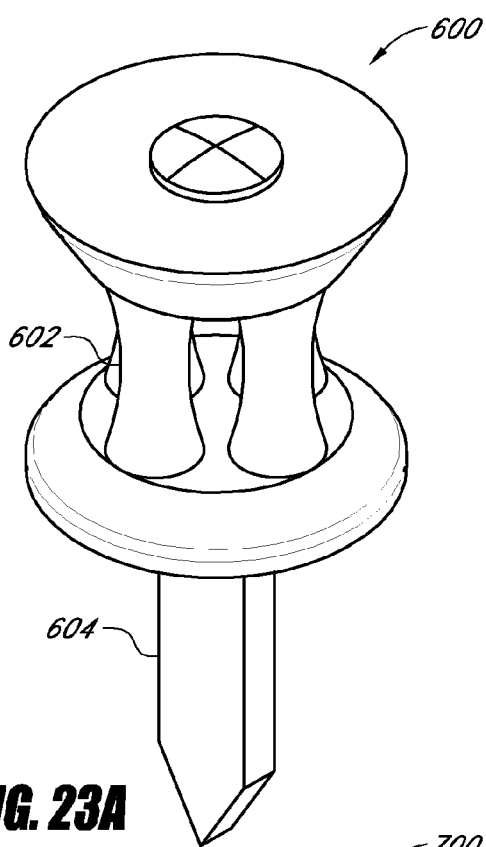
FIG. 23A illustrates a perspective view of an example embodiment of a retract guide.
Figure 23B:
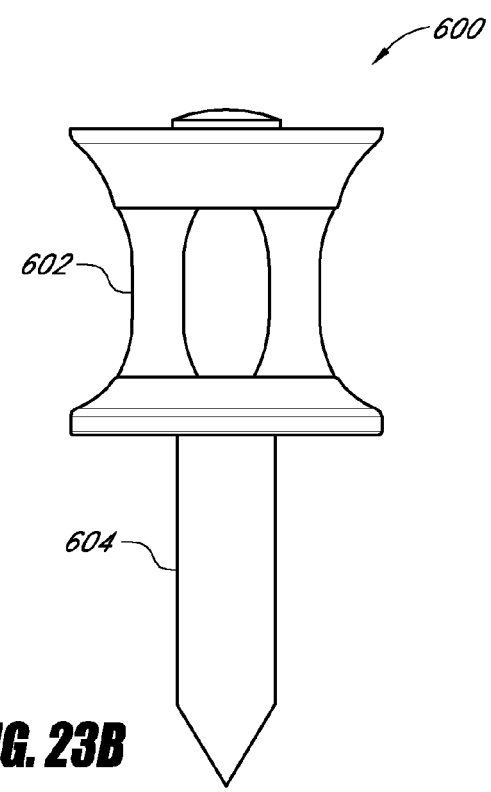
FIG. 23B illustrates a front elevational view of the retract guide of FIG. 23A.

FIGS. 23A and 23B illustrate an example embodiment of a retract guide 600 that may be used for directionally guiding a hose as it is being spooled by a hose reel. The retract guide 600 comprises a plurality of bearings 602 (e.g., ball bearings) to reduce the amount of friction as a hose rubs against the retract guide 600. The retract guide 600 further comprises a stake portion 604 adapted to secure the retract guide 600 to the ground.

Figure 24A:
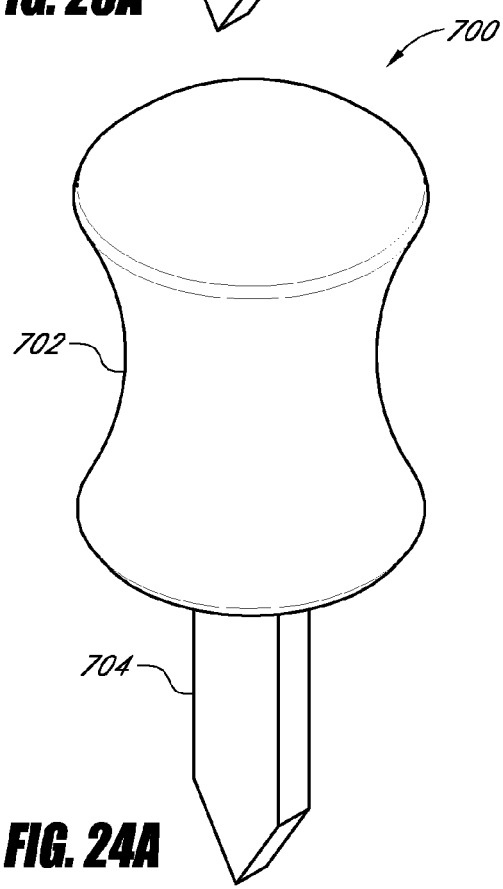
FIG. 24A illustrates a perspective view of another example embodiment of a retract guide.
Figure 24B:
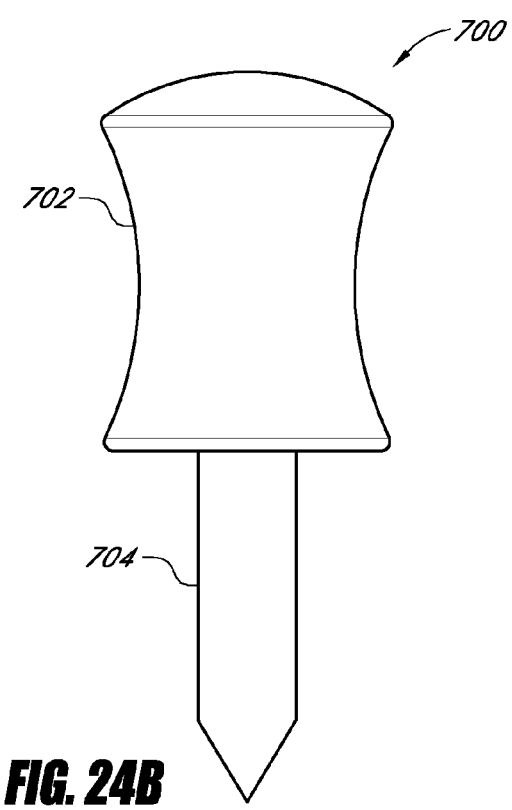
FIG. 24B illustrates a front elevational view of the retract guide of FIG. 24A.

FIGS. 24A and 24B illustrate another example embodiment of a retract guide 700 that may be used for directionally guiding a hose as it is being spooled by a hose reel. The retract guide 700 comprises a channel portion 702 adapted to receive a hose. The surface of the channel 702 may be coated (e.g., with Teflon® or the like) to reduce the amount of friction as the hose rubs against the retract guide 700. The retract guide 700 further comprises a stake portion 704 adapted to secure the retract guide 700 to the ground. Other retract guides are also possible (e.g., a guide 700 in which the channel 702 rotates with respect to the stake portion 704).

Figure 25A:
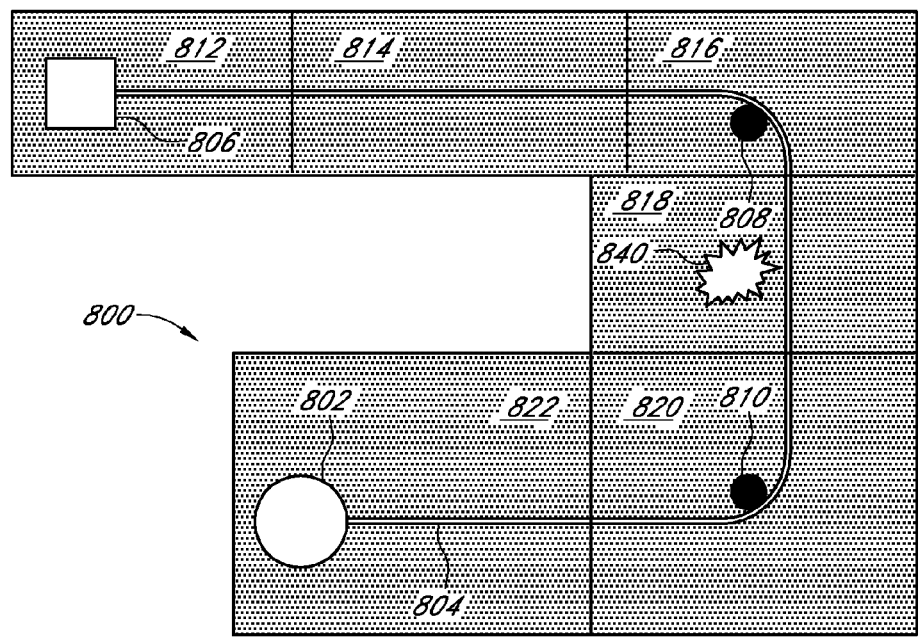
FIGS. 25A-25D schematically illustrate an example use of retract guides for spooling a hose.

FIG. 25A illustrates an example embodiment of a U-shaped yard 800 to be watered with a hose 804 having a sprinkler 806 on an end of the hose 804 distal to the hose reel 802. The hose 804 is fluidly coupled to a hose reel 802, which is in fluid communication with an outdoor faucet. The yard 800 may be divided into a plurality of portions (e.g., the portions 812, 814, 816, 818, 820, 822), each to be watered by the sprinkler 806. The hose 804 is disposed around a plurality of retract guides 808, 810 (e.g., comprising the retract guide 600, the retract guide 700) to directionally guide the hose 804 as it is being spooled into the hose reel 802. Skilled artisans will appreciate from the teachings herein that the number and arrangement of retract guides can vary depending on the geometry of the area to be watered (e.g., yard, garden, grove, etc.) and the desired watering program.

Figure 25B:
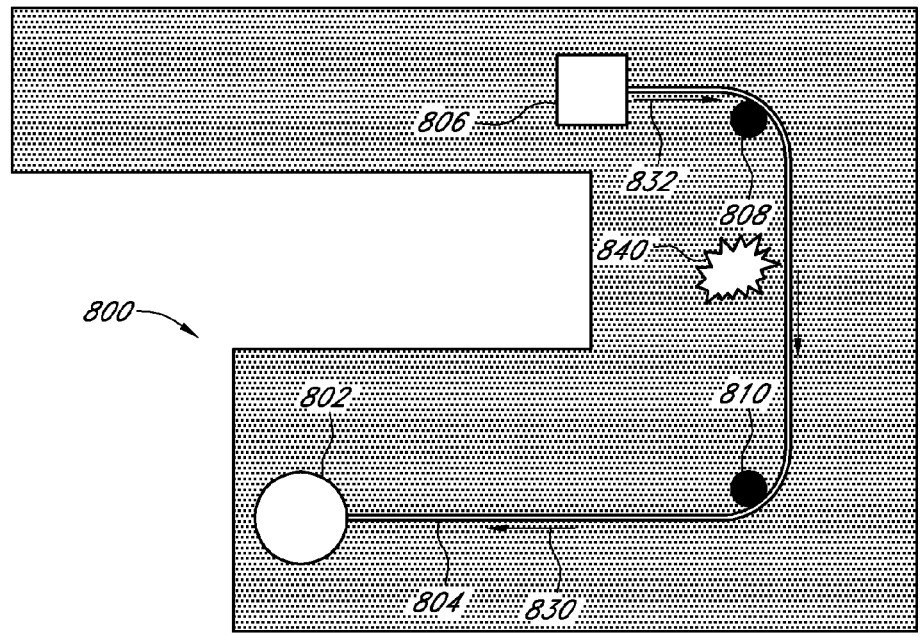
Figure 25C:
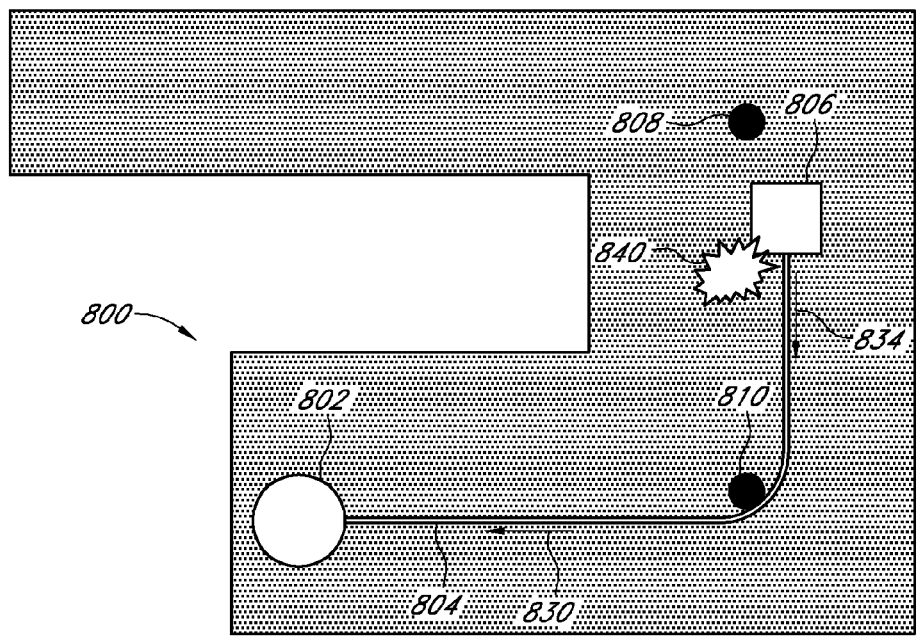
Figure 25D:
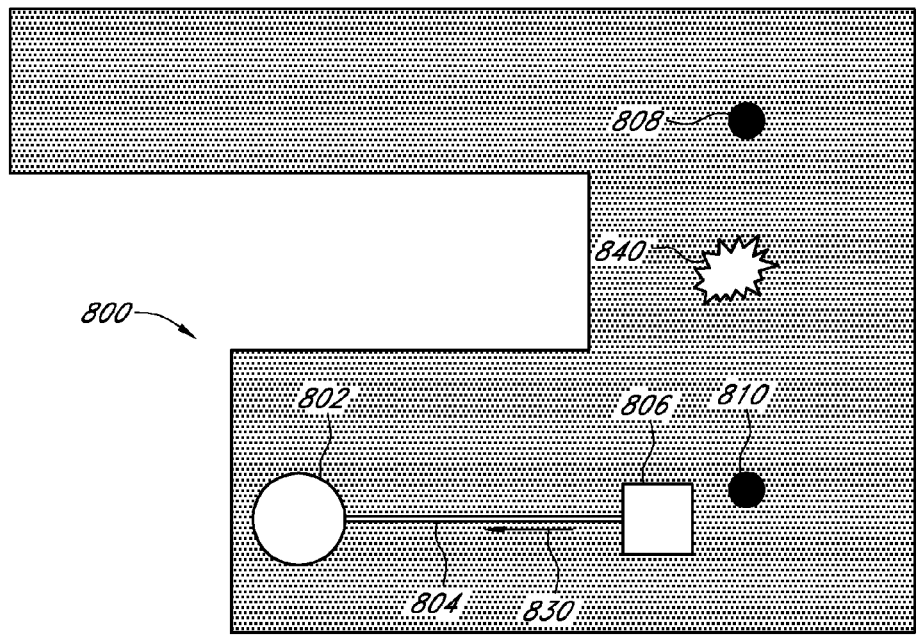

As illustrated in FIG. 25B, as the hose reel 802 retracts the hose 804 to the left, as indicated by the arrow 830, the distal end of the hose 804 and the sprinkler 806 are pulled to the right, as indicated by the arrow 832, due to the guidance of the retract guides 808, 810. FIG. 25C illustrates the system after the distal end of the hose 804 and the sprinkler 806 have been pulled past the retract guide 808. As the hose reel 802 continues to retract the hose 804 to the left, as indicated by the arrow 830, the distal end of the hose 804 and the sprinkler 806 are pulled down, as indicated by the arrow 834, due to the guidance of the retract guide 810. FIG. 25D illustrates the system after the distal end of the hose 804 and the sprinkler 806 have been pulled past the retract guide 810. As the hose reel 802 continues to retract the hose 804 to the left, as indicated by the arrow 830, the distal end of the hose 804 and the sprinkler 806 are now also pulled to the left because they are not guided by a retract guide. Thus, although the hose reel 802 can retract the hose 804 in a single direction, it may be used to water a plurality of yard positions that are not in a straight line, such as the portions 812, 814, 816, 818, 820, 822 of the yard 800.

An example program for the yard 800 will now be described. It will be appreciated that the hose 804 and the sprinkler 806 are positioned as depicted in FIG. 25A prior to execution of the program (i.e., with the sprinkler 806 in the portion 812 of the yard 800 and the hose 804 wrapped around the retract guides 808, 810). If the user makes a mistake at any point in the programming process, the ENTER button 202 may be pressed while in the CLEAR screen, and the user can then reprogram the hose reel and associated water valve.

The ENTER button 202 is pressed to activate the programming device 100, which begins with an illuminated WATER TIME screen (e.g., FIG. 20). A default water time of 0 minutes appears in the numerical display area 216 of the display 106, but the user presses the up arrow button 206 one time to increase the duration to 15 minutes. The user believes that 15 minutes is sufficient for the portion 812 of the yard 800, and presses the ENTER button 202.

The WIND UP screen (e.g., FIGS. 21A-21E) is then illuminated. The user does not want the hose 804 to fully wind into the hose reel 802 after only watering the portion 812 of the yard 800, so the HOME option is not used. The user also does not want the hose 804 to remain in the portion 812 of the yard 800, so the STAY option is not used. Accordingly, the user presses the up and down arrow buttons 206, 204 to toggle from the HOME screen (e.g., FIG. 21A) to the FEET screen (e.g., FIGS. 21D and 21E) (e.g., by pressing the up arrow button 206 one time or the down arrow button 204 two times), and then the user presses the ENTER button 202. The default of 10 feet is shown in the numerical display portion 216 of the display 106. The user believes that spooling the hose 804 into the hose reel 802 by 10 feet is sufficient, and presses the ENTER button 202.

The PROGRAM screen (e.g., FIGS. 22A-22E) is then illuminated. The user presses the up and down arrow buttons 206, 204 to toggle from the START screen (e.g., FIG. 22A) to the WATER screen (e.g., FIG. 22D) and then presses the ENTER button 202, which would return the user to the WATER TIME screen (e.g., FIG. 20).

The user repeats the process a second time, but chooses different options for watering the portion 814 of the yard 800. The portion 814 of the yard 800 is slightly larger than the portion 812 of the yard 800, so the user wants to increase the duration of watering. Thus, the user presses the up and down arrow buttons 206, 204 to increase the duration displayed in the numerical display portion 216 of the display 106 from 15 minutes to 25 minutes. The ENTER button 202 is pressed to advance to the WIND UP screen (e.g., FIGS. 21A-21E). The user again uses the up and down arrow buttons 206, 204 to toggle from the HOME screen (e.g., FIG. 21A) to the FEET screen (e.g., FIGS. 21D and 21E). However, rather than accepting the default of 10 feet, the user uses the up arrow button 206 to increase to 20 feet the amount that the hose 804 is spooled into the hose reel 802, which is displayed on the numerical display portion 216 of the display 106. The ENTER button 202 is pressed to advance to the PROGRAM screen (e.g., FIGS. 22A-22E), and the up and down arrow buttons 206, 204 are used to advance to the WATER screen (e.g., FIG. 22D). The user presses the ENTER button 202, returning the program to the WATER TIME screen (e.g., FIG. 20).

The user repeats the process a third time, but chooses still different options for watering the portion 816 of the yard 800. The portion 816 of the yard 800 includes plants that need a lot of water, but which are planted in soil that does not absorb water quickly. Thus, the user would like to perform a first short-duration watering and a second longer-duration watering. Beginning in the WATER TIME screen (e.g., FIG. 20), the up and down arrows 206, 204 are pressed to decrease the duration displayed in the numerical display portion 216 of the display 106 from 15 minutes (default) to 10 minutes. The ENTER button 202 is pressed to advance to the WIND UP screen (e.g., FIGS. 21A-21E). Because the user does not want to retract the hose 804 after this first short watering, the user uses the up and down arrow buttons 206, 204 to toggle from the HOME screen (e.g., FIG. 21A) to the STAY screen (e.g., FIG. 21C). The ENTER button 202 is pressed to advance to the PROGRAM screen (e.g., FIGS. 22A-22E), and the up and down arrow buttons 206, 204 are used to advance to the WATER screen (e.g., FIG. 22D). The user presses the ENTER button 202, returning the program to the WATER TIME screen (e.g., FIG. 20).

The user repeats the process a fourth time, choosing different options for continuing to water the portion 816 of the yard 800. Beginning in the WATER TIME screen (e.g., FIG. 20), the up and down arrows 206, 204 are pressed to increase the duration displayed in the numerical display portion 216 of the display 106 from 15 minutes (default) to 20 minutes. The ENTER button 202 is pressed to advance to the WIND UP screen (e.g., FIGS. 21A-21E). The user would like to spool the hose after this long-duration watering. The user again uses the up and down arrow buttons 206, 204 to toggle from the HOME screen (e.g., FIG. 21A) to the FEET screen (e.g., FIGS. 21D and 21E). The default of 10 feet is shown in the numerical display portion 216 of the display 106. The user believes that spooling the hose 804 into the hose reel 802 by 10 feet is sufficient, and presses the ENTER button 202. The ENTER button 202 is pressed to advance to the PROGRAM screen (e.g., FIGS. 22A-22E), and the up and down arrow buttons 206, 204 are used to advance to the DELAY screen (e.g., FIG. 22B) so as to insert a pause between the short-duration watering and the long-duration watering (i.e., a delay time is applied before the water time presently being programmed). The default time of 10 minutes is not long enough for the water to seep in after the short-duration watering, so the up and down arrows 206, 204 are pressed to increase the duration displayed in the numerical display portion 216 of the display 106 from 10 minutes to 25 minutes. The user presses the ENTER button 202, and the up and down arrow buttons 206, 204 are used to advance to the WATER screen (e.g., FIG. 22D). The user presses the ENTER button 202, returning the program to the WATER TIME screen (e.g., FIG. 20).

The user repeats the process a fifth time, but chooses yet different options for watering the portion 818 of the yard 800. The portion 818 of the yard 800 includes a tree 840 that needs a lot of water, so the user presses the up and down arrow buttons 206, 204 to increase the duration displayed in the numerical display portion 216 of the display 106 from 15 minutes to 2 hours. The ENTER button 202 is pressed to advance to the WIND UP screen (e.g., FIGS. 21A-21E). The user again uses the up and down arrow buttons 206, 204 to toggle from the HOME screen (e.g., FIG. 21A) to the FEET screen (e.g., FIGS. 21D and 21E). The default of 10 feet is shown in the numerical display portion 216 of the display 106. The user believes that spooling the hose 804 into the hose reel 802 by 10 feet is sufficient, and presses the ENTER button 202. The ENTER button 202 is pressed to advance to the PROGRAM screen (e.g., FIGS. 22A-22E), and the up and down arrow buttons 206, 204 are used to advance to the WATER screen (e.g., FIG. 22D). The user presses the ENTER button 202, returning the program to the WATER TIME screen (e.g., FIG. 20).

The user repeats the process a sixth time, but chooses still yet different options for watering the portion 820 of the yard 800. The portion 820 of the yard 800 has harsh topography, so the user wants several short waterings at different positions. The user presses the up and down arrow buttons 206, 204 to decrease the duration displayed in the numerical display portion 216 of the display 106 from 15 minutes to 5 minutes. The ENTER button 202 is pressed to advance to the WIND UP screen (e.g., FIGS. 21A-21E). The user again uses the up and down arrow buttons 206, 204 to toggle from the HOME screen (e.g., FIG. 21A) to the FEET screen (e.g., FIGS. 21D-21E). The default of 10 feet is shown in the numerical display portion 216 of the display 106. The user would like to advance the hose only 5 feet, so uses the up and down arrow buttons 206, 204 to decrease to 5 feet the amount that the hose 804 is spooled into the hose reel 802, which is displayed on the numerical display portion 216 of the display 106. The user presses the ENTER button 202, and the up and down arrow buttons 206, 204 are used to advance to the REPEAT screen (e.g., FIG. 22C). The default of 1 repeat cycle is shown in the numerical display portion 216 of the display 106 (in this example representing the number of times that the program is executed), and the user presses the ENTER button 202 twice to increase the number of repeat cycles to 3. The user then presses the up and down arrow buttons 206, 204 to scroll through other options available in the PROGRAM screen (e.g., FIGS. 22A-22E). No other options are desired, so the user toggles to the WATER screen (e.g., FIG. 22D) and presses the ENTER button 202, returning the program to the WATER TIME screen (e.g., FIG. 20).

The user repeats the process a seventh time, but chooses different options for watering the portion 822 of the yard 800. The portion 822 of the yard 800 is the last portion to be watered, so the hose 804 should be spooled onto the hose reel 802 after that watering. The user presses the up and down arrow buttons 206, 204 to increase the duration displayed in the numerical display portion 216 of the display 106 from 15 minutes to 45 minutes. The ENTER button 202 is pressed to advance to the WIND UP screen (e.g., FIGS. 21A-21E). The user wants the hose 804 to fully wind into the hose reel 802 after watering the portion 822 of the yard 800, so the ENTER button 202 is pressed. The START screen (e.g., FIG. 21A) appears, and the user presses the ENTER button 202 to begin executing the program.

The program will be executed as follows: the water will turn on with the sprinkler 806 in the portion 812, run for 15 minutes, be turned off, then the hose 804 will retract 10 feet until the sprinkler 806 is in the portion 814; the water will turn on with the sprinkler 806 in the portion 814, run for 30 minutes, be turned off, then the hose 804 will retract 20 feet until the sprinkler 806 is in the portion 816; the water will turn on with the sprinkler 806 in the portion 816, run for 10 minutes, then be turned off for 20 minutes; the water will again turn on with the sprinkler 806 in the portion 816, run for 20 minutes, be turned off, then the hose 804 will retract 10 feet until the sprinkler 806 is in the portion 818; the water will turn on with the sprinkler 806 in the portion 818, run for 2 hours, be turned off, then the hose 804 will retract 10 feet until the sprinkler 806 is in the portion 820; the water will turn on with the sprinkler 806 in the portion 820, run for 5 minutes, be turned off, then the hose 804 will retract 5 feet; the water will turn on with the sprinkler 806 in the portion 820, run for 5 minutes, be turned off, then the hose 804 will retract 5 feet; the water will turn on with the sprinkler 806 in the portion 820, run for 5 minutes, be turned off, then the hose 804 will retract 5 feet until the sprinkler 806 is in the portion 822; and the water will turn on with the sprinkler 806 in the portion 822, run for 45 minutes, be turned off, then the hose 804 will retract completely onto the hose reel 802.

It will be appreciated that this program is only for the purposes of illustration and is not intended to be limiting. A wide variety of possibilities are presented by various types of plants, sprinkler heads, yard shapes, and the like. For example, the water may be running while the hose 804 is being retracted. In certain such embodiments, the water may run while the hose 804 is being partially retracted, but is turned off while the hose 804 is being fully or completely retracted. The options discussed herein and others apparent to those of skill in the art may be combined to create a simple or complex watering scheme.

Retractable Sprinklers

As a hose is retracted, it may twist about a longitudinal axis. When a sprinkler is coupled to the hose, this may result in the sprinkler also rotating, such that it is no longer upright and does not function properly, which can be problematic in systems adapted for little user monitoring (e.g., the programmable hose reels described above). In order to avoid such capsizing of a sprinkler, a specialized sprinkler head is preferably used.

Figures 26A, 26B, 26C:
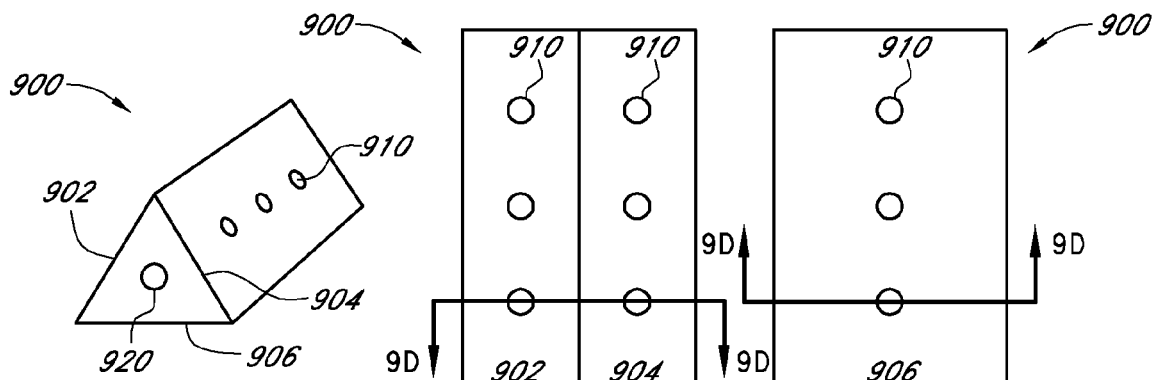
FIG. 26A is a perspective view of an example embodiment of a sprinkler adapted for use with a spoolable hose.
FIG. 26B is a top elevational view of the sprinkler of FIG. 26A.
FIG. 26C is a bottom elevational view of the sprinkler of FIG. 26A.

FIG. 26A illustrates an example embodiment of a sprinkler 900 that is adapted to function properly even if it is twisted, for example during the spooling of hose attached thereto. The sprinkler 900 includes a plurality of sides 902, 904, 906. Although illustrated as a triangle, other shapes are also possible. FIG. 26B is a top elevational view of the sprinkler 900. FIG. 26C is a bottom elevational view of the sprinkler 900. As can be seen in FIGS. 26B and 26C, each of the sides 902, 904, 906 includes at least one aperture 910. In some embodiments, the aperture 910 comprises an elongate slit. In certain embodiments, sprinkler 900 comprises a triangular frame such that the at least one aperture 910 takes up most of each of the sides 902, 904, 906.

Figures 26D, 26E:
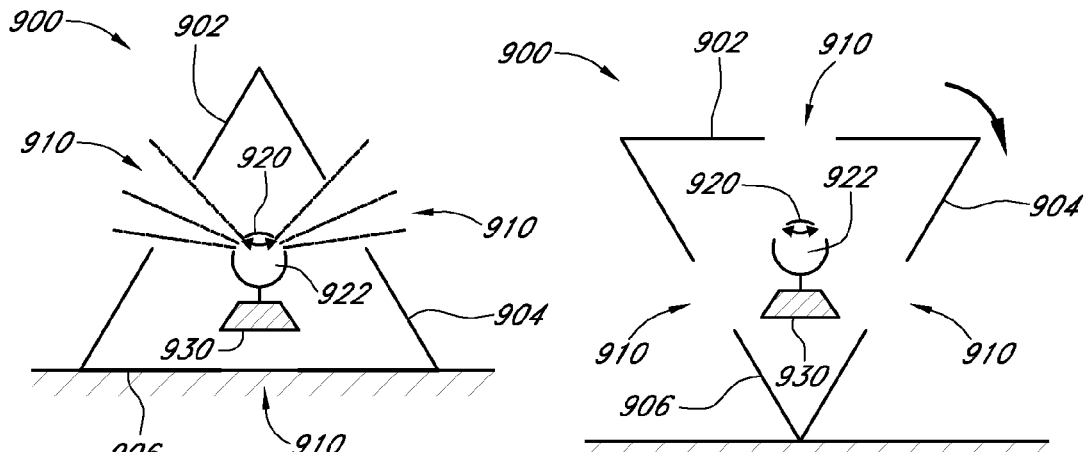
FIG. 26D is a cross-sectional view of the sprinkler of FIG. 26A taken along the line 26D-26D in FIGS. 26B and 26C.
FIGS. 26E and 26F are cross-sectional views of the sprinkler of FIG. 26A in rotated positions.
Figure 26F:
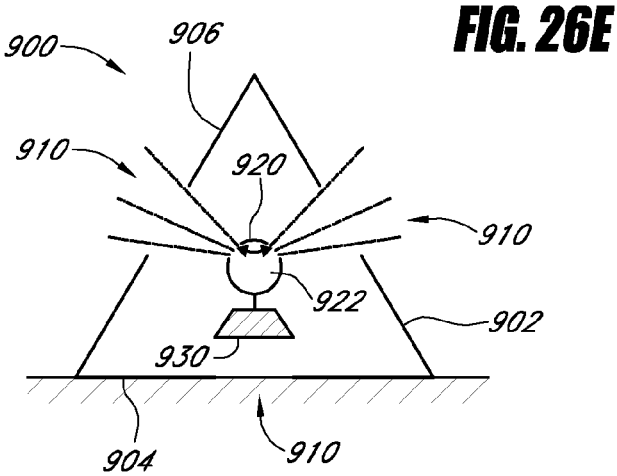

FIG. 26D is a cross-section of the sprinkler 900 of FIG. 26A taken along the lines 26D-26D of FIGS. 26B and 26C. The sprinkler 920 includes a flow conduit 920. The conduit 920 is closed at a first end, which is rotatably mounted to the frame of the sprinkler 900, and is in fluid communication with a hose at a second end (e.g., via a slip swivel). Thus, the conduit 920 has a full 360° range of rotation about a longitudinal axis. As water flows into the conduit 920 from the hose, it is released through a plurality of apertures 922. The apertures 922 are configured to line up with the apertures 910 in the sides of the sprinkler 900 (e.g., the side 902 and the side 904, as illustrated in FIG. 26D) such that water spraying out of the apertures 922 also sprays out of the apertures 910. The conduit 922 is coupled to a weight 930. Gravity acts on the weight 930 such that the conduit 920 comes to rest in the same position, regardless of the orientation of the sprinkler housing. FIG. 26E shows an example of the rotation of the sprinkler 900 (e.g., due to the spooling of a hose attached thereto). In FIG. 26F, the sprinkler 900 settles on the side 904 (i.e., having completed a 120° rotation), with the sides 902, 906 now exposed. The apertures 922 in the conduit 920, which is in the same position as in FIG. 26D, are also lined up with the apertures 910 in the sides 902, 906 such that water may flow out of the sprinkler.

Although the sprinkler 900 will remain in a correct watering position regardless of its vertical orientation, the edges may become caught in the retract guides discussed above. Additionally, the sprinkler 900 may have limited flow use due to the size of the apertures 910. Thus, it is desirable for the sprinkler to have a robust flow, remain upright, and not become tangled in the retract guides.

Figure 27A:
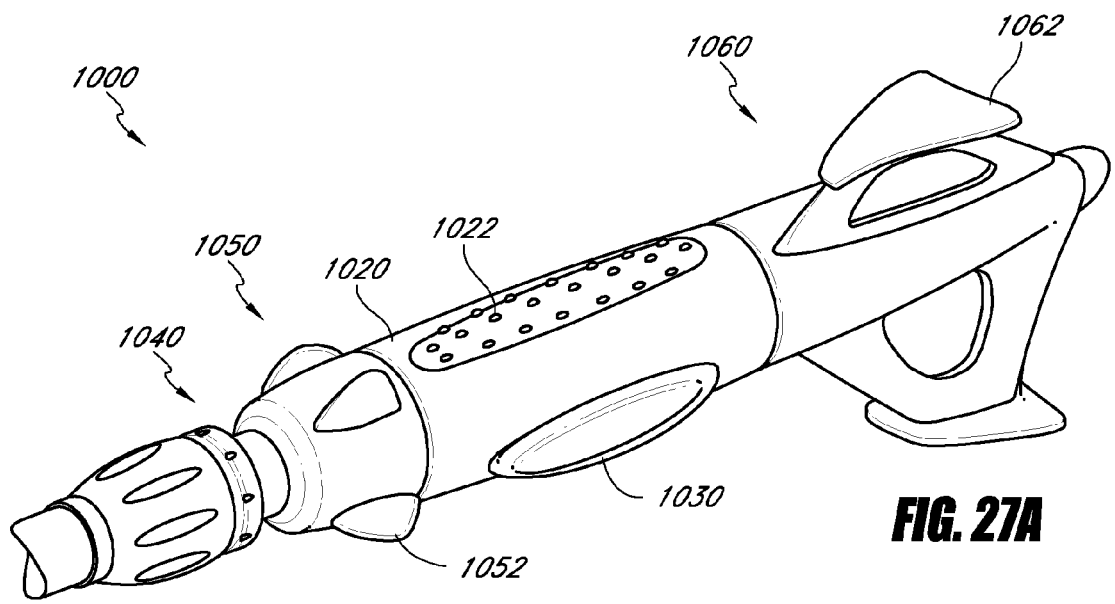
FIG. 27A is a perspective view of another example embodiment of a sprinkler adapted for use with a spoolable hose.
Figure 27B:
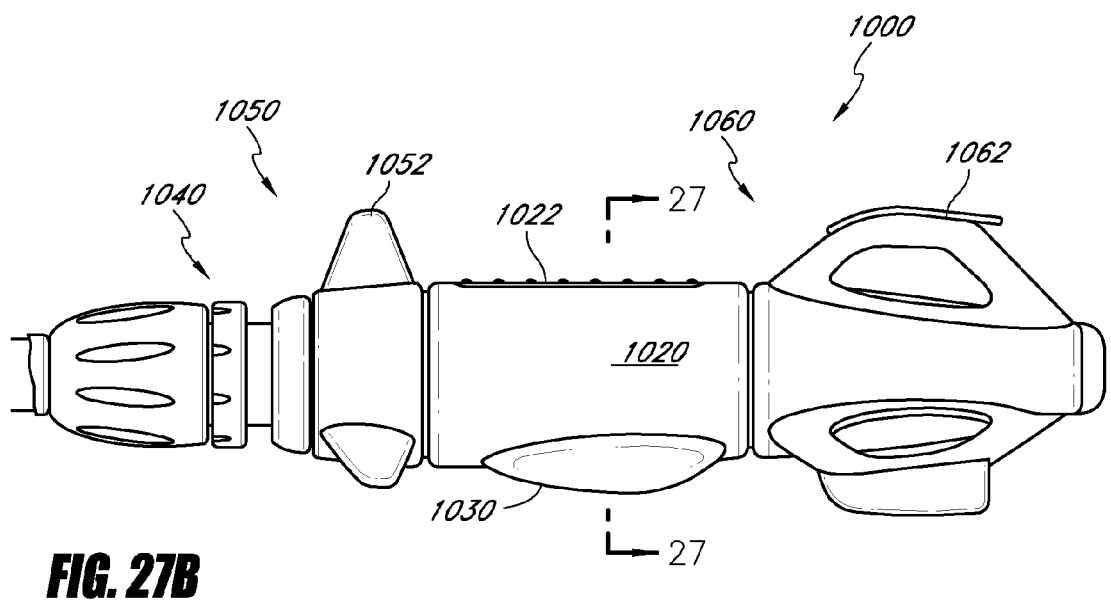
FIG. 27B is a side elevational view of the sprinkler of FIG. 27A.
Figure 27C:
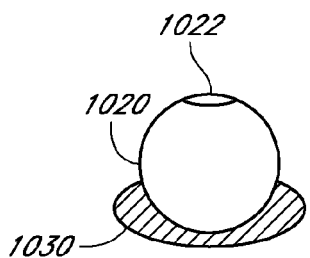
FIGS. 27C and 27D are cross-sectional views of example embodiments of the sprinkler of FIG. 27A taken along the line 27-27 in FIG. 27B.
Figure 27D:
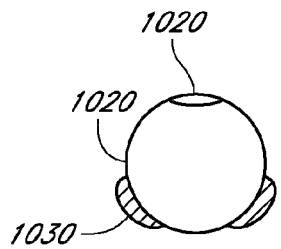

FIG. 27A illustrates a perspective view of an example embodiment of a sprinkler 1000 comprising a conduit 1020 having a plurality of apertures 1022 and coupled to a weight 1030. Rather than being encased in a shell (e.g., like the sprinkler 900), the conduit 1020 extends between a first end 1050 and a second end 1060. The conduit 1020 is closed and rotatably mounted to the second end 1060, and is in fluid communication with a hose at the first end 1050 via a slip swivel 1040. The first end 1050 comprises a plurality of raised projections 1052 that are configured to support the sprinkler 1000 such that the conduit 1020 and weight 1030 do not touch the ground, and are configured such that they do not become tangled in retract guides (e.g., by comprising surfaces that are angled away from the hose). The second end 1060 also comprises a plurality of raised projections 1062 that are configured to support the sprinkler 1000 such that the conduit 1020 and weight 1030 do not touch the ground, and are configured such that they do not become tangled in retract guides (e.g., by comprising surfaces that are angled away from the hose). FIG. 27B is a side elevational view of the sprinkler 1000, and shows that the conduit 1020 comes to rest (due to the weight 1030) such that the apertures 1022 face generally upward. In some embodiments, the weight 1030 wraps around a side portion of the conduit 1020 substantially opposite to the apertures 1022 (e.g., as depicted in FIG. 27C). In certain embodiments, the sprinkler 1000 comprises a plurality of weights 1030 (e.g., as depicted in FIG. 27D) or a single weight 1030 positioned such that gravity causes the apertures 1022 to face generally upward in a resting state (e.g., by locating the weight(s) 1030 on the conduit 1020 at a position generally opposite that of the apertures 1022). In certain embodiments involving multiple weights 1030, the weights may have more ground clearance than in embodiments such as depicted in FIG. 27C. Referring again to FIG. 27B, the projections 1052 and the projections 1062 have surfaces that are angled to the right and do not have surfaces that would become tangled on a retract guide.

Figure 28A:
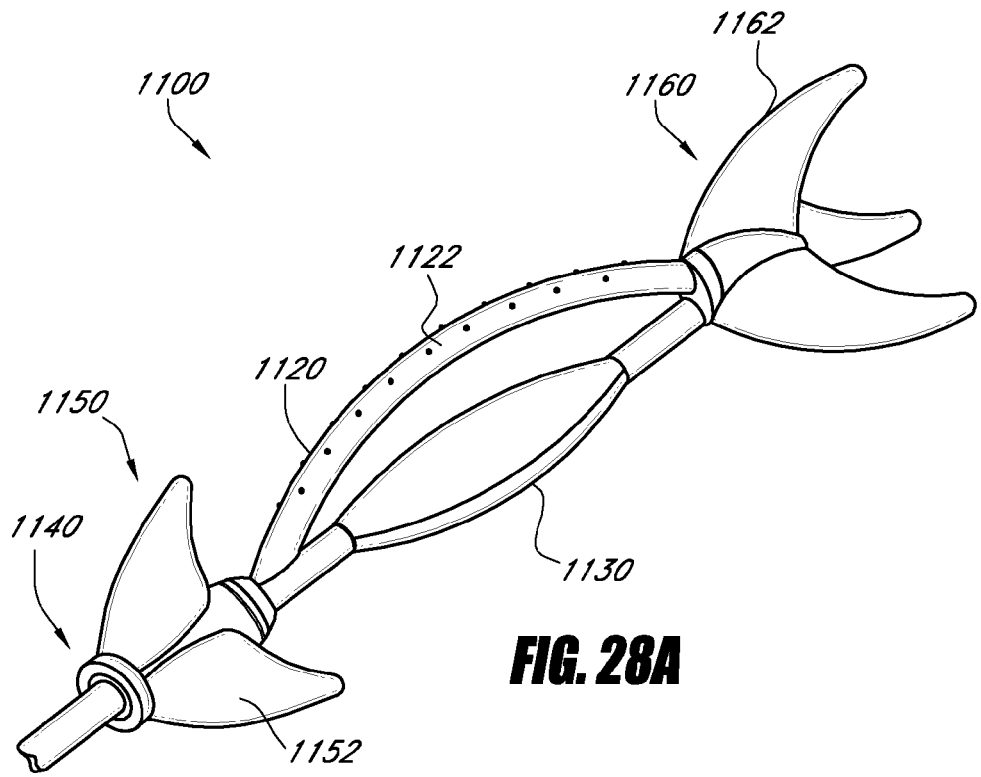
FIG. 28A is a perspective view of yet another example embodiment of a sprinkler adapted for use with a spoolable hose.
Figure 28B:
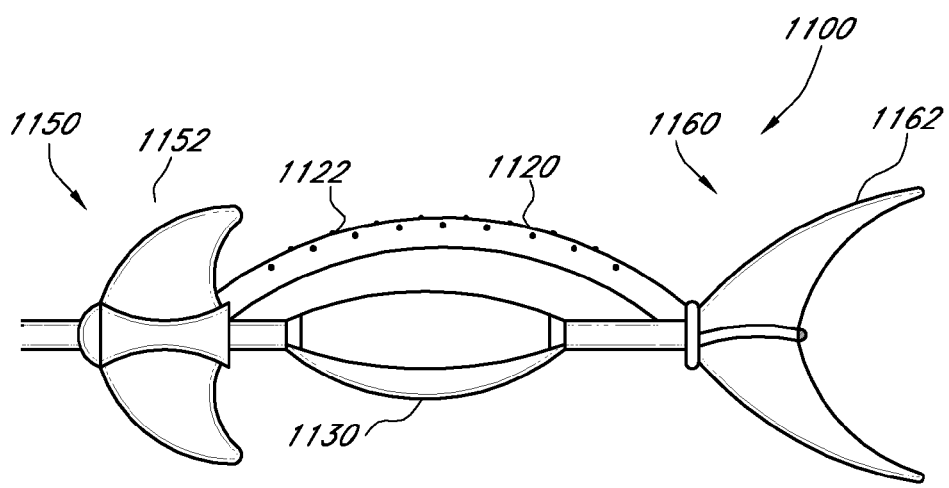
FIG. 28B is a side elevational view of the sprinkler of FIG. 28A.

FIG. 28A illustrates a perspective view of an example embodiment of a sprinkler 1100 comprising a conduit 1120 having a plurality of apertures 1122 and coupled to a weight 1130. The conduit 1120 extends between a first end 1150 and a second end 1160. The conduit 1120 is closed and rotatably mounted to the second end 1160, and is in fluid communication with a hose at the first end 1150 via a slip swivel 1140. The conduit 1120 is not straight, but bends in spaced relation to the weight 1130. The first end 1150 comprises a plurality of raised projections 1152 that are configured to support the sprinkler 1100 such that the conduit 1120 and weight 1130 do not touch the ground, and are configured such that they do not become tangled in retract guides (e.g., by comprising surfaces that are angled away from the hose). The second end 1160 also comprises a plurality of raised projections 1162 that are configured to support the sprinkler 1100 such that the conduit 1120 and the weight 1130 do not touch the ground, and are configured such that they do not become tangled in retract guides (e.g., by comprising surfaces that are angled away from the hose). The raised projections are preferably configured to not interfere with a spray of water out of the apertures. For example, the raised projections 1152, which are angled towards the conduit 1120, may be smaller than the raised projections 1162 (e.g., as illustrated in FIG. 28A). FIG. 28B is a side elevational view of the sprinkler 1100, and shows that the conduit 1120 comes to rest (due to the weight 1130) such that the apertures 1122 face generally upward.

Figure 29A:
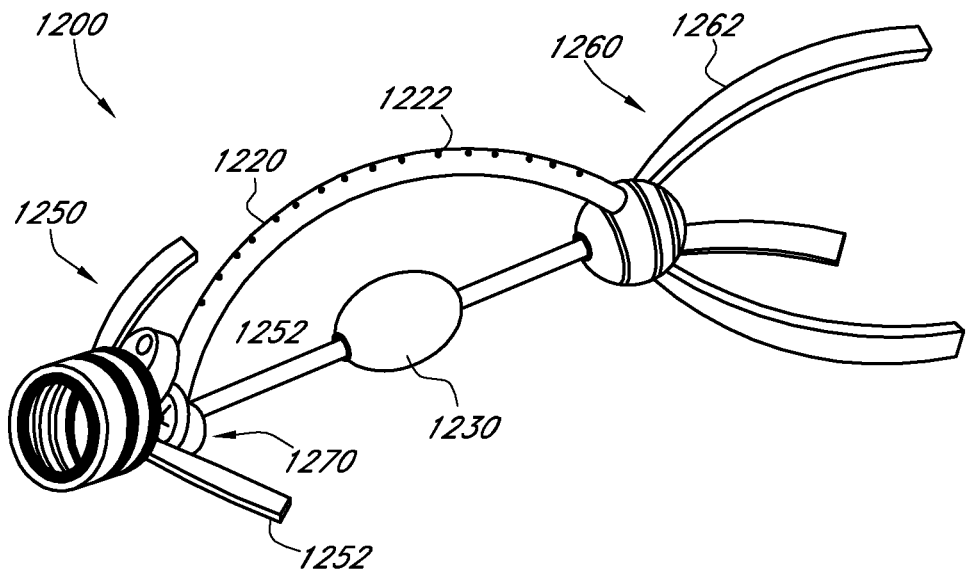
FIG. 29A is a perspective view of yet another example embodiment of a sprinkler adapted for use with a spoolable hose.

FIG. 29A illustrates a perspective view of an example embodiment of a sprinkler 1200 comprising a conduit 1220 having a plurality of apertures 1222 and coupled to a weight 1230. The conduit 1220 extends between a first end 1250 and a second end 1260. The conduit 1220 is closed and rotatably mounted to the second end 1260, and is in fluid communication with a hose at the first end 1250 (e.g., via a slip swivel). The conduit 1220 is not straight, but bends in spaced relation to the weight 1230. The first end 1250 comprises a plurality of raised projections 1252 that are configured to support the sprinkler 1200 such that the conduit 1220 and weight 1230 do not touch the ground, and are configured such that they do not become tangled in retract guides (e.g., by comprising surfaces that are angled away from the hose). The second end 1260 also comprises a plurality of raised projections 1262 that are configured to support the sprinkler 1200 such that the conduit 1220 and the weight 1230 do not touch the ground, and are configured such that they do not become tangled in retract guides (e.g., by comprising surfaces that are angled away from the hose). The raised projections are preferably configured to not interfere with a spray of water out of the apertures. For example, the raised projections 1252, which are angled towards the conduit 1220, may be smaller than the raised projections 1262 (e.g., as illustrated in FIG. 29). The conduit 1220 comes to rest (due to the weight 1230) such that the apertures 1222 face generally upward.

The sprinkler 1200 further comprises an oscillation mechanism 1270 between the slip swivel at the first end 1250 and rotatable coupling at the second end 1260 for oscillating the conduit 1220 back and forth to increase or maximize the watering area of the sprinkler 1200. The mechanism 1270 is coupled to the conduit 1220 and the weight 1230 such that the mechanism remains properly oriented with respect to the conduit 1220 upon rotation of the sprinkler 1200 (i.e., the mechanism 1270 comes to rest due to the weight 1230 such that it can properly function). In certain embodiments, the mechanism 1270 and the weight 1230 are designed such that the weight 1230 is sufficient to properly orient the mechanism 1270 and the conduit 1220, but such that the weight 1230 does not impede the oscillation caused by the mechanism 1270.

Figure 29B:
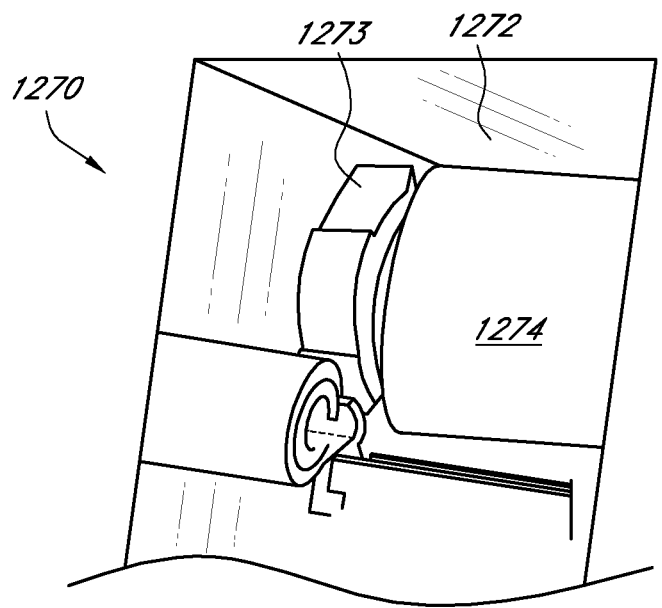
FIG. 29B is a cutaway view of an example embodiment of components of a sprinkler mechanism.
Figure 29C:
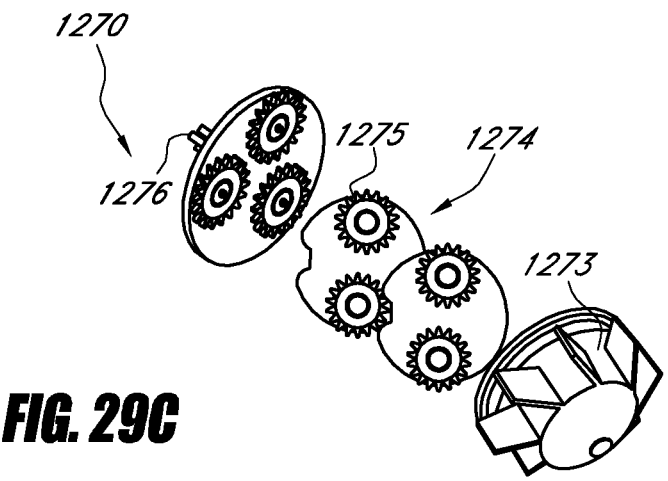
FIG. 29C is an exploded view of an example embodiment of additional components of the sprinkler mechanism of FIG. 29B.
Figure 29D:
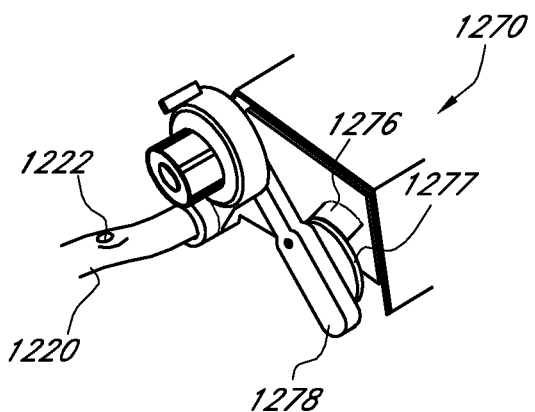
FIG. 29D is a perspective view of an example embodiment of still additional components of the sprinkler mechanism of FIG. 29B.

The mechanism 1270 may comprise a plurality of gears (e.g., a gear train), levers, cams, wheels (e.g., turbines), or other structures that utilize water pressure to oscillate a spray of water from the sprinkler 1200. In some embodiments, the mechanism 1270 includes a knob for adjusting the oscillation. FIGS. 29B-29D illustrate the components of an example embodiment of a mechanism 1270 that may be used to cause the conduit 1220 to oscillate. As depicted in FIG. 29B, the mechanism 1270 includes a casing 1272 containing a turbine 1273. As water flows into the casing 1272, the pressure causes the turbine 1273 to rotate. The turbine 1273 is mechanically coupled to a gear train 1274. FIG. 29C illustrates an exploded view of the gear train 1274, which comprises a plurality of gears 1275. In certain embodiments, the gear train 1274 reduces the amount of rotation to about 1 rotation per minute. The gear train 1274 is mechanically coupled to a cam 1276. Referring now to FIG. 29D, the cam 1276 is mechanically coupled to a wheel 1277, which is rotatably coupled to a shaft 1278 (also visible in FIG. 29A). As the cam 1276 rotates, the shaft 1278 pushes and pulls a conduit guide to which it is pivotally coupled, which causes the conduit 1220 to oscillate. Other oscillation mechanisms 1270 are also possible.

Figure 30A:
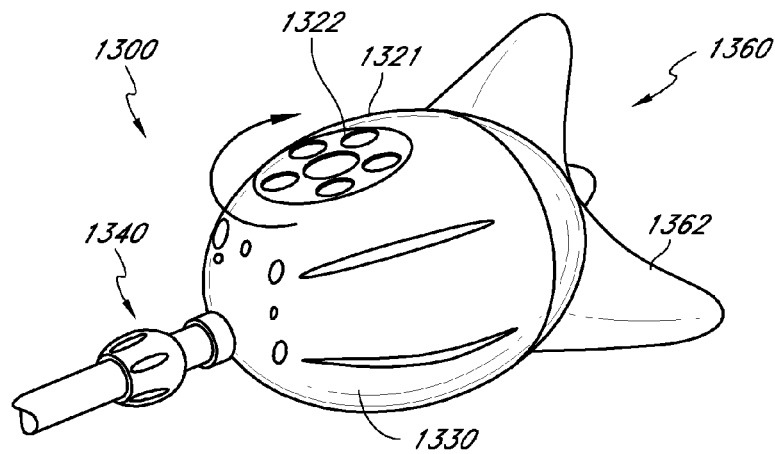
FIG. 30A is a perspective view of still another example embodiment of a sprinkler adapted for use with a spoolable hose.
Figure 30B:
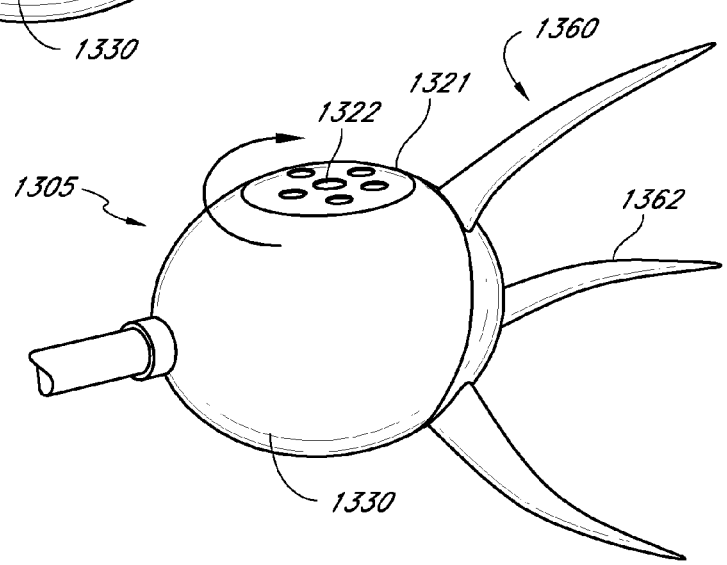
FIG. 30B is a perspective view of yet another example embodiment of a sprinkler adapted for use with a spoolable hose.

FIG. 30A illustrates a perspective view of an example embodiment of a sprinkler 1300 comprising a head 1321 having a plurality of apertures 1322 and a weight 1330 disposed on a side opposite to the apertures 1322. The head 1321 extends between a first end and a second end 1360. The head 1321 is rotatably mounted to the second end 1360, and is in fluid communication with a hose at the first end via a slip swivel 1340. The second end 1360 comprises a plurality of raised projections 1362 that are configured to support the sprinkler 1300 such that the head 1321 and the weight 1330 therein do not touch the ground, and are configured such that they do not become tangled in retract guides (e.g., by comprising surfaces that are angled away from the hose). The head 1321 comes to rest (due to the weight 1330) such that the apertures 1322 face generally upward. The sprinkler 1300 further comprises a mechanism (not shown) between the slip swivel 1340 at the second end 1360. The mechanism is disposed within the head 1321 such that the mechanism remains properly oriented with respect to the apertures 1322 upon rotation of the sprinkler 1300 (i.e., the mechanism comes to rest due to the weight 1330 such that it can properly function). FIG. 30B illustrates a perspective view of an example embodiment of a sprinkler 1305 having an alternative set of raised projections to the sprinkler 1300 of FIG. 30A.

The mechanism may comprise a plurality of gears (e.g., a gear train), levers, cams, wheels (e.g., turbines), or other structures that utilize water pressure to rotate a spray of water from the sprinkler 1300. In some embodiments, the mechanism includes a knob for adjusting the speed of rotation. In certain embodiments, the mechanism comprises many of the components of the mechanism 1270 depicted in FIGS. 29B-29D. However, rather than coupling the cam 1276 to a shaft 1278, the rotation of the cam 1276 causes rotation of the apertures 1322. Other rotation mechanisms are also possible.

Figure 31:
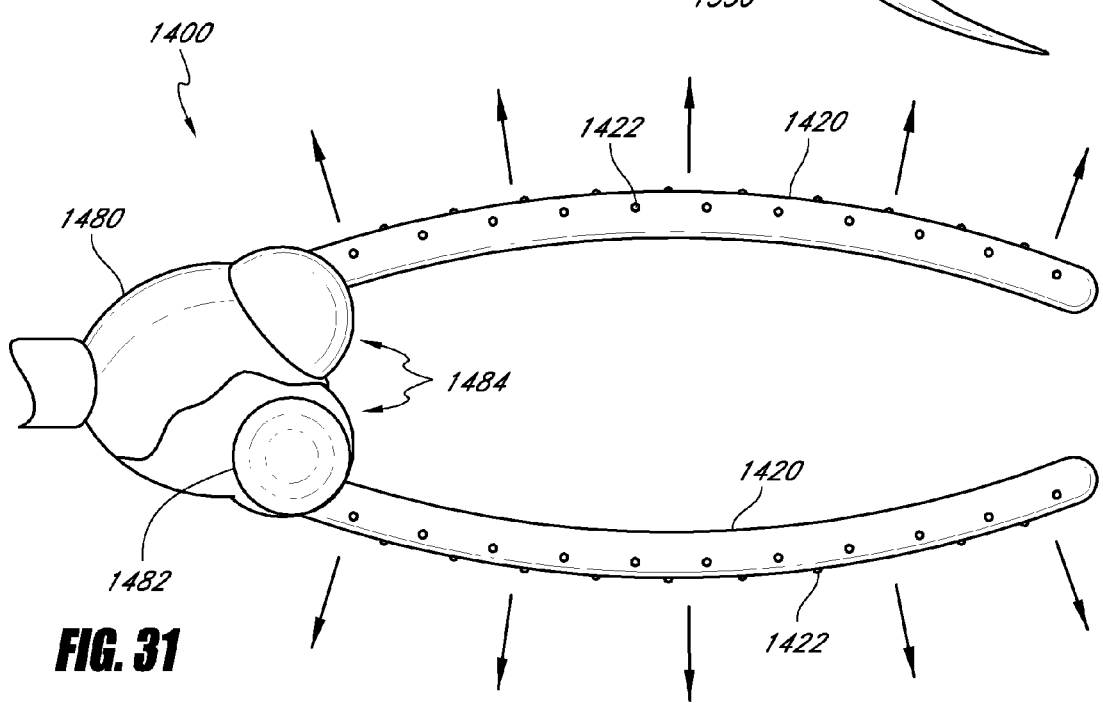
FIG. 31 is a partial cutaway side elevational view of still another example embodiment of a sprinkler adapted for use with a spoolable hose.

FIG. 31 illustrates a partial cutaway side elevational view of an example embodiment of a sprinkler 1400 comprising a valve system 1480 rather than a weight. The sprinkler comprises a plurality of conduits 1420, each having a plurality of apertures 1422. Each conduit 1420 is closed and mounted (e.g., rotatably mounted) to a frame (not shown) at a first end and is in fluid communication with the valve system 1480 at a second end 1484. The valve system 1480 is in fluid communication with a hose (e.g., via a slip swivel). The valve system 1480 comprises a ball 1482 that is heavier than the fluid to be used in the sprinkler (e.g., having a specific gravity greater than the specific gravity of water). In a rested state, the ball 1482 settles to the bottom of the valve system 1480 and occludes a second end 1484 of the lower conduit 1420. A fluid entering the sprinkler 1400 bypasses the occluded lower conduit 1420 (i.e., because the ball 1482 blocks the flow path) and flows through the open upper conduit 1420. In embodiments comprising three conduits 1420, two balls 1482 may be used to occlude the second ends of the lower two conduits 1420.

Figure 32:
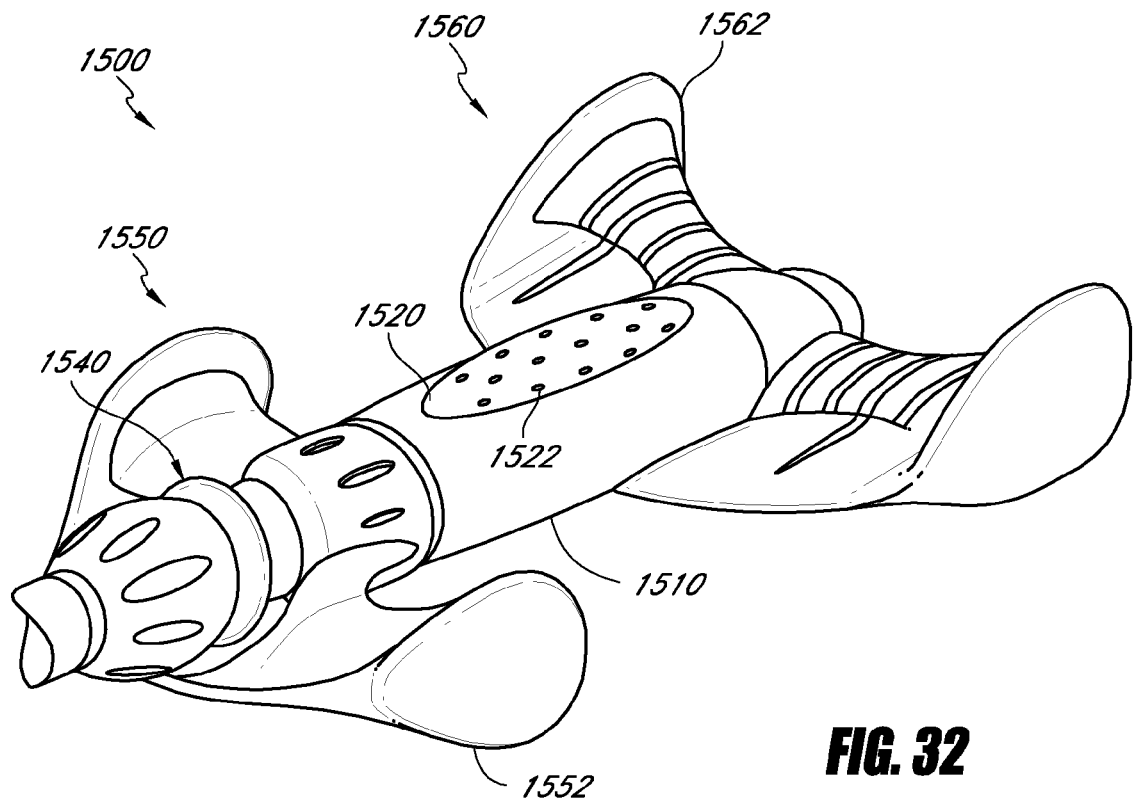
FIG. 32 is a perspective view of a further example embodiment of a sprinkler adapted for use with a spoolable hose.

FIG. 32 illustrates a perspective view of an example embodiment of a sprinkler 1500 comprising two conduits 1520 each having a plurality of apertures 1522. The conduits 1520 are partially encased in a housing 1510, but only a first conduit 1520 is shown because a second conduit 1520 is disposed in a bottom portion of the housing 1510. In some embodiments, the sprinkler 1500 rotated 180° would look the same as the orientation depicted in FIG. 32. Each of the conduits 1520 extends between a first end 1550 and a second end 1560. The conduits 1520 are closed and mounted (e.g., rotatably mounted) to the second end 1560, and are in fluid communication with a valve system (e.g., the valve system illustrated in FIG. 31) at the first end 1550. The valve system is in fluid communication with a hose (e.g., via a slip swivel 1540). The first end 1550 comprises a plurality of webbed raised projections 1552 that are configured to support the sprinkler 1500 such that the housing 1510 and the conduits 1520 therein are oriented in an up or down state, and configured such that they do not become tangled in retract guides (e.g., by comprising webbed surfaces that are angled away from the hose). The second end 1560 also comprises a plurality of webbed raised projections 1562 that are configured to support the sprinkler 1500 such that the housing 1510 and the conduits 1520 therein are oriented in an up or down state (e.g., by being on a same plane as the projections 1552), and are configured such that they do not become tangled in retract guides (e.g., by comprising webbed surfaces that are angled away from the hose). In an up state, the apertures of a first conduit 1520 face generally upward. In a down state, the apertures of a second conduit 1520 face generally upward. The raised projections are preferably configured to not interfere with a spray of water out of the apertures 1522. For example, the raised projections 1552, which are angled towards the housing 1510, are below an initial plane of water projection.

Figure 33:
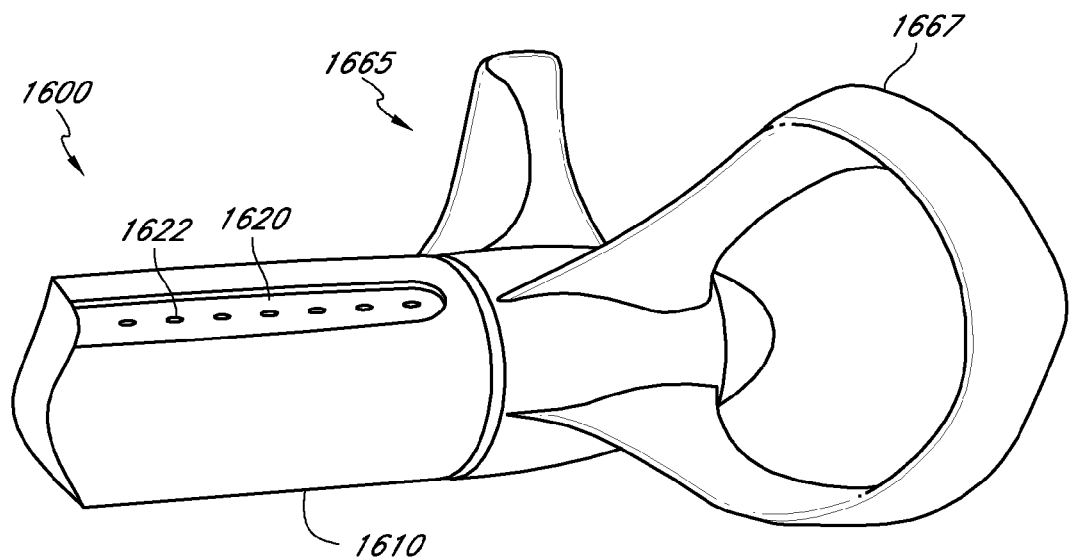
FIG. 33 is a perspective view of a portion of another example embodiment of a sprinkler adapted for use with a spoolable hose.

FIG. 33 is a side perspective view of a portion of a sprinkler 1600, and shows an alternative second end 1665 that may be used with the sprinkler 1500. The second end 1665 comprises a plurality of raised projections 1667 that are configured to support the sprinkler 1600 such that the housing 1610 and the conduits 1620 therein are oriented in an up or down state, and are configured such that they do not become tangled in retract guides (e.g., by comprising surfaces that are angled away from the hose). The second end 1665 may also be used with certain other sprinklers described herein.

Figure 34A:
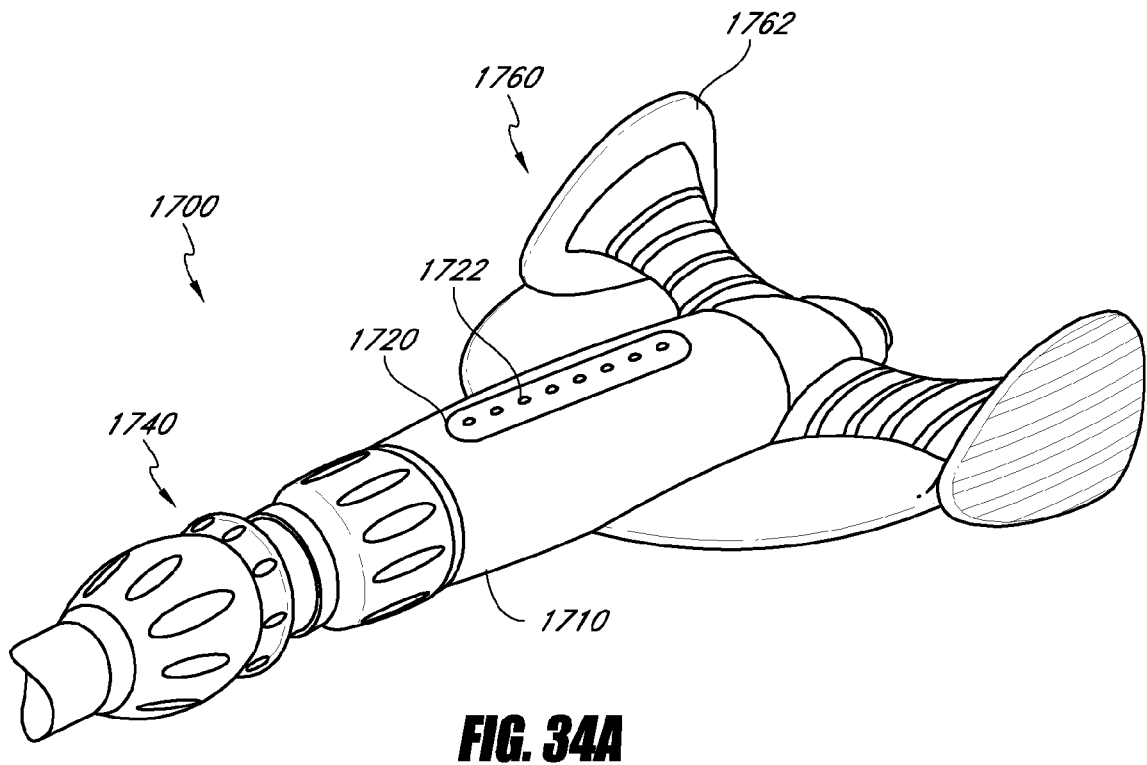
FIG. 34A is a perspective view of yet another example embodiment of a sprinkler adapted for use with a spoolable hose.
Figure 34B:
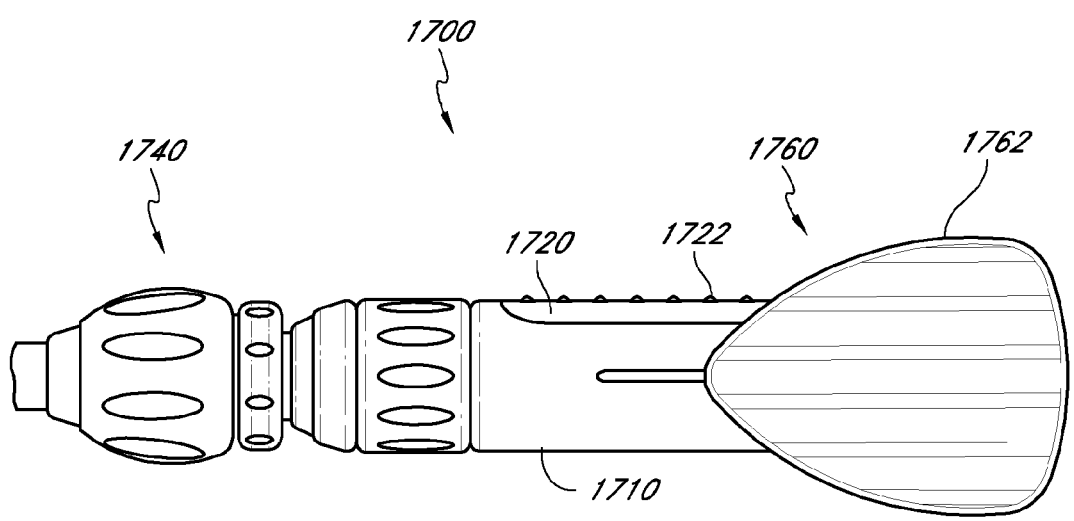
FIG. 34B is a side elevational view of the sprinkler of FIG. 34A.

FIG. 34 illustrates a perspective view of an example embodiment of a sprinkler 1700 comprising two conduits 1720 each having a plurality of apertures 1722. The conduits 1720 are partially encased in a housing 1710, but only a first conduit 1720 is shown because a second conduit 1720 is disposed in a bottom portion of the housing 1710. In some embodiments, the sprinkler 1700 rotated 180° would look the same as the orientation depicted in FIG. 34A. Each of the conduits 1720 extends between a first end and a second end 1760. The conduits 1720 are closed and mounted (e.g., rotatably mounted) to the second end 1760, and are in fluid communication with a valve system (e.g., the valve system illustrated in FIG. 31) at the first end. The valve system is in fluid communication with a hose (e.g., via a slip swivel 1740). The second end 1760 comprises a plurality of webbed raised projections 1762 that are configured to support the sprinkler 1700 such that the housing 1710 and the conduits 1720 therein are oriented in an up or down state (e.g., by forming a raised plane), and are configured such that they do not become tangled in retract guides (e.g., by comprising webbed surfaces that are angled away from the hose). In an up state, the apertures of a first conduit 1720 face generally upward. In a down state, the apertures of a second conduit 1720 face generally upward. The raised projections are preferably configured to not interfere with a spray of water out of the apertures 1722. For example, the portions of the raised projections 1762 that contact the ground are in spaced relation to the housing 1710. FIG. 34B is a side elevational view of the sprinkler 1700, and shows that the sprinkler 1700 comes to rest in an up state or a down state such that the apertures 1722 of at least one conduit 1720 face generally upward.

Winter Hose Protection

With reference again to FIG. 1, users may not want to use the hose reel system 1 during the winter, particularly in colder climates. Users may wish to store the hose reel 2 indoors during the winter. Typically, the user will spool the hose 5 onto the rotatable element 8 before storing the reel 2. However, there is a risk that the hose 5 will retain water when stored. This is particularly problematic because the water can freeze and expand during the winter, which can damage the hose 5.

Accordingly, a preferred embodiment of the hose reel system 1 includes a "winter protection" feature that reduces (e.g., mitigates or prevents) this particular problem. The winter protection feature can be designed for use when the hose reel system 1, including the flow controller 3, is disconnected from a water supply, such as the outdoor faucet 13. For example, in the illustrated embodiment, the hose 15 can be disconnected from the faucet 13. In embodiments in which the flow controller 3 is connected directly to the faucet 13, the winter protection feature can be designed for use by disconnecting the flow controller 3 from the faucet 13.

Preferably, the user interface 6 and/or the remote control 7 is configured to receive a specific user command for activation of the winter protection feature. In one embodiment, upon receipt of the specific "winter protection command," the controller 10 is configured to simultaneously open the flow controller 3 and operate the motor 9 to rotate the rotatable element 8 in a direction to substantially completely spool the hose 5 onto the rotatable element 8. In other words, the winter protection command preferably causes the electronics unit 4 to simultaneously open the one or more valves of the flow controller 3 and to wind in the hose 5.

Preferably, the distal end of the hose 5 is also opened, so that water can drain out of both ends of the hose system as the hose 5 is wound onto the reel 2. In embodiments having an electronically controlled valve on the distal end of the hose 5, the winter protection command can move said valve to an open position to allow water drainage therethrough. In embodiments having a manually controlled valve on the distal end of the hose 5, the user should manually open the valve when using the winter protection feature. In some embodiments, the distal end of the hose 5 does not include a valve and is always open. For example, the distal end of the hose 5 can have a nozzle that is always open.

In one embodiment, activation of the winter protection feature causes the electronics unit 4 to open the one or more valves of the flow controller 3 (and possibly a valve at the distal end of the hose 5) before winding in the hose 5 onto the rotatable element 8. In another embodiment, activation of the winter protection feature causes the electronics unit 4 to open said valve or valves substantially simultaneously with respect to the winding of the hose 5.

Communication Protocol

As described above, the programming device 100, 101 may be configured to transmit and to receive wireless signals. Each device to be controlled by the remote control 7 may also be configured to transmit and to receive wireless signals. For example, referring to FIG. 1, the electronics unit 4 may comprise a transmitter configured to send wireless signals to the remote control 7. In another example, the receiver 11 can be replaced with a wireless transceiver capable of sending and receiving wireless signals. For yet another example, a reel 2 may comprise a transmitter and a receiver and a flow controller 3 may comprise a transmitter and a receiver.

In some embodiments in which each of the remote control 7, the reel 2, and the flow controller 3 comprise a transmitter and a receiver, the devices are configured to "echo" transmission of wireless signals, by which it is meant that the devices wirelessly retransmit the signals. For example, if a remote control 7 sends out a first signal, the first signal is received by the reel 2 and the flow controller 3. The reel 2 echoes the first signal back to the remote control 2 and to the flow controller 3, and the flow controller 3 echoes the first signal back to the remote control 7 and to the reel 2. In some embodiments, one device may be out of communication with other devices, such that echoing enables full communication between the devices, even though such communication is indirect. For example, if the flow controller 3 is not in communication with the remote control 7, but the reel 2 is in communication with the remote control 7, a signal sent by the control 7 may be echoed by the reel 2 to the flow controller 3. The flow controller 3, believing that the echoed signal from the reel 2 is an original signal, will echo the echoed signal from the reel 2 back to the reel 2. The reel 2 may or may not echo the echoed signal from the flow controller 3 back to the remote control 7 and to the flow controller 3. Accordingly, a communication link may be established between the remote 7 and the flow controller 3 through the reel 2. Some example circumstances in which this type of a system including devices that echo communications is could be useful include when a first device is may not be in communication with a second device but is in communication with a third device, when a signal transmitted by a first device is not strong enough to reach a second device but is strong enough to each a third device, and when a second device is turned off or is in a sleep mode such that it does not receive communications, for example to save power. If the remote control 7 is not in communication with the reel 2 or the flow controller 3, the user may move the remote control 7 until communication with at least one of the devices is established. If fluid is flowing through the remote control 7, a manual valve or a valve unit at the distal end of the hose 5 may be operated to stop fluid flow during the reconnection period. In some embodiments, the remote control 7 may be removed and moved independently of the hose 5. An original signal may be repeated by a first device until it receives an echo from each of the devices intended to receive the original signal.

Figure 35A:
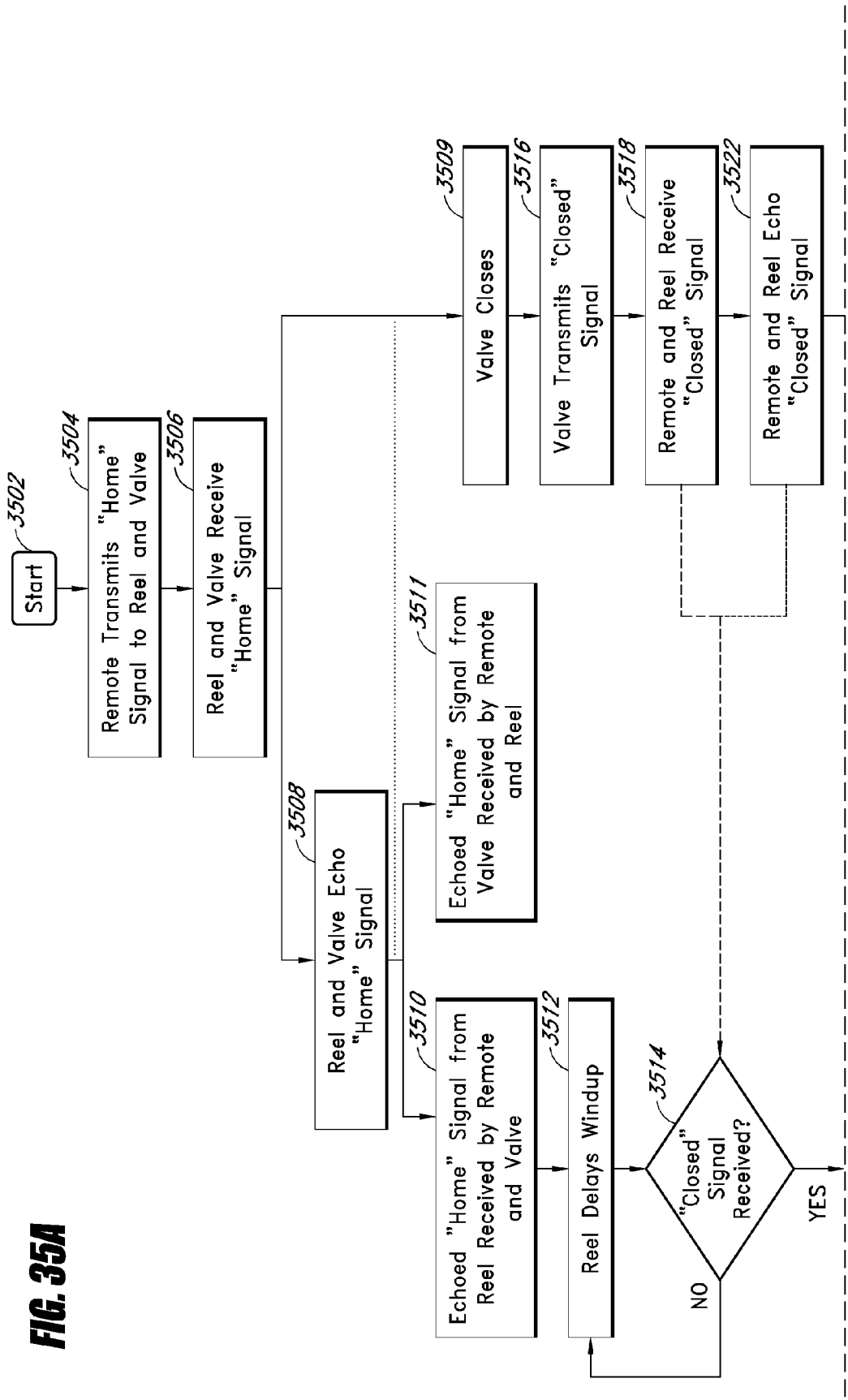
FIG. 35 is an example flowchart for a transfer protocol between a plurality of wireless devices.
Figure 35B:
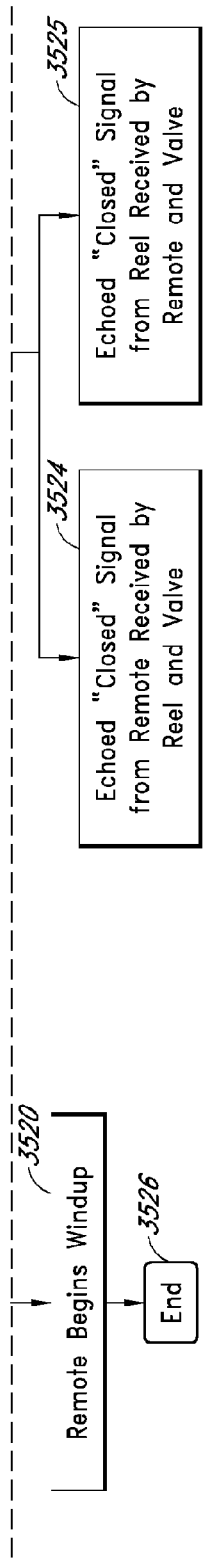
Figure 35:
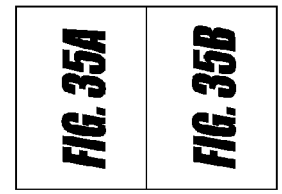

FIG. 35 illustrates, with additional reference to FIG. 1, an example embodiment of a transmission protocol between a remote control 7, a reel 2, and a valve 3 for a "Home" command in which the remote control 7 instructs the reel 2 to wind up the hose 5. While FIG. 35 and this description refer to a "valve," it will be appreciated that a multi-valve system can be used instead of a single valve. In some embodiments, the hose 5 cannot be wound up if there is fluid flowing through the hose 5, so the valve 3 needs to be closed prior to windup. The process begins at the start box 3502. The remote control 7 transmits a "Home" signal to the reel 2 and the valve 3, as indicated in box 3504. The reel 2 and the valve 3 receive the "Home" signal, as indicated in box 3506. Upon receiving the "Home" signal, the reel 2 and the valve 3 each echo the "Home" signal, as indicated in box 3508. Contemporaneously, or after the valve 3 echoes the "Home" signal, the valve 3 closes, as indicated by box 3509. The echoed "Home" signal from the reel 2 is received by the remote control 7 and the valve 3, as indicated in box 3510. The echoed "Home" signal from the valve 3 is received by the remote control 7 and the reel 2, as indicated by box 3511. Once the reel 2 has received the echoed "Home" signal from the valve 3, the reel 2 delays windup until it has received a "Closed" signal from the valve 3, as indicated in box 3512. The decision about whether to begin windup is indicated in decision diamond 3514. If a "Closed" signal has not been received, the reel 2 continues to delay windup in box 3512. If a "Closed" signal has been received, the reel 2 begins remote windup, as indicated in box 3520. After the valve 3 closes in box 3509, the valve 3 transmits a "Closed" signal in box 3516. The remote control 7 and the reel 2 received the "Closed" signal in box 3518. Upon receiving the "Closed" signal, the reel 2 may begin windup, as indicated by the dashed link between the box 3518 and the decision diamond 3514. Alternatively, the reel 2 may wait until after the reel 2 has echoed the "Closed" signal, as indicated in box 3522. The echoed "Closed" signal from the remote control 7 is received by the reel 2 and the valve 3 in box 3524, and the echoed "Closed" signal from the reel 2 is received by the remote control 7 and the valve 3 in box 3525. As described above, upon receiving the "Closed" signal, for example directly from the valve 3 in box 3518, as echoed from the remote control 7 in box 3524, or after itself echoing the "Closed" signal in box 3522, the reel 2 begins windup of the hose 5 in box 3520. At that point, the process ends in box 3526.

In some embodiments, the reel 2 comprises a button, for example at the top of a spherical housing, that causes the reel 2 to transmit the "Home" signal. The ensuing protocol may be similar to the protocol described with respect to FIG. 35, although it will be appreciated that communication with the remote control 7 is not needed. For example, the reel 2 transmits a "Home" signal to the valve 3. The valve 3 receives the "Home" signal. Upon receiving the "Home" signal, valve 3 echoes the "Home" signal to the reel 2. Contemporaneously, or after the valve 3 echoes the "Home" signal, the valve 3 closes. The echoed "Home" signal from the valve 3 is received by the reel 2. Once the reel 2 has received the echoed "Home" signal from the valve 3, the reel 2 delays windup until it has received a "Closed" signal from the valve 3. If a "Closed" signal has not been received, the reel 2 delays windup. If a "Closed" signal has been received, the reel 2 begins windup. After the valve 3 closes, the valve 3 transmits a "Closed" signal. Upon receiving the "Closed" signal, the reel 2 may begin windup. Alternatively, the reel 2 may wait to begin windup until after the reel 2 has echoed the "Closed" signal. The echoed "Closed" signal from the reel 2 is received by the valve 3. As described above, upon receiving the "Closed" signal, for example directly from the valve 3 or after itself echoing the "Closed" signal, the reel 2 begins windup of the hose 5. In an alternative embodiment, the valve 3 responds to receiving the "Home" signal by closing and then sending its "Closed" signal back to the reel 2, at which point the reel 2 begins winding. Other protocols are also possible. For example, in embodiments in which the remote control sends a "Wind Up" signal to the reel 2, the reel 2 may begin winding regardless of the position of the valve 3.

Having thus described the preferred embodiments of the present invention, those of skill in the art will readily appreciate from the disclosure herein that yet other embodiments may be made and used within the scope of the certain preferred embodiments attached hereto. For example, the automatic reel may be used with types of linear material other than water hoses, such as air hoses, pressure washer hoses, vacuum hoses, electrical cords, and the like. Numerous advantages of the invention covered by this disclosure have been set forth in the foregoing description. It will be understood however that this disclosure is, in many respects, only illustrative. Changes may be made in details without exceeding the scope of the disclosure.

What is claimed is:

1. A method of operating a hose reel, the method comprising:
   providing a hose reel comprising:
      a rotatable element;
      a hose configured to be spooled around the rotatable element;
      a motor configured to rotate the rotatable element, the hose having a distal end having an axially slidable collar;
      a hose configured to be spooled around the rotatable element;
      a motor controller configured to activate the motor, thereby rotating the rotatable element and spooling the hose around the rotatable element;
      a flow controller in fluid communication with the hose;
      a programmable electronics unit in electrical communication with the motor controller and the flow controller; and
      a programming device in communication with the electronics unit, wherein the programming device comprises:
         a handheld element having a proximal end, a distal end, and an internal flow conduit extending between the proximal and distal ends, the internal flow conduit configured to be in fluid communication with the hose; and
         a remote control integrated directly with the handheld element, the remote control configured to transmit wireless data signals to the electronics unit;
      wherein the proximal end of the handheld element is configured to be removably fluidly attached to the distal end of the hose by sliding the hose's collar proximally, inserting the proximal end of the handheld element into the distal end of the hose, and sliding the collar distally after said inserting;
   using the programming device to program the electronics unit to automatically cause the flow controller to start a flow of a fluid through the hose for a first duration;
   using the programming device to program the electronics unit to automatically cause the flow controller to stop the flow of the fluid after the first duration;
   using the programming device to program the electronics unit to automatically cause the motor controller to activate the motor to rotate the rotatable element after the first duration; and
   executing a program stored in a memory of the electronics unit, the program produced by said programming steps.

2. The method of claim 1, wherein using the programming device to program the electronics unit to cause the motor controller to activate the motor to rotate the rotatable element after the first duration comprises using the programming device to program the electronics unit to cause the motor controller to activate the motor to rotate the rotatable element until the hose is substantially completely spooled around the rotatable element.

3. The method of claim 1, further comprising:
   using the programming device to program the electronics unit to cause the flow controller to start a flow of a fluid through the hose for a second duration; and
   using the programming device to program the electronics unit to cause the flow controller to stop the flow of the fluid after the second duration.

4. The method of claim 1, further comprising unspooling the hose from the rotatable element before executing the program.

5. The method of claim 4, wherein unspooling the hose comprises placing the hose around a retract guide that is inserted into the ground, and wherein the method comprises moving a first portion of the hose between the hose reel and the retract guide in a first direction and moving a second portion of the hose between the retract guide and an end of the hose in a second direction, the second direction different than the first direction.

6. The method of claim 1, wherein the first duration is selected by a user.

7. The method of claim 1, wherein the first duration is a default time period stored in the electronics unit.

8. A hose reel comprising:
   a hose;

a rotatable element having a hose attachment fitting adapted to attach to an end of the hose in a manner allowing the hose to be spooled onto the rotatable element, the hose having a proximal end configured to be removably fluidly attached to the hose attachment fitting, and a distal end having an axially slidable collar;

a motor configured to rotate the rotatable element;

a motor controller configured to activate the motor, thereby rotating the rotatable element;

a flow controller configured to start and stop a flow of a fluid through the hose attachment fitting;

a programmable electronics unit in communication with the motor controller and the flow controller, the electronics unit including a memory and being programmable to store instructions in the memory for causing the flow controller to allow fluid to flow through the hose attachment fitting, the electronics unit further programmable to store instructions in the memory for causing the motor controller to activate the motor to rotate the rotatable element; and a programming device in communication with the electronics unit, wherein the programming device is configured to input in the memory a first duration in which the flow controller automatically allows the fluid to flow through the hose attachment fitting, and a second duration in which the flow controller automatically prevents the fluid from flowing through the hose attachment fitting, and wherein the programming device is configured to input in the memory an activation period in which the motor controller automatically activates the motor and rotates the rotatable element, wherein the programming device comprises:

a handheld element having a proximal end, a distal end, and an internal flow conduit extending between the proximal and distal ends, the internal flow conduit configured to be in fluid communication with a hose coupled to the handheld element; and a remote control integrated directly with the handheld element, the remote control configured to transmit wireless data signals for controlling the motor controller and the flow controller;

wherein the proximal end of the handheld element is configured to be removably fluidly attached to the distal end of the hose by sliding the hose's collar proximally, inserting the proximal end of the handheld element into the distal end of the hose, and sliding the collar distally after said inserting.

9. The hose reel of claim 8, wherein the programming device further comprises a plurality of buttons and a display.

10. The hose reel of claim 8, further comprising a reel housing substantially enclosing the rotatable element, motor, and motor controller.

11. The hose reel of claim 10, wherein the reel housing substantially encloses the flow controller.

12. The hose reel of claim 10, wherein the electronics unit is inside the reel housing.

13. The hose reel of claim 10, further comprising a user interface integrated with the reel housing, wherein the user interface comprises a plurality of buttons and a display, and wherein the user interface is configured to transmit data signals for controlling the motor controller and the flow controller.

14. The hose reel of claim 8, wherein the handheld element and the remote control each include structure for engaging one another in only one relative positioning therebetween.

15. The hose reel of claim 8, wherein the handheld element includes a recess configured to receive the remote control, and the remote control is secured to the handheld element by engagement with the recess in the handheld element.

16. The hose reel of claim 15, wherein the remote control is engaged with the recess by snap-fit engagement flanges configured to snap into a housing of the handheld element.

17. The hose reel of claim 8, wherein:

the distal end of the handheld element includes an axially slidable collar;

the hose reel further comprising a nozzle unit configured to be removably fluidly attached to the distal end of the handheld element by sliding the handheld element's collar proximally, inserting the proximal end of the nozzle unit into the distal end of the handheld element, and sliding the handheld element's collar distally after said inserting of the proximal end of the nozzle unit into the distal end of the handheld element; and the nozzle unit is configured to be removably fluidly attached to the distal end of the hose by sliding the hose's collar proximally, inserting the proximal end of the nozzle unit into the distal end of the hose, and sliding the hose's collar distally after said inserting of the proximal end of the nozzle unit into the distal end of the hose.

18. The hose reel of claim 8, wherein the remote control is further configured to receive wireless data signals.

19. The hose reel of claim 8, wherein:

the hose reel further comprises a valve unit configured to regulate water flow through the valve unit, the valve unit having a proximal end and a distal end with an axially slidable collar;

the valve unit is configured to be removably fluidly attached to the distal end of the hose by sliding the hose's collar proximally, inserting the proximal end of the valve unit into the distal end of the hose, and sliding the hose's collar distally after said inserting of the proximal end of the valve unit into the distal end of the hose; and the proximal end of the handheld element is configured to be removably fluidly attached to the distal end of the valve unit by sliding the valve unit's collar proximally, inserting the proximal end of the handheld element into the distal end of the valve unit, and sliding the valve unit's collar distally after said inserting of the proximal end of the handheld unit into the distal end of the valve unit.

20. The hose reel of claim 8, wherein at least one of the first duration and the second duration is selected by a user.

21. The hose reel of claim 8, wherein at least one of the first duration and the second duration is a default time period stored in the electronics unit.

22. A hose reel comprising:

a rotatable element having a hose attachment fitting;

a hose adapted to be spooled onto the rotatable element, the hose having a distal end having an axially slidable collar that is biased distally, the hose attachment fitting adapted to attach to a proximal end of the hose in a manner allowing the hose to be spooled onto the rotatable element;

a motor configured to rotate the rotatable element;

a motor controller configured to activate the motor, thereby rotating the rotatable element;

a flow controller in fluid communication with the hose; and a programmable electronics unit in electrical communication with the motor controller and the flow controller, the programmable electronics unit including a memory and being programmable to store instructions in the memory for causing the flow controller to control a flow of a fluid through the hose, the programmable electronics unit programmable to store instructions in the memory for causing the motor controller to activate the motor to rotate the rotatable element; and a programming device, comprising:

a handheld element having a proximal end, a distal end, and an internal flow conduit extending between the proximal and distal ends, the internal flow conduit configured to be in fluid communication with the hose; and a remote control integrated directly with the handheld element, the remote control configured to transmit wireless data signals for controlling the motor controller and the flow controller;

wherein the proximal end of the handheld element is configured to be removably fluidly attached to the distal end of the hose by sliding the hose's collar proximally, inserting the proximal end of the handheld element into the distal end of the hose, and sliding the collar distally after said inserting, wherein the programming device is configured to input in the memory a first duration in which the flow controller automatically allows the fluid to flow through the hose attachment fitting, and a second duration in which the flow controller automatically prevents the fluid from flowing through the hose attachment fitting, and wherein the programming device is configured to input in the memory an activation period in which the motor controller automatically activates the motor and rotates the rotatable element.

23. The hose reel of claim 22, wherein:

the distal end of the handheld element includes an axially slidable collar;

the hose reel further comprising a nozzle unit configured to be removably fluidly attached to the distal end of the handheld element by sliding the handheld element's collar proximally, inserting the proximal end of the nozzle unit into the distal end of the handheld element, and sliding the handheld element's collar distally after said inserting of the proximal end of the nozzle unit into the distal end of the handheld element; and the nozzle unit is configured to be removably fluidly attached to the distal end of the hose by sliding the hose's collar proximally, inserting the proximal end of the nozzle unit into the distal end of the hose, and sliding the hose's collar distally after said inserting of the proximal end of the nozzle unit into the distal end of the hose.

24. The hose reel of claim 22, wherein:

the hose reel further comprises a valve unit configured to regulate water flow through the valve unit, the valve unit having a proximal end and a distal end with an axially slidable collar;

the valve unit is configured to be removably fluidly attached to the distal end of the hose by sliding the hose's collar proximally, inserting the proximal end of the valve unit into the distal end of the hose, and sliding the hose's collar distally after said inserting of the proximal end of the valve unit into the distal end of the hose; and the proximal end of the handheld element is configured to be removably fluidly attached to the distal end of the valve unit by sliding the valve unit's collar proximally, inserting the proximal end of the handheld element into the distal end of the valve unit, and sliding the valve unit's collar distally after said inserting of the proximal end of the handheld unit into the distal end of the valve unit.

25. A hose reel comprising:

a hose;

a rotatable element having a hose attachment fitting adapted to attach to an end of the hose in a manner allowing the hose to be spooled onto the rotatable element;

a motor configured to rotate the rotatable element;

a motor controller configured to activate the motor, thereby rotating the rotatable element;

a flow controller configured to start and stop a flow of a fluid through the hose attachment fitting;

a programmable electronics unit in communication with the motor controller and the flow controller, the electronics unit including a memory and being programmable to store instructions in the memory for causing the flow controller to automatically allow fluid to flow through the hose attachment fitting and to automatically prevent fluid from flowing through the hose attachment fitting, wherein the electronics unit is further programmable to store instructions in the memory for automatically causing the motor controller to activate the motor to rotate the rotatable element; and a programming device in communication with the electronics unit, wherein the programming device is configured to input in the memory a first duration in which the flow controller automatically allows the fluid to flow through the hose attachment fitting, and a second duration in which the flow controller automatically prevents the fluid from flowing through the hose attachment fitting.

26. The hose reel device of claim 25, wherein the programming device comprises:

a handheld element having a proximal end, a distal end, and an internal flow conduit extending between the proximal and distal ends, the internal flow conduit configured to be in fluid communication with the hose coupled to the handheld element; and a remote control integrated directly with the handheld element, the remote control configured to transmit wireless data signals for controlling the motor controller and the flow controller;

wherein the proximal end of the handheld element is configured to be removably fluidly attached to a distal end of the hose by sliding the hose's collar proximally, inserting the proximal end of the handheld element into the distal end of the hose, and sliding the collar distally after said inserting.

27. The hose reel device of claim 25, wherein the programming device is configured to input in the memory an activation period in which the motor controller activates the motor and rotates the rotatable element.

28. The hose reel device of claim 25, wherein the programming device comprises a button configured such that, when activated, the electronics unit causes the flow controller to prevent fluid from flowing through the hose attachment fitting and to cause the motor controller to activate the motor to rotate the rotatable element.

* * * * *